United States Patent [19]
Kazuo et al.

[11] Patent Number: 5,224,853
[45] Date of Patent: Jul. 6, 1993

[54] SUPERCHARGING PRESSURE CONTROL METHOD FOR INTERNAL COMBUSTION ENGINES

[75] Inventors: Inoue Kazuo; Kishi Noriyuki; Kubodera Masao; Akiyama Eitetsu; Kashiwabara Shigeto; Takizawa Osamu, all of Wako, Japan

[73] Assignee: Honda Giken Kogyo K.K., Tokyo, Japan

[21] Appl. No.: 483,573

[22] Filed: Feb. 22, 1990

Related U.S. Application Data

[62] Division of Ser. No. 287,863, Dec. 21, 1988, Pat. No. 4,926,640.

[30] Foreign Application Priority Data

| Dec. 29, 1987 | [JP] | Japan | 62-334198 |
| Dec. 29, 1987 | [JP] | Japan | 62-334199 |
| Mar. 18, 1988 | [JP] | Japan | 63-65320 |
| May 11, 1988 | [JP] | Japan | 63-114100 |
| May 11, 1988 | [JP] | Japan | 63-114101 |
| May 12, 1988 | [JP] | Japan | 63-115706 |
| Jul. 19, 1988 | [JP] | Japan | 63-179452 |

[51] Int. Cl.$^5$ .......................... F02B 37/12
[52] U.S. Cl. .............................. 60/602
[58] Field of Search ............ 60/600, 601, 602, 603; 123/564

[56] References Cited

U.S. PATENT DOCUMENTS

| 4,612,770 | 9/1986 | Tadokoro et al. | 60/602 |
| 4,646,522 | 3/1987 | Mamiya et al. | 60/602 |
| 4,788,822 | 12/1988 | Mieno et al. | 60/602 |

FOREIGN PATENT DOCUMENTS

| 259723 | 12/1985 | Japan | 60/602 |
| 223327 | 9/1988 | Japan | 60/602 |

*Primary Examiner*—Michael Koczo
*Attorney, Agent, or Firm*—Arthur L. Lessler

[57] ABSTRACT

A method of controlling supercharging pressure in an internal combustion engine is disclosed. The supercharging pressure is controlled based on a basic control amount determined in dependence on operating conditions of the engine. When the transmission is in a lower speed position, the basic control amount is corrected so that the supercharging pressure is lower than a value assumed when the transmission is in a higher speed position. When the engine is in a feedback control mode, the basic control amount is corrected in response to the difference between the actual supercharging pressure and a desired value of the same. The desired value of the supercharging pressure is set lower when the transmission is in the lower speed position than a value assumed when the transmission is in a higher speed position. When the transmission is in the lower speed position, the rate of increase of the supercharging pressure in a transient states is set lower than a value assumed when the transmission is in a higher speed position. The basic control amount is corrected so as to decrease the supercharging pressure, and/or the desired supercharging pressure value is decreased, when the engine rotational speed changes from a state in which it increases to a state in which it decreases.

5 Claims, 34 Drawing Sheets

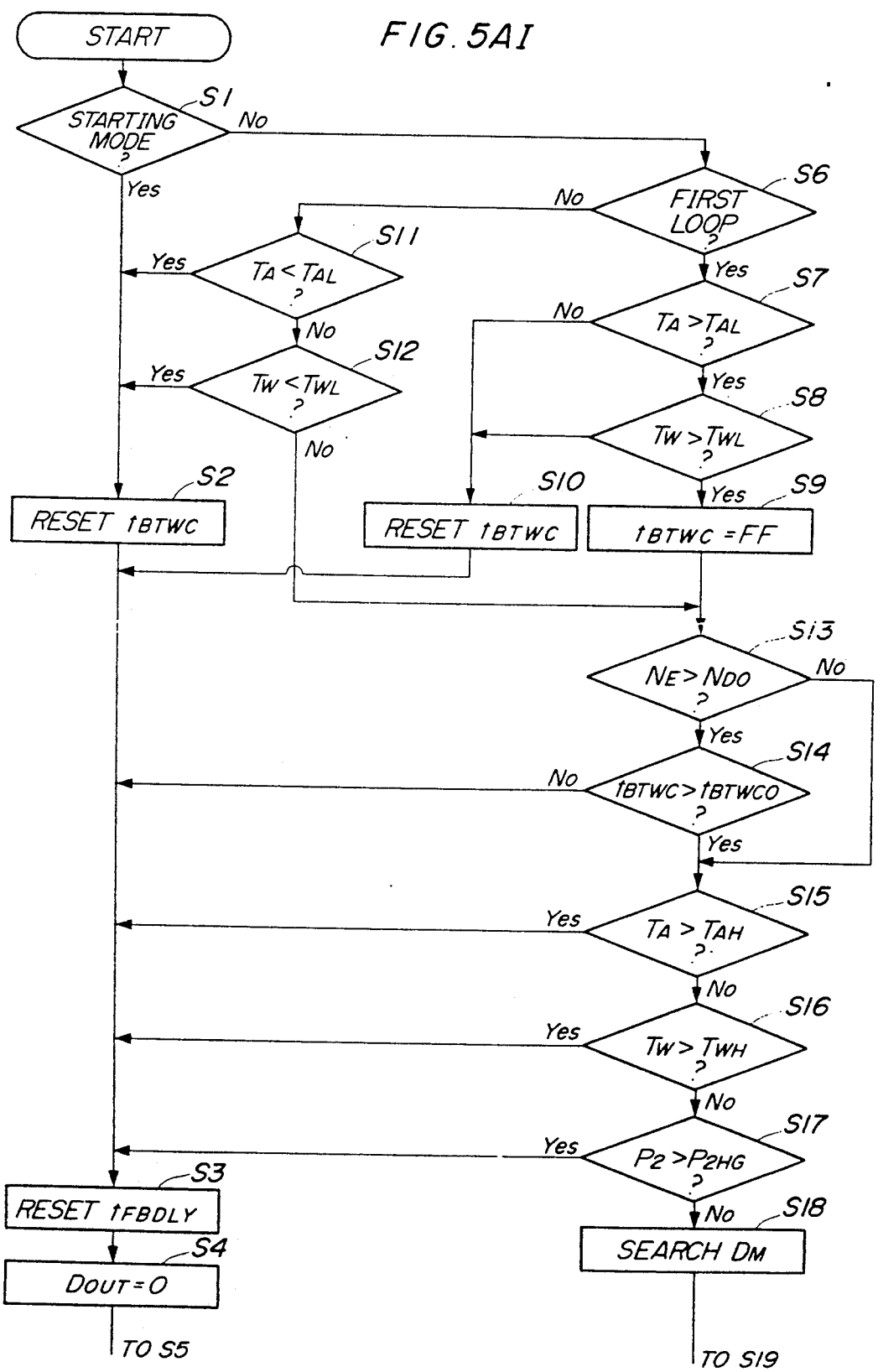

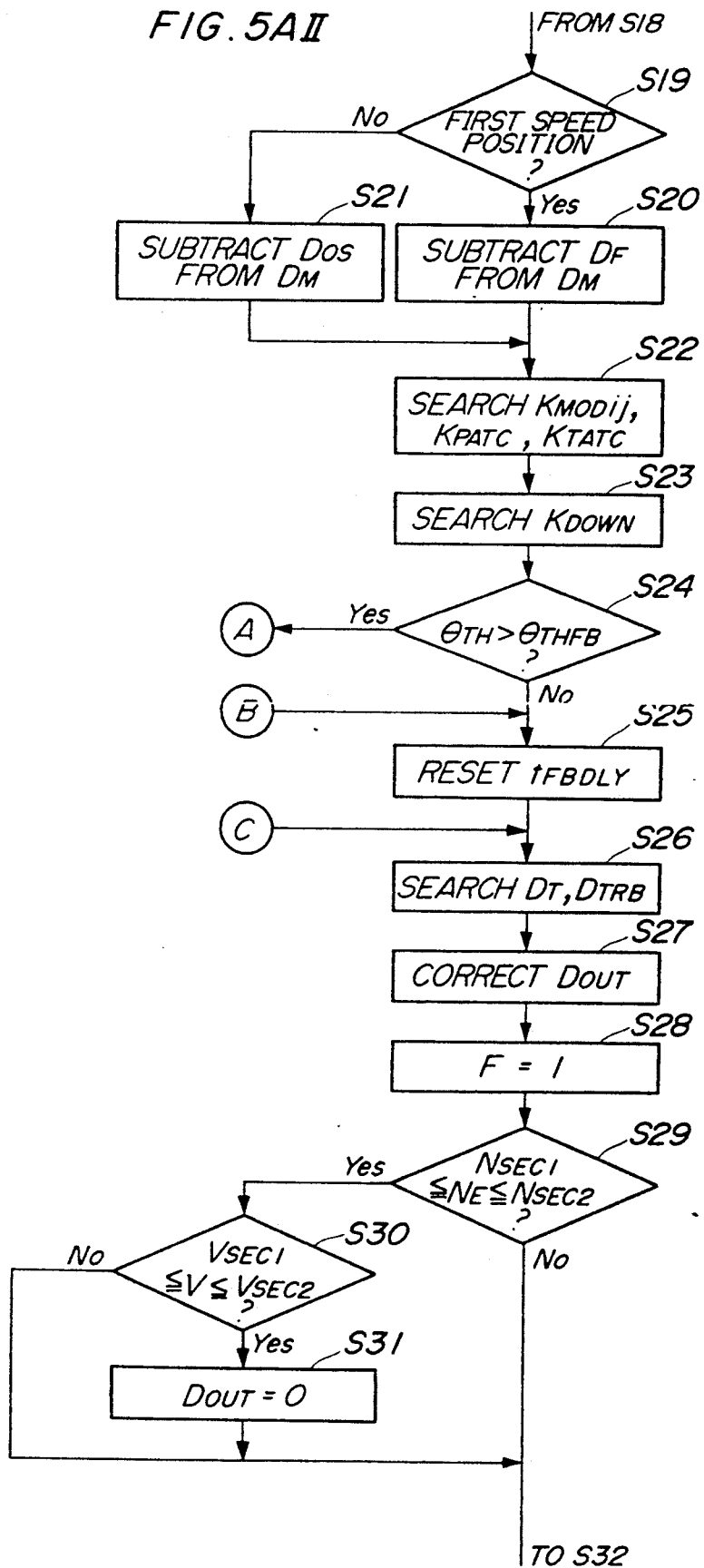
FIG. 5AII

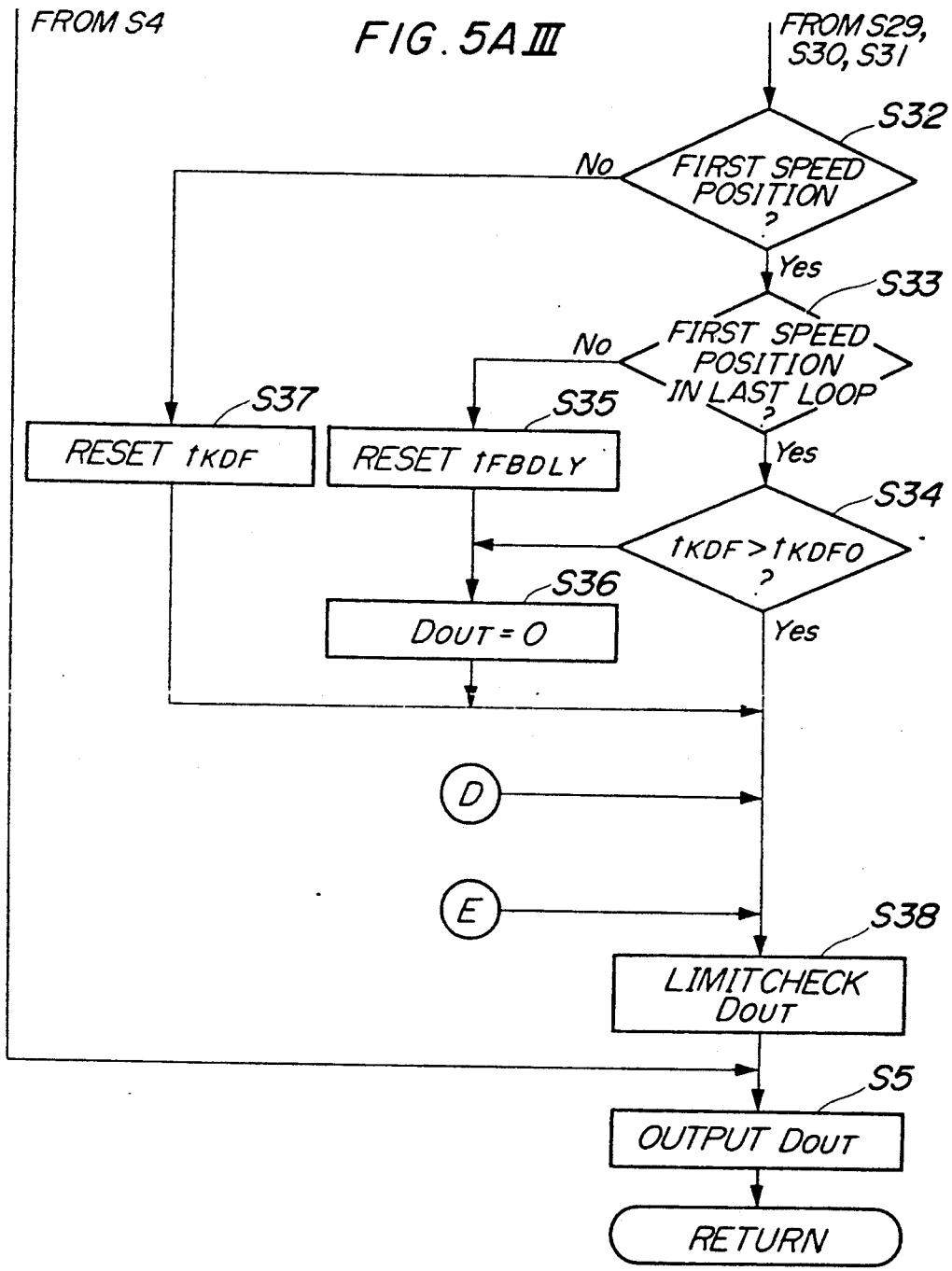

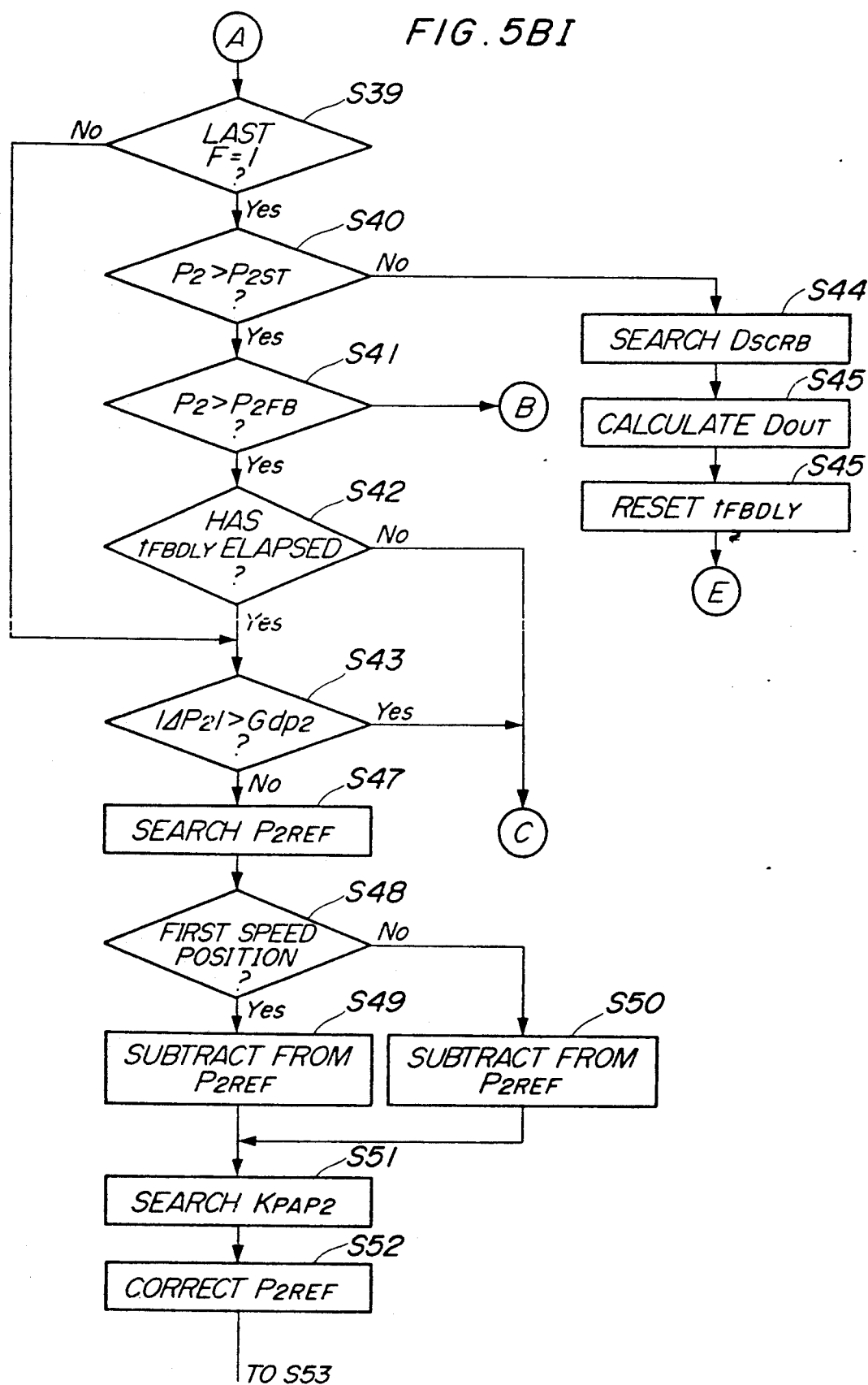

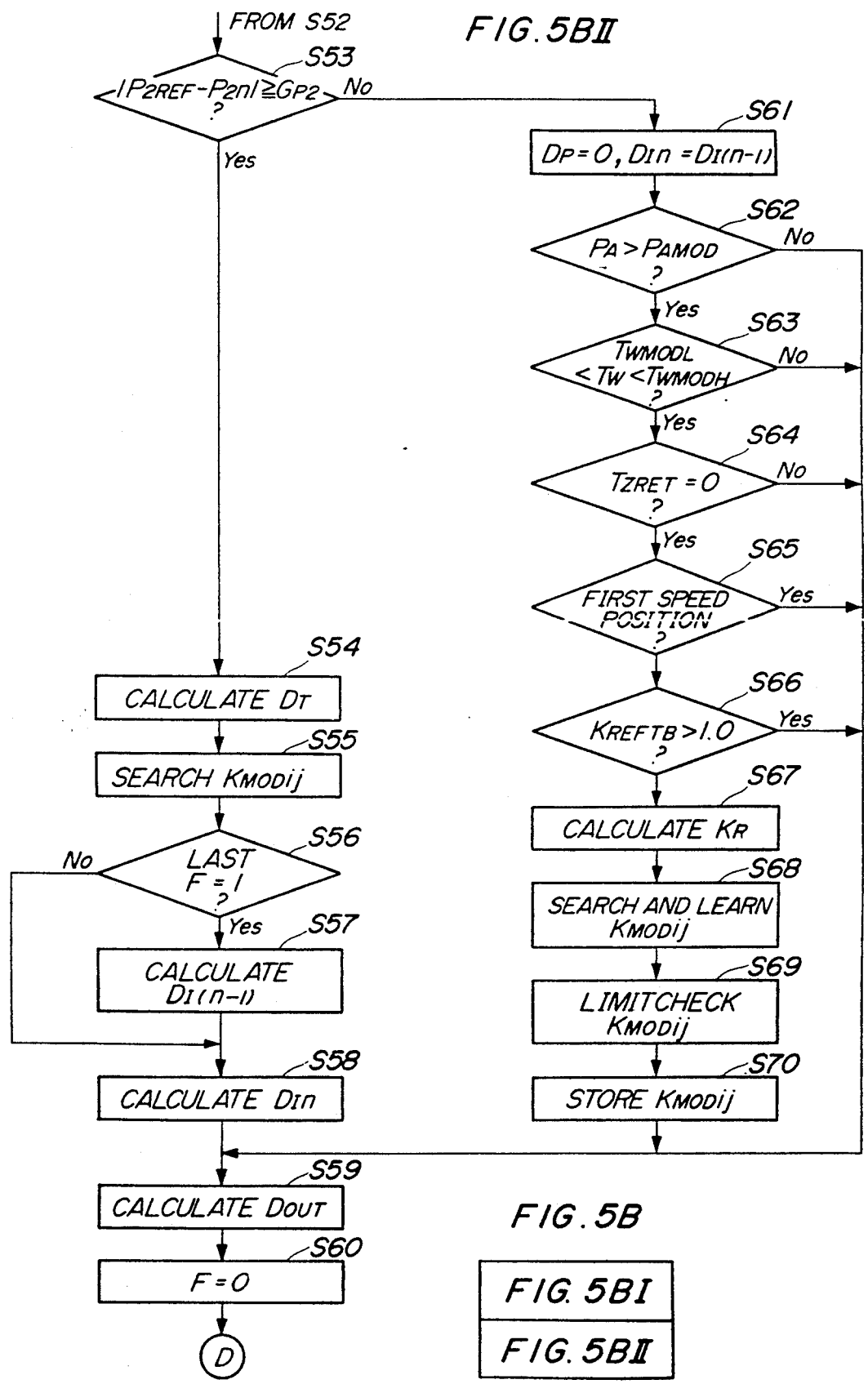

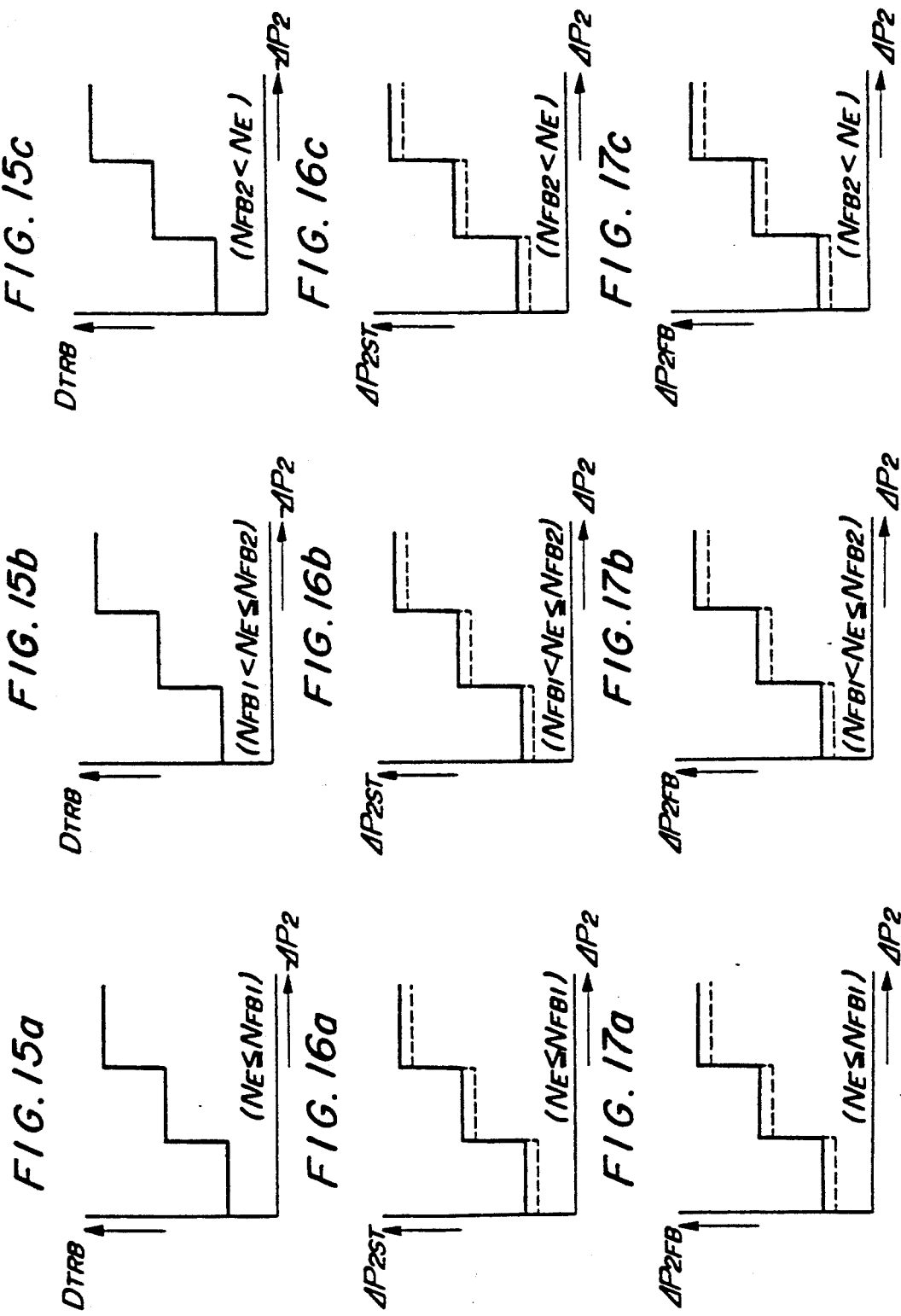

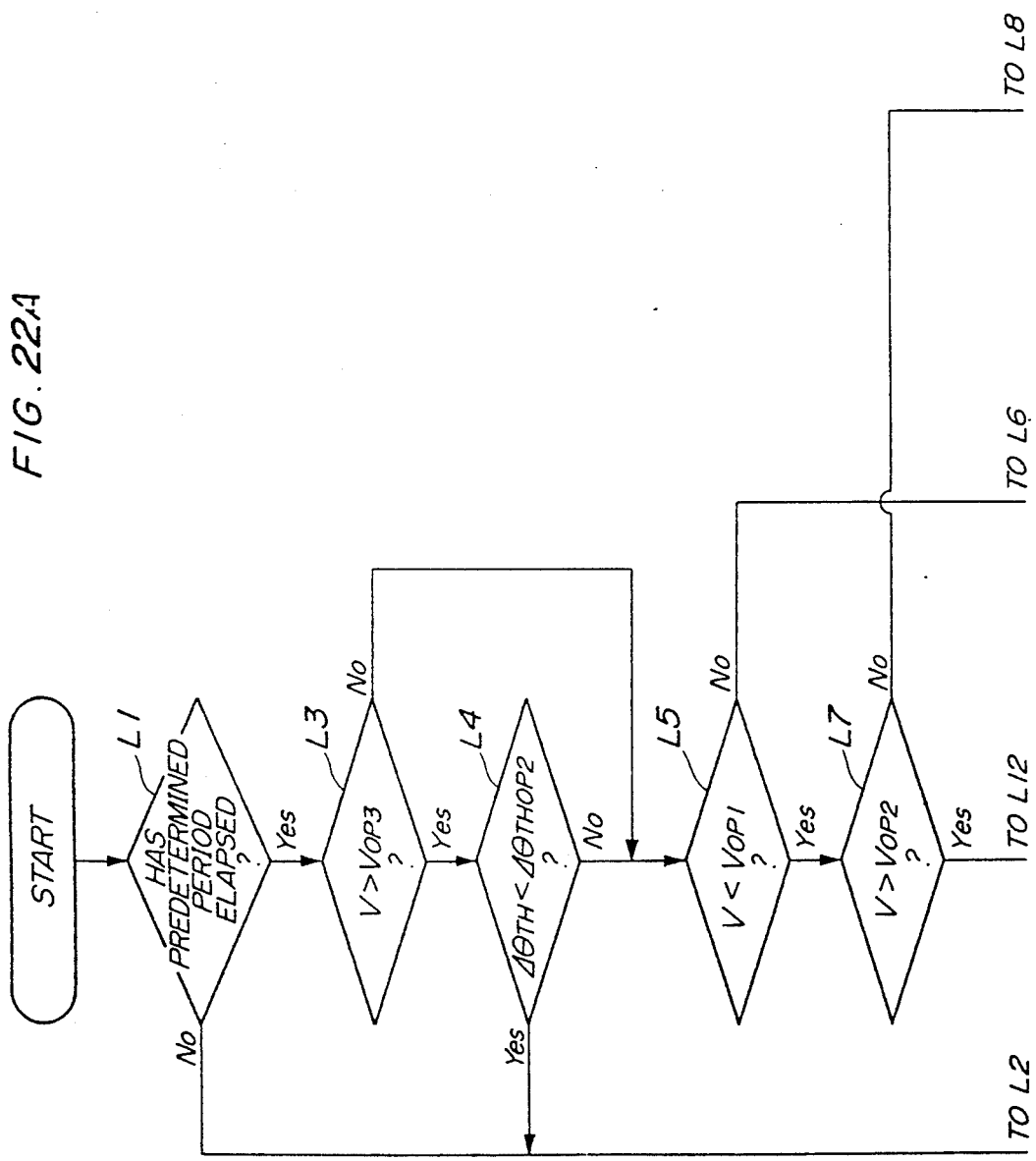

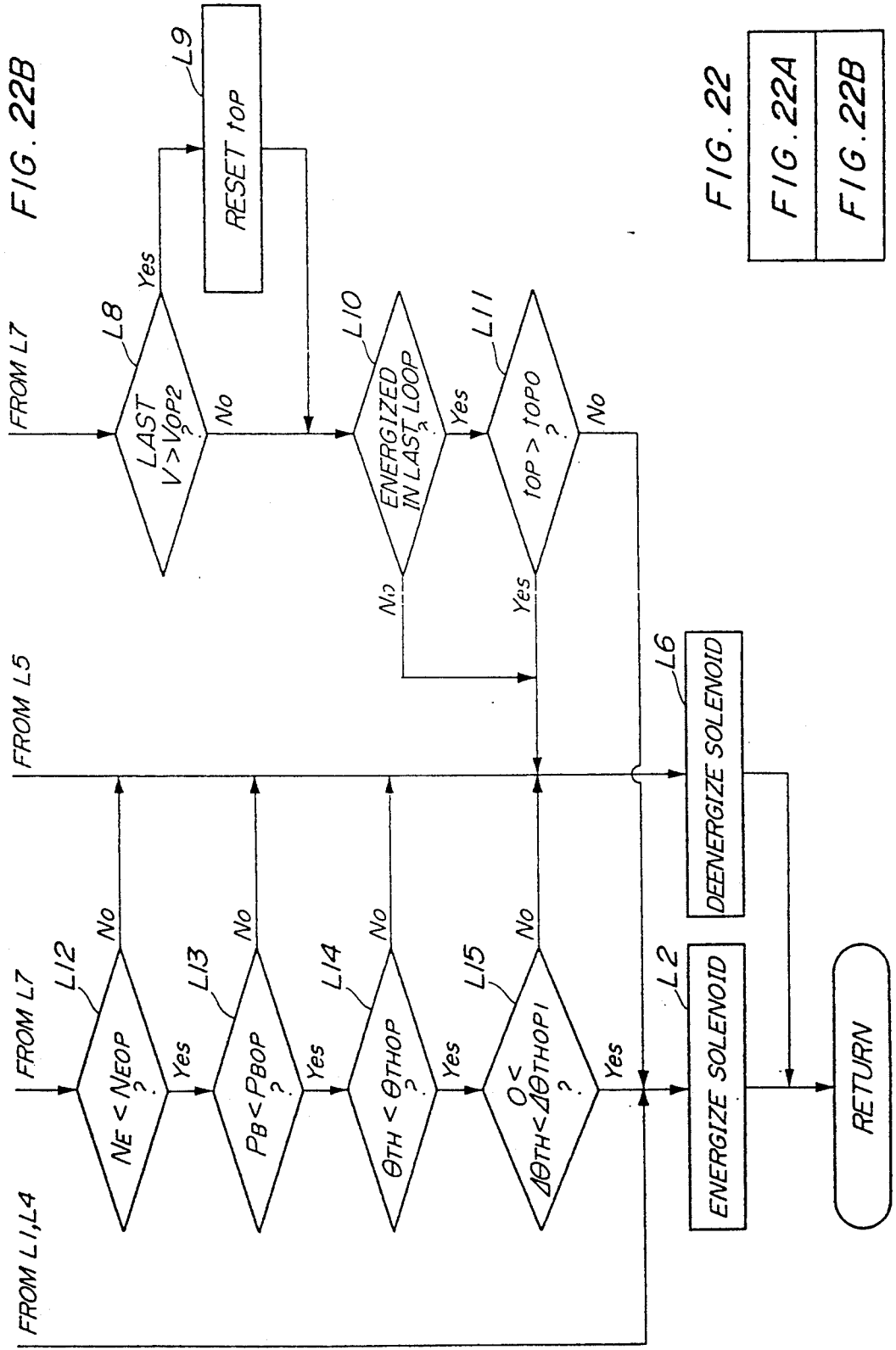

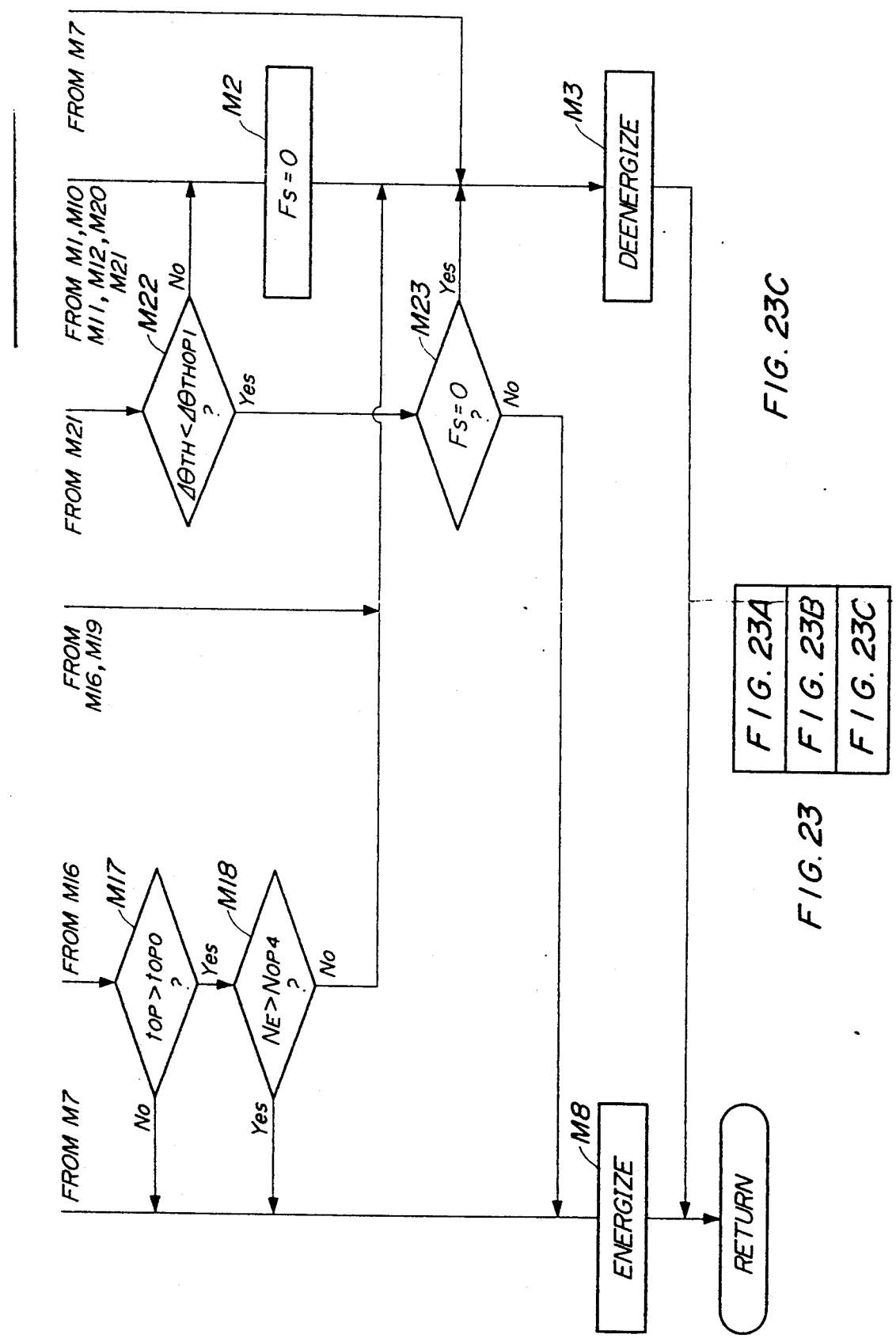

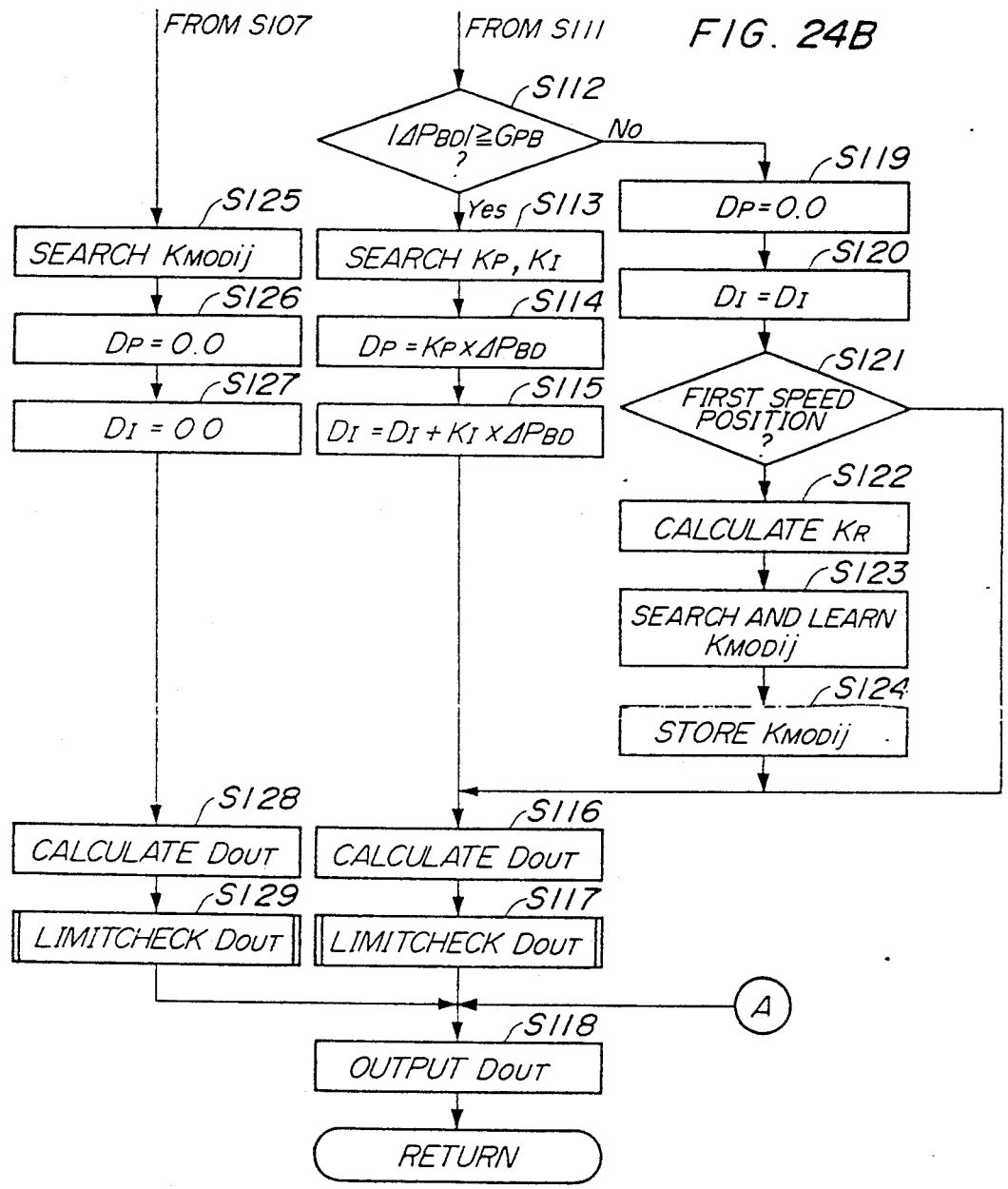
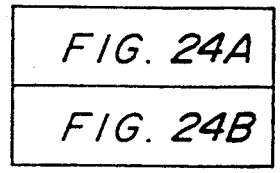

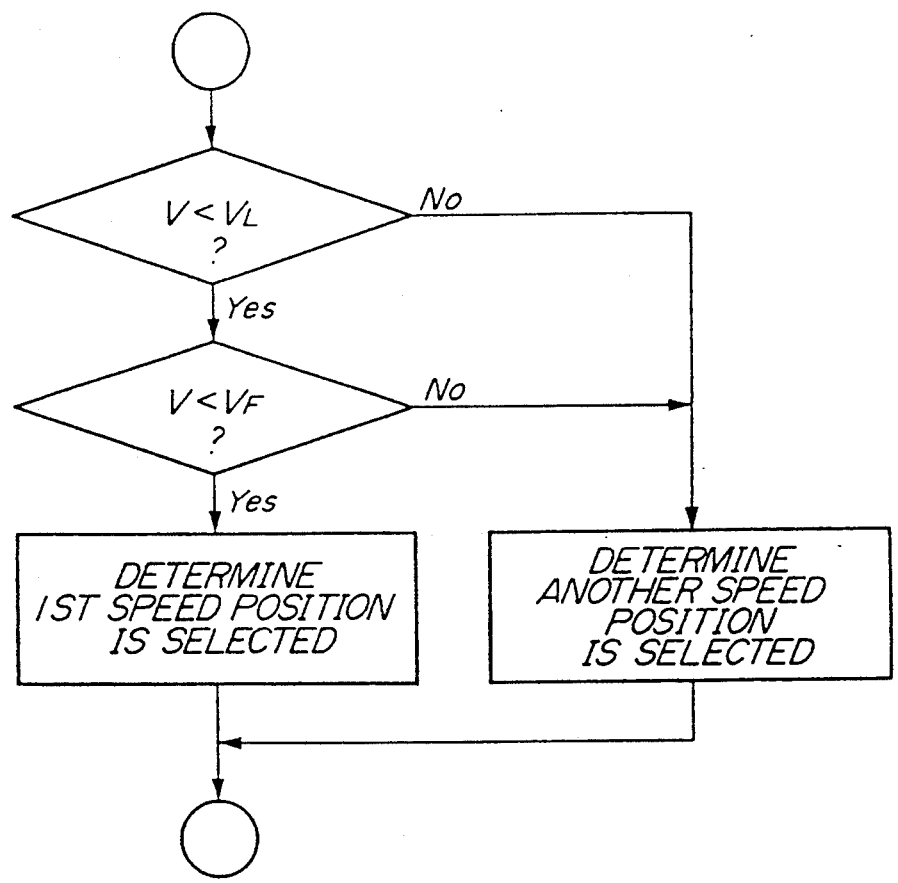

| NE \ TA | TAV1 | --- | TAVj | --- | TAV8 |
|---|---|---|---|---|---|
| NV1 | KTATC1,1 | | | | |
| ⋮ | | | | | |
| NVi | | | KTATCi,j | | |
| ⋮ | | | | | |
| NV20 | | | | | KTATC20,8 |

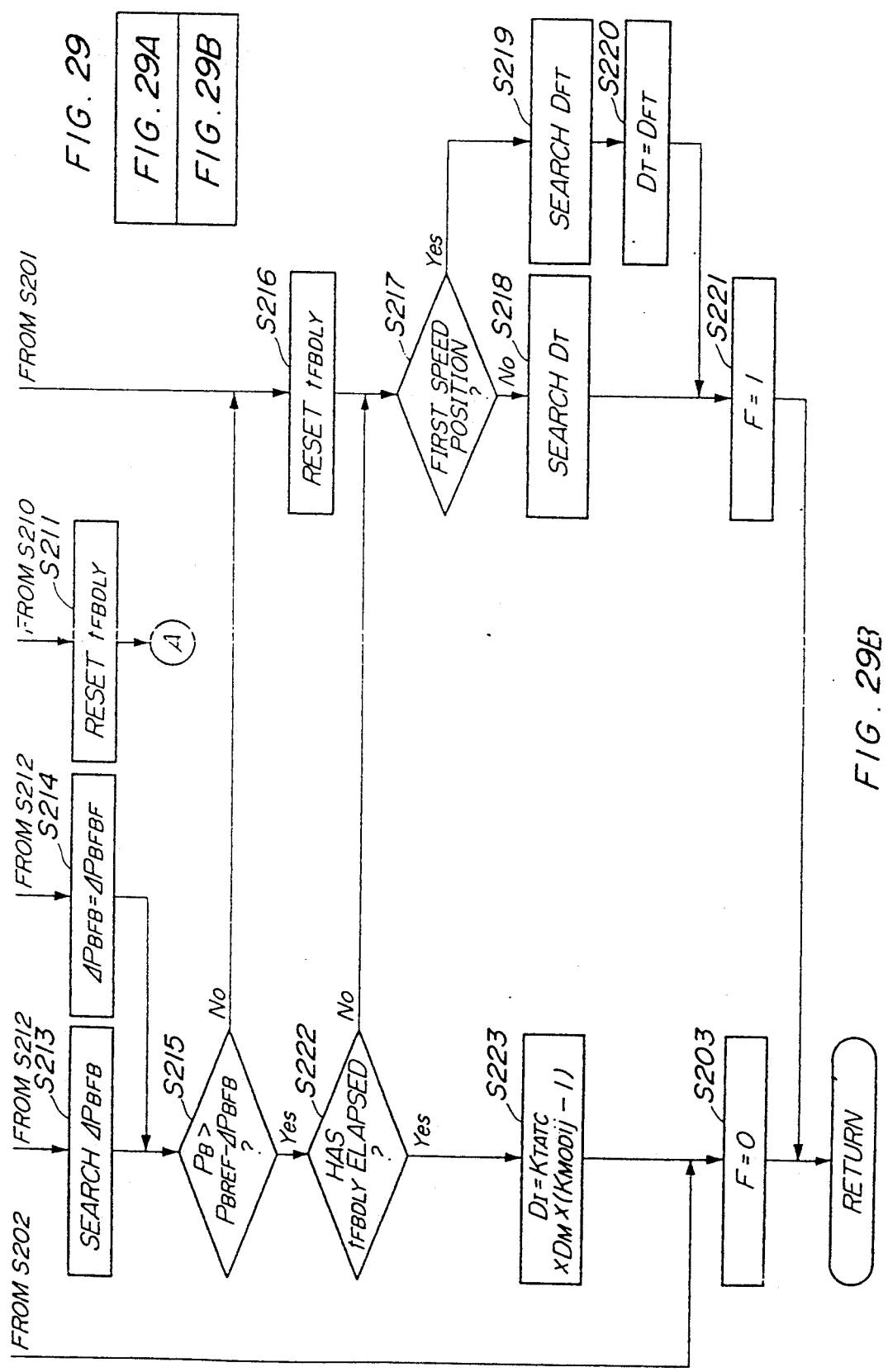

FIG. 34
| NE\TA | TAV1 ----- TAVj ----- TAV8 |
|---|---|
| Nv1 | PBREF1,1 |
| Nvi | ------ PBREFi,j |
| Nv20 | PBREF20,8 |
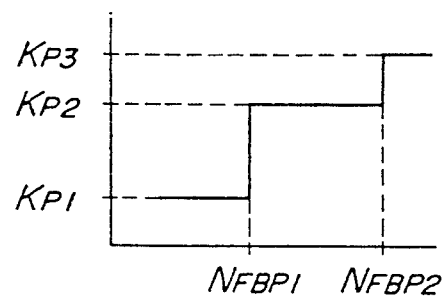
FIG. 35
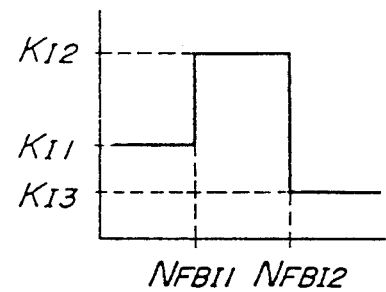
FIG. 36
FIG. 37
| NE\TA | TAV1 --- TAVj ------ TAV8 |
|---|---|
| Nv1 | KMOD1,1 |
| Nvi | ------ KMODi,j |
| Nv20 | KMOD20,8 |

SUPERCHARGING PRESSURE CONTROL METHOD FOR INTERNAL COMBUSTION ENGINES

This application is a division of application Ser. No. 07/287,863, filed Dec. 21, 1988, U.S. Pat. No. 4,926,640.

BACKGROUND OF THE INVENTION

This invention relates to a method of controlling supercharging pressure in an internal combustion engine equipped with a supercharger, and more particularly to an improved method of properly controlling the supercharging pressure when the transmission is in a predetermined position, or when the engine is in particular operating conditions.

A supercharging pressure control method for internal combustion engines has been proposed by the assignee of the present application, e.g. by Japanese Provisional Patent Publication (Kokai) No. 63-129126, in which when the engine is in a transient operating condition in which the supercharging pressure abruptly increases, open loop control is executed, while when the engine is in a steady operating condition in which the supercharging pressure is relatively stable, feedback control is executed, whereby hunting in the supercharging pressure is prevented from taking place due to a time lag in the responsiveness of the control system to the actual change in the supercharging pressure which would take place if the feedback control were executed during the above transient operating condition of the engine, to thereby effect smooth control of the supercharging pressure.

However, the above proposed control method still has room for further improvment in respect of the accelerability of the engine and the controllability of the supercharging pressure as well as the durability or life of the engine when the transmission is in a predetermined gear position or in particular operating conditions.

First, torque acting upon component parts of the transmission of the engine varies depending on the gear position assumed by the transmission. The torque acting upon the component parts is very large when the transmission is in the first speed position. Generally, the component parts should be designed so as to endure such large torque. However, since, as mentioned above, the torque is very large when the transmission is in the first speed position, if the supercharging pressure is controlled at a constant value irrespective of the gear position of the transmission, the transmission will have to be large in size.

Further, when the rotational speed of the engine temporarily drops at the time of shifting the gear position of the transmission, the supercharging pressure can overshoot due to a time lag in the operation of the supercharging pressure control system, in spite of the drop in the rotational speed of the engine, which makes it difficult to carry out stable control of the supercharging pressure.

Still further, in general, when the engine is accelerated with the transmission in a lower speed position (e.g. the first speed position), the rate of rise of the engine rotational speed is larger than when the engine is accelerated with the transmission in a higher speed position. Accordingly, the rate of increase of the supercharging pressure is higher in the former case. This is conspicuous especially at the sudden standing-start of the vehicle. However, according to the aforesaid conventional method, the supercharging pressure is controlled in the transient condition, always in the same manner, irrespective of the gear position of the transmission. Further, the control system has an inherent time lag in its responsiveness. Consequently, when the supercharging pressure is in the transient condition with the transmission in a lower speed position, the rate of increase of the supercharging pressure exceeds the control speed of the system, so that the engine output is suddenly increased, resulting in spinning of the driving wheels of the vehicle and overboosting. Hence, good accelerability of the engine cannot be obtained.

Also, according to the conventional method, the desired supercharging pressure, at which the supercharging pressure is to be controlled in feedback control mode during the steady condition, is set at a single constant value, irrespective of the gear position of the transmission. As a result, the torque acting upon the transmission component parts will become large when the transmission is in the lower speed position during the steady condition of the supercharging pressure, which can cause overboosting and can badly affect the durability or life of the engine.

Further, it is desirable to stop supercharging the engine when the engine is in particular operating conditions, such as a condition in which the intake air temperature or the cooling water temperature is very low or very high, and a condition in which the supercharging pressure is very high. However, if the supercharging pressure is increased immediately after the engine has left such particular conditions, alternate supercharging and interruption thereof can be repeated at the boundary between such particular operating conditions and other operating conditions adjacent thereto, which renders the supercharging pressure unstable and can even badly affect the durability of the engine.

Furthermore, if the supercharging pressure is increased at the start of the engine in cold weather, where the engine operation is unstable, it will cause abnormal combustion within the combustion chamber due to the increased charging efficiency. Therefore, conventionally, the supercharging pressure is decreased at the start of the engine in cold weather and before the engine is warmed up. However, the predetermined temperature, for ascertaining whether or not the engine has been warmed up, is set at a relatively low value corresponding to the temperature of the engine before being warmed up. Therefore, the supercharging pressure starts to be increased before completion of the warming-up of the engine when the engine temperature exceeds the predetermined temperature, and thereafter it is further increased with an increase in the engine rotational speed. As a result, the engine can be brought into a high load condition before being warmed up, also adversely affecting the durability of the engine.

Also, in an internal combustion engine with a supercharger in general, an intercooler is arranged in the intake pipe downstream of the supercharger. The cooling effect of the intercooler varies depending upon running conditions of the vehicle. For example, when the ambient air temperature is low, or when the vehicle is running at a high speed, the cooling effect of the intercooler increases so that the temperature of intake air supplied to the engine becomes too low, which results in an excessive increase in the charging efficiency of the intake air and hence an overload on the engine. This also adversely affects the durability of the engine, To eliminate this disadvantage, it has been proposed, e.g. by Japanese Provisional Patent Publication (Kokai) No. 60-128930, to decrease the supercharging pressure by a predetermined amount when the intake air temperature is extremely low.

However, in actuality, even when the intake air temperature is low, the engine is not overloaded if its rotational speed is low. On the contrary, if the supercharging pressure is decreased irrespective of the engine rotational speed, merely on the condition that the intake air temperature is low, the supercharging pressure will slowly increase at the start of the engine, resulting in an insufficient supercharging effect.

SUMMARY OF THE INVENTION

It is an object of the invention to provide a supercharging pressure control method for internal combustion engines, which is capable of controlling the supercharging pressure so as to decrease the same without causing an abrupt increase therein or overboosting when the transmission is in a predetermined lower speed position or in a state where the gear position thereof is being shifted, thereby enhancing the accelerability of the engine, the controllability of the supercharging pressure, and the durability or life of the engine.

It is a further object of the invention to provide a supercharging pressure control method, which is capable of controlling the supercharging pressure in a stable manner upon transition of the engine operating condition from a particular operating condition to a non-particular operating condition, thereby enhancing the durability or life of the engine.

Another object of the invention is to enhance the durability of life of the engine by properly controlling the supercharging pressure during the warming-up of the engine.

A still further object of the invention is to enhance the supercharging effect at the start of the engine without degrading the durability of the engine.

According to the invention, there is provided a method of controlling supercharging pressure in an internal combustion engine having a transmission and a supercharger, wherein the supercharging pressure created by the supercharger is controlled based upon a basic control amount determined in dependence on operating conditions of the engine, with the basic control amount being corrected in response to a difference between an actual value of the supercharging pressure and a desired value of the same, when the engine is in an operating condition in which the supercharging pressure is controlled in the feedback control mode.

According to the first aspect of the invention, the method is characterized by comprising the following steps:

1) detecting the gear position of the transmission; and 2) when the detected gear position is in a predetermined lower speed position, correcting the basic control amount so that the supercharging pressure is lower than the value assumed when the detected gear position is a higher speed position.

According to the second aspect of the invention, the method is characterized by comprising the following steps:

1) detecting the gear position of the transmission; and 2) when the detected gear position is in a predetermined lower speed position, correcting the desired value of the supercharging pressure to a value which is set lower than the value assumed when the detected gear position is in a higher speed position.

The predetermined gear position of the transmission of the first and second aspects may be a first speed position.

The step 2) of the first and second aspects may be executed when the engine is in a predetermined operating condition, which is a state in which the intake pressure in the engine is higher than a predetermined value, which may be determined in dependence on the rotational speed of the engine.

According to the third aspect of the invention, the method is characterized by comprising the following steps:

1) detecting a rate of increase of the supercharging pressure in a transient state;

2) detecting a gear position of the transmission; and 3) when the detected gear position is in a predetermined lower speed position, correcting the rate of increase of the supercharging pressure in the transient state to a value lower than the value assumed when the detected gear position is in a higher speed position.

The predetermined gear position of the transmission according to the third aspect may be a first speed position.

According to the fourth aspect of the invention, the method is characterized by comprising the following steps:

1) detecting a change in the rotational speed of the engine; and 2) correcting the basic control amount so as to decrease the supercharging pressure when the rotational speed of the engine changes from a state in which it increases to a state in which it decreases.

According to the fifth aspect of the invention, the method is characterized by comprising the following steps:

1) detecting a change in the rotational speed of the engine; and 2) decreasing the desired value of the supercharging pressure when the rotational speed of the engine changes from a state in which it increases to a state in which it decreases.

Step 2) of the fifth aspect may be executed when the opening of a throttle valve of the engine, the rotational speed of the engine, and the intake pressure in the engine exceed respective predetermined values.

According to the sixth aspect of the invention, the method is characterized by comprising the following steps:

1) determining whether or not the engine is in a particular operating condition;

2) when the engine is in the particular operating condition, setting the control amount so that the supercharging pressure is lower than the value assumed when the engine is in an operating condition other than the particular operating condition; and 3) when the engine has left the particular operating condition, maintaining the control amount set in step 2) so that the supercharging pressure is maintained at a lowered value over a predetermined time period after the engine has left the particular operating condition.

The particular operating condition of the engine may be a condition in which the engine is in a cold state, such as a condition in which the temperature of the engine cooling water is below a predetermined value, and a condition in which the temperature of intake air in the engine is below a predetermined value.

The method of the sixth aspect may include the step of determining whether or not the rotational speed of the engine is above a predetermined value, wherein step 3) is executed when the rotational speed of the engine is above the predetermined value.

The predetermined period of time may correspond to a period of time required for warming up the engine.

In the sixth aspect, the control amount may be determined by a basic control amount and a correction value, the method including the steps of:

setting the correction value to an initial value dependent upon the rotational speed of the engine when the predetermined period of time elapses, and holding the correction value at the initial value over a second predetermined period of time, to thereby correct the basic control amount; and gradually returning the control amount to a value assumed when the engine is in an operating condition other than the particular operating condition, after the second predetermined period of time elapses.

According to the seventh aspect of the invention, method is characterized by comprising the following steps:

1) detecting the temperature of the intake air in an intake pipe of the engine downstream of intake air-cooling means arranged in the intake pipe downstream of the supercharger of the engine;

2) detecting the rotational speed of the the engine; and 3) when the detected of the intake air is below a predetermined value, and at the same time the detected rotational speed of the engine is above a predetermined value, setting the supercharging pressure lower than a value assumed when the rotational speed of engine is below the predetermined value.

The above and other objects, features, and advantages of the invention will be more apparent from the ensuing detailed description taken in conjunction with the accompanying drawings.

BRIEF DESCRIPTION OF THE DRAWINGS

FIGS. 5AI and 5AIII (collectively referred to as FIG.5(A)) and 5BI to 5BII (collectively referred to as FIG.5(B)) constitute flowcharts showing a main routine for controlling an electromagnetic control valve in FIG. 1, according to a first embodiment of the invention;

FIGS. 15(a), 15(b) and 15(c), collectively referred to as FIG. 15, are diagrams showing maps of $D_{TRB}$;

FIGS. 16(a), 16(b), and 16(c), collectively referred to as FIG. 16, are similar diagrams to FIGS. 15(a), 15(b) and 15(c), showing maps of a decremental value $\Delta P_{2ST}$;

FIGS. 17(a), 17(b) and 17(c), collectively referred to as FIG. 17, are similar diagrams to FIGS. 15(a), 15(b) and 15(c), showing maps of a decremental valve $\Delta P_{2FB}$;

FIGS. 22A and 22B, collectively referred to as FIG. 22, constitute flowcharts showing a main routine for controlling an electromagnetic valve in FIG. 1;

FIGS. 23A, 23B and 23C, collectively referred to as FIG. 23, constitute a variation of the first embodiment of the invention, showing flowcharts of a main routine for controlling the electromagnetic control valve;

FIGS. 24A and 24B, collectively referred to as FIG. 24, constitute flowcharts showing a main routine for controlling the electromagnetic control valve according to a second embodiment of the invention;

FIG. 25 is a diagram showing a map of a basic duty ratio $D_M$;

FIG. 26 is a flowchart showing a subroutine for determining the gear position of the transmission;

FIGS. 29A and 29B, collectively referred to as FIG. 29, constitute flowcharts showing a subroutine for determining an open loop control region, which is executed at a step S106 in FIG. 24;

FIG. 34 is a diagram showing a map of a desired value $P_{BREF}$ of supercharging pressure;

FIG. 35 is a diagram showing a table of a constant $K_P$ for a proportional control term $K_P$;

FIG. 36 is a diagram showing a table of a constant $K_I$ for an integral control term $K_I$;

FIG. 37 is a diagram showing a map of a learned correction coefficient $K_{MOD}$;

DETAILED DESCRIPTION

Figure 1:
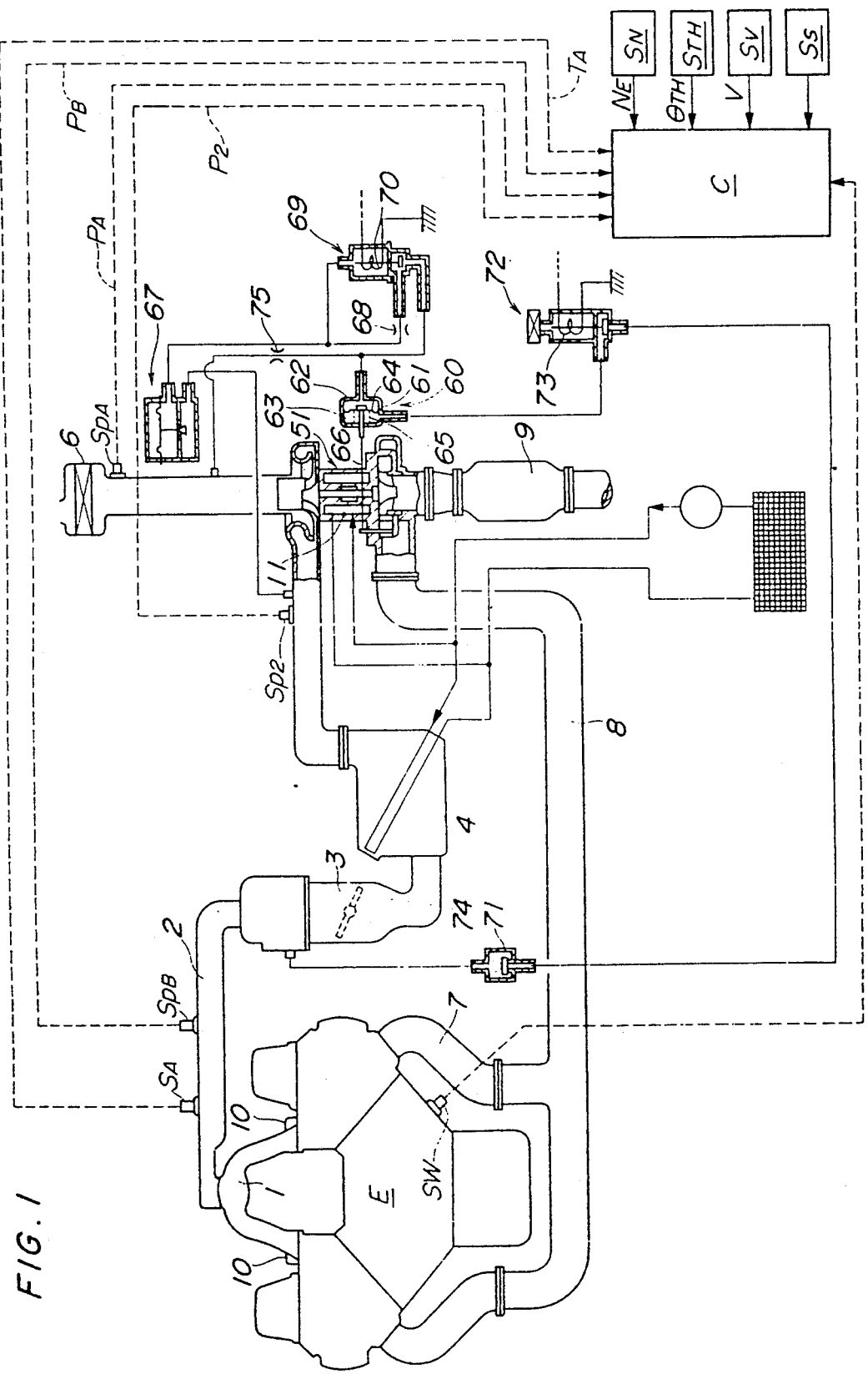
FIG. 1 is a schematic view showing the whole arrangement of the intake system and the exhaust system of an internal combustion engine to which is applied the method according to the invention.

The invention will now be described in detail with reference to the drawings showing embodiments thereof.

Referring first to FIGS. 1 through 4, there is illustrated a supercharging pressure control system for an internal combustion engine, to which is applied the method according to the invention. The engine is of a multiple-cylinder type which has a cylinder block E with a plurality of cylinders, each provided with an intake port, neither of which is shown. Connected to the intake port of each cylinder is an intake manifold 1, to which are connected an intake pipe 2, a throttle body 3, an intercooler 4, a variable capacity type turbocharger 5, and an air cleaner 6 in the order mentioned. Each cylinder has an exhaust port, not shown, to which is connected an exhaust manifold 7. Connected to the exhaust manifold 7 is an exhaust pipe 8 with the turbocharger 5 arranged across an intermediate portion thereof. A three-way catalytic converter 9 is arranged across the exhaust port at a location downstream of the turbocharger 5. Fuel injection valves 10 are mounted in the intake manifold 1 at locations close to the intake ports of the respective cylinders for injecting fuel toward the intake ports.

The turbocharger 5 is provided with a water jacket 11, an inlet of which is connected in parallel with an outlet of a water pump 13, together with an inlet of the intercooler 4. The water jacket 11 and the intercooler 4 have their outlets connected to the radiator 12. The radiator 12 is provided in addition to a radiator, not shown, for cooling coolant supplied into the interior of the cylinder block E of the engine.

Figure 2:
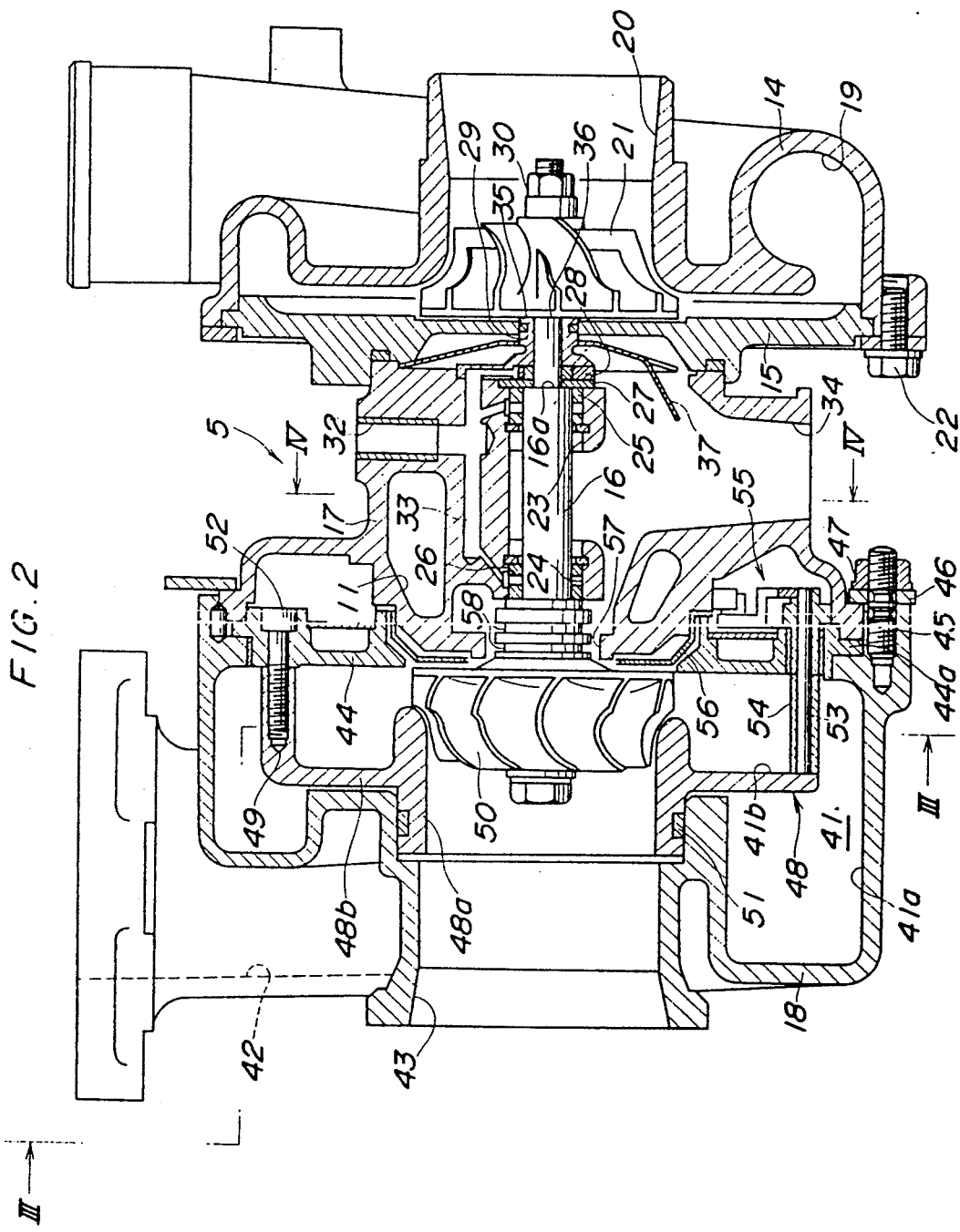
FIG. 2 is an enlarged longitudinal cross-sectional view of a variable capacity turbocharger in FIG. 1.

The structure of the variable capacity type turbocharger 5 will now be explained with reference to FIGS. 2-4. The turbocharger 5 comprises a compressor casing 14, a back plate 15 closing a rear side of the compressor casing 14, a main shaft 16, a bearing casing 17 supporting the main shaft 16, and a turbine casing 18.

A scroll passage 19 is defined between the compressor casing 14 and the back plate 15, and an axially extending inlet passage 20 is defined through a central portion of the compressor casing 14. A compressor wheel 21 is mounted on an end of the main shaft 16 at a central portion of the scroll passage 19 and at an inner end of the inlet passage 20.

The compressor casing 14 and the back plate 15 are fastened together by means of bolts 22. The bearing casing 17 is joined to the back plate 15 at a central portion thereof. The bearing casing 17 is formed therein with a pair of bearing holes 23, 24 in coaxial and spaced in relation to each other, through which the main shaft 16 extends. Interposed between the main shaft 16 and the bearing holes 23, 24 are radial bearings 25, 26 rotatably supporting the main shaft 16 against the bearing casing 17. Interposed between a stepped shoulder 16a of the main shaft 16 facing toward the compressor wheel 21 and the compressor wheel 21 are a collar 27, a thrust bearing 28, and a bushing 29 in the order mentioned as viewed from the stepped shoulder 16a side. By fastening a nut 30 threadedly fitted on an end portion of the main shaft 16 against an outer end of the compressor wheel 21, the main shaft 16 is located in its proper axial position and at the same time the compressor wheel 21 is mounted onto the main shaft 16.

A lubricating oil inlet port 32 is formed in a lateral side wall of the bearing casing 17 and connected to a lubricating oil pump, not shown, and a lubricating oil passage 33 is formed in the bearing casing 17 for guiding lubricating oil from the lubricating oil inlet port 32 to the radial bearings 25, 26 as well as to the thrust bearing 28. The bearing casing 17 has the other lateral side wall formed with a lubricating oil drain port 34 for draining lubricating oil. The drained oil is collected into an oil sump, not shown.

The bushing 29 extends through a through hole 35 formed in a central portion of the back plate 15. A seal ring 36 is interposed between the bushing 29 and the through hole 35 to prevent lubricating oil from flowing from the thrust bearing 28 to the compressor heel 21. A guide plate 37 is interposed between the back plate 15 and the thrust bearing 28, through which the bushing 29 extends, so that lubricating oil flowing from the thrust bearing 28 is guided by the guide plate 37 while it is splashed in the radially outward direction. A free end portion of the guide plate 37 is curved so as to smoothly guide the lubricating oil into the lubricating oil drain port 34.

The bearing casing 17 is further formed therein with the aforementioned water jacket 11 disposed around the main shaft 16, a water supply port 38 for guiding water or coolant from the water pump 13 shown in FIG. 1 to the water jacket 11, and a water drain port 39 for guiding water from the water jacket 11 to the radiator 12 shown in FIG. 1. The water jacket 11 has a portion closer to the turbine casing 18 which is shaped in the form of an annulus surrounding the main shaft 16, and a portion above the lubricating oil drain port 34 and the main shaft 16, which has a generally U-shaped section in a manner downwardly diverging along the main shaft 16 as shown in FIG. 4. The water supply port 38 communicates with a lower portion of the water jacket 11, while the water drain port 39 communicates with an upper portion of the water jacket 11.

The turbine casing 18 is formed therein with a scroll passage 41, an inlet passage 42 tangentially extending from the scroll passage 41, and an outlet passage 43 axially extending from the scroll passage 41.

The bearing casing 17 and the turbine casing 18 are joined together with a back plate 44 held therebetween. That is, the two members are fastened together by tightening nuts 47 via rings 46 onto respective stud bolts 45 screwed in the turbine casing 18, with a radial flange 44a at the periphery of the back plate clamped between the two members.

Secured to the back plate 44 is a stationary vane member 48 which divides the interior of the scroll passage 41 into a radially outer passage 41a, and a radially inner or inlet passage 41b. The stationary vane member 48 comprises a cylindrical hub portion 48a coaxially fitted in the outlet passage 43 via a seal ring 51, an annular radial portion 48b radially outwardly extending from an axially intermediate portion of the cylindrical hub portion 48a, a plurality of, e.g. four stationary vanes 49 axially extending from an outer peripheral edge of the annular radial portion 48b and secured to the back plate 44 by means of bolts 52. A turbine wheel 50 is accommodated within the stationary vane member 48, which is secured on the other end of the main shaft 16.

The stationary vanes 49 are circumferentially arranged at equal intervals, each being arcuate in shape. Disposed between adjacent stationary vanes 49 are movable vanes 54 with one end thereof secured to respective rotary shafts 53 rotatably supported by the back plate 44 with their axes extending parallel with that of the main shaft 16. The movable vanes 54 act to adjust the opening area of spaces (hereinafter called "the space area") between adjacent stationary and movable vanes 49, 54.

Figure 3:
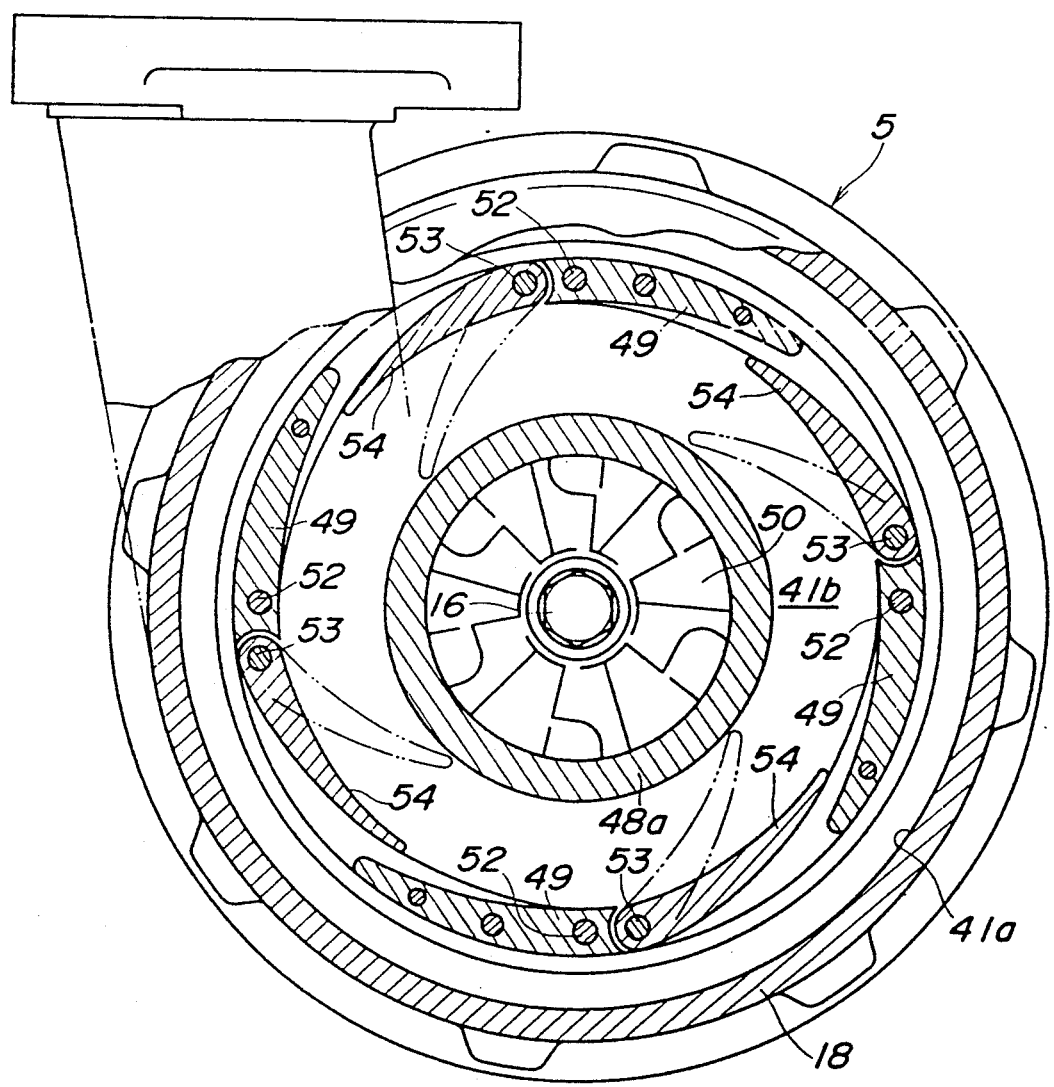
FIG. 3 is a transverse cross-sectional view taken on line III—III of FIG. 2.
Figure 4:
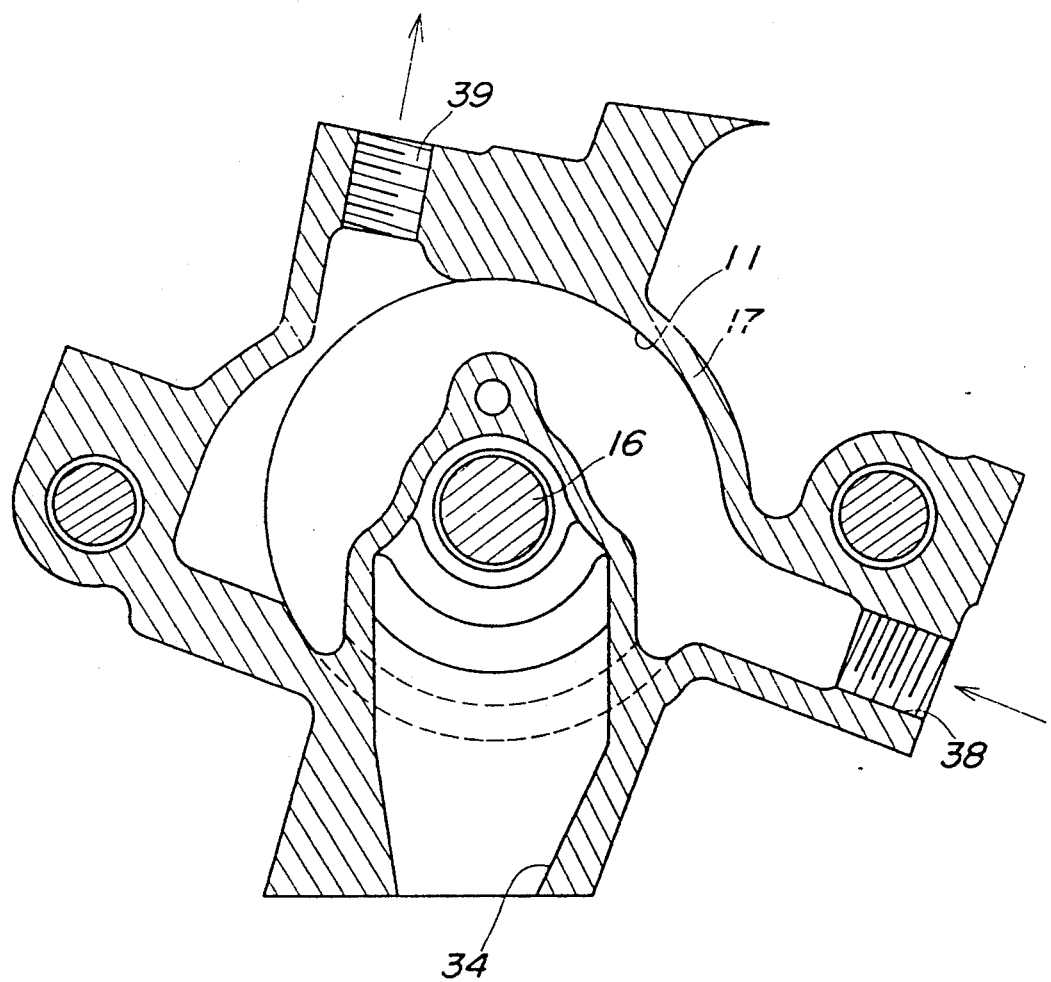
FIG. 4 is a transverse cross-sectional view taken on line IV—IV of FIG. 2.

Each movable vane 54 is also arcuate in shape, with almost the same curvature as the stationary vanes 49, and pivotable between a fully closed position shown by the solid line in FIG. 3 and a fully open position shown by the broken line in the figure. The rotary shafts 53 are operatively connected to an actuator 60 in FIG. 1 by means of a link mechanism 55 disposed between the back plate 44 and the bearing casing 17 so that the movable vanes 54 are simultaneously controlled to open and close by the actuator 60.

Interposed between the back plate 44 and the bearing casing 17 is a shield plate 56 extending along a rear end face of the turbine wheel 50, for preventing the heat of exhaust gases from the engine flowing in the inlet passage 41b from being directly transmitted to the interior of the bearing casing 17. A plurality of annular grooves 58 are formed as labyrinth grooves in the outer peripheral surface of the main shaft 6 at a location corresponding to a through hole 57 formed in the bearing casing 17 and penetrated by an end of the main shaft 16. These grooves 58 serve to prevent exhaust gases from leaking into the bearing casing 17.

With the above described arrangement, exhaust gases emitted from the engine cylinder block E flow into the radially outer passage 41a through the inlet passage 42, and then flow into the inlet passage 41b at a rate of flow corresponding to the area of space between the movable vanes 54 and the stationary vanes 49, which is determined by the angle of the movable vanes 54. As the exhaust gases flow into the inlet passage 41b, they drive the turbine wheel 50 to rotate. Then, the gases are discharged through the outlet passage 43. As the area of space between the movable and stationary vanes 54, 49 decreases, the rotational speed of the turbine wheel 50 and hence that of the main shaft 16 increases; whereas as the opening area increases, the rotational speed decreases. The rotation of the turbine wheel 50 causes the rotation of the compressor wheel 21 so that air introduced into the inlet passage 20 through the air cleaner 6 is compressed by the rotating compressor wheel 21 and forced to pass through the scroll passage 19 toward the intercooler 4. When the movable vanes 54 are moved into the radially outermost position so that the area of space between the movable and stationary vanes 54, 49 becomes the minimum, the supercharging pressure becomes the maximum; whereas when the movable vanes 54 assume the radially innermost position and hence the opening area becomes the maximum and the supercharging pressure becomes the minimum.

Water supplied into the water jacket 11 serves to prevent the temperature of the bearing casing 17 from becoming excessively high due to the increased temperature of the air compressed by the turbocharger 5, while water supplied to the intercooler 4 serves to prevent the intake air temperature from increasing.

Referring again to FIG. 1, the actuator 60, which drives the movable vanes 54 of the turbocharger 5, comprises a housing 61, a diaphragm dividing the interior of the housing 61 into a first pressure chamber 62 and a second pressure chamber 63, a return spring 65 interposed between the housing and the diaphragm 64 and urging the diaphragm 64 in a direction causing the first pressure 62 to contract, and a driving rod 66 airtightly and movably extending through the housing 61, with one end thereof connected to the diaphragm 64 and the other end to the link mechanism 55. The driving rod 66 and the link mechanism 55 are connected to each other in such a manner that when the driving rod 66 is moved by the diaphragm 64, which is displaced in a direction causing the second pressure chamber 63 to contract, the movable vanes 54 are radially inwardly pivoted in the turbine casing 18 causing an increase in the area of space between the movable and stationary vanes 54, 49.

The first pressure chamber 62 is connected to a portion of the intake passage between the turbocharger 5 and the intercooler 4 via a regulator 67, a restriction 68, and an electromagnetic control valve 69, to be supplied with supercharging pressure $P_2$ therefrom, and is also connected to another portion of the intake passage between the air cleaner 6 and the turbocharger 5. The electromagnetic control valve 69 is of a normally-closed duty control type with a solenoid 70. As the valve-closing duty ratio for the solenoid 70 decreases, the pressure within the first pressure chamber 62 increases and causes the same to be transmitted through the driving rod 66 and the link mechanism 55 to cause the movable vanes 54 to be radially inwardly pivoted, i.e. toward the closing side. The second pressure chamber 63 is connected to a portion of the intake passage downstream of the throttle body 3 through a check valve 71 and an electromagnetic valve 72 to be supplied with intake pressure $P_B$ therefrom. The electromagnetic valve 72 is of a normally-closed type which opens when its solenoid 73 is energized. When the valve 72 is open, intake pressure PB is supplied into the second pressure chamber 63 so that the actuator 60 drives the movable vanes 54 to be radially inwardly displaced.

The electromagnetic valves 69, 72 are controlled by an electronic control unit (control means) C, to which are connected a water temperature sensor $S_W$ for sensing the temperature $T_W$ of cooling water in a water jacket, not shown, provided in the engine cylinder block E, an intake air temperature sensor $S_A$ for sensing the temperature $T_A$ of intake air in the intake passage downstream of the intercooler 4, an intake pressure sensor $S_{PA}$ for sensing intake pressure $P_A$ in the intake passage at a location between the air cleaner 6 and the turbocharger 5, a supercharging pressure sensor $S_{P2}$ for sensing supercharging pressure $P_2$ in the intake passage at a location between the turbocharger 5 and the intercooler 4, an intake pressure sensor $S_{PB}$ for sensing intake pressure $P_B$ in the intake passage downstream of the throttle body 3, an engine speed sensor $S_N$ for sensing the rotational speed $N_E$ of the engine, a throttle valve opening sensor $S_{TH}$ for sensing the valve opening $\theta_{TH}$ of a throttle valve 74 within the throttle body 3, a vehicle speed sensor $S_V$ for sensing the speed V of a vehicle in which the engine is installed, and a gear position sensor $S_S$ for sensing the gear position of an automatic transmission connected to the engine. The control unit C operates in response to the input signals from these sensors to control the energization and deenergization of the solenoids 70, 73 of the electromagnetic valves 69, 72.

Next, the manner of control by the control unit C will be described below. First, the control of duty ratio of the solenoid 70 of the electromagnetic control valve 69 will be described with reference to a main routine shown in FIGS. 5A and 5B, according to a first embodiment of the invention. The valve-closing duty ratio $D_{OUT}$ represents the ratio of valve-closing time to the time period of one cycle over which the valve 69 is opened and closed. Therefore, as the duty ratio $D_{OUT}$ is increased, the opening degree of the movable vanes 54 is decreased, and $D_{OUT}=0\%$ corresponds to the maximum opening degree of the movable vanes 54 while $D_{OUT}=100\%$ corresponds to the minimum opening degree of same.

At step S1, it is determined whether or not the engine is in starting mode, i.e. the engine is cranking. If the engine is in starting mode, the program proceeds to step S2, where a timer $t_{BTWC}$ is reset. The timer $t_{BTWC}$ is for counting the time period $t_{BTWCO}$ (e.g. 96 sec.) required to determine when warming-up of the engine has been completed. Then, at step S3, a $t_{FBDLY}$ timer for counting a time period $t_{FBDLY}$ by which the start of the feedback control is delayed is reset. And then, the duty ratio $D_{OUT}$ is set to 0%, i.e. the electromagnetic control valve 69 is fully opened to set the maximum area of space between the movable vanes 54 and the stationary vanes 49 (step S4). The engine is unstable during cranking, and if supercharging pressure is introduced into the combustion chambers while the engine is in such an unstable state, the engine will become more unstable. Therefore, in the above step S2, the area of space between the movable vanes 54 and the stationary vanes 49 is made the maximum to thereby prevent supercharging pressure from being introduced into the combustion chambers. Further, a driver of the vehicle does not demand supercharging of intake air during cranking, and therefore it is not necessary to reduce the area of space between the movable vanes 54 and the stationary vanes 49. At step S5, the duty ratio $D_{OUT}$ is outputted.

Figure 6:
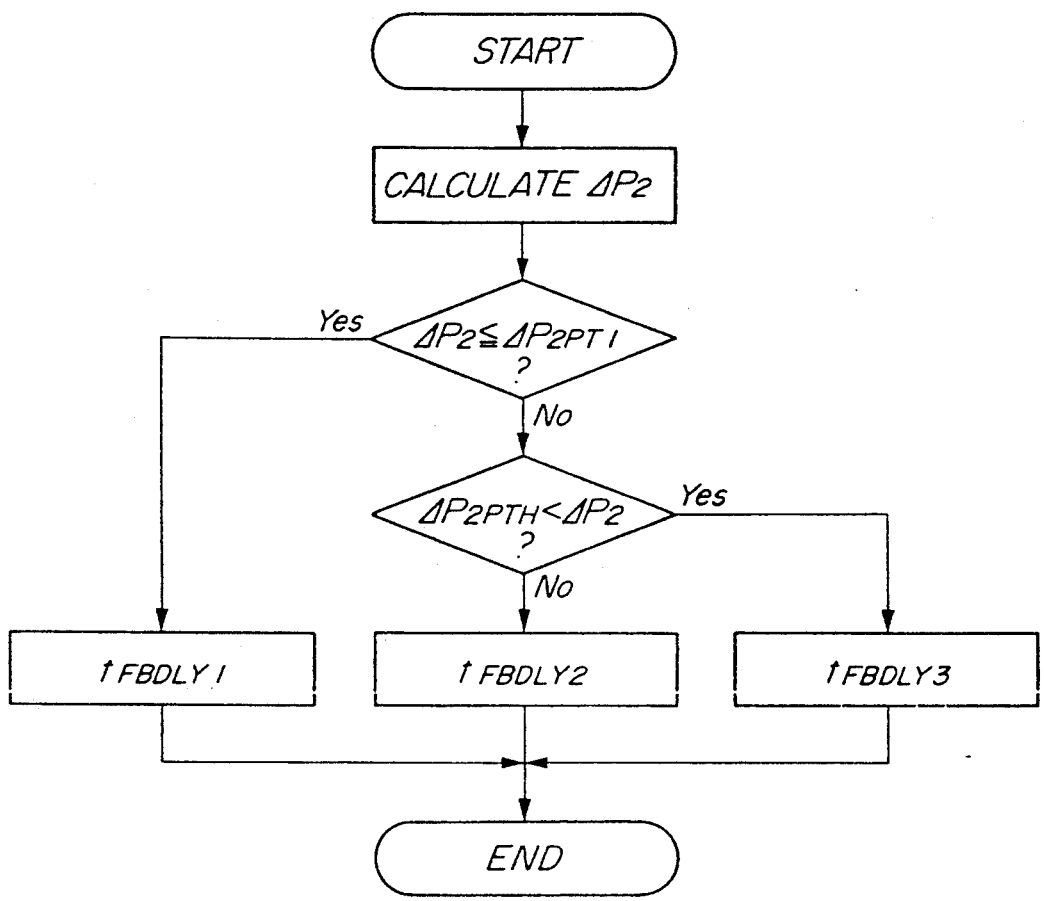
FIG. 6 is a flowchart showing a subroutine for selecting a time period to be counted by a timer.

The time period $t_{FBDLY}$ is calculated in a manner shown in FIG. 6. Depending upon the rate of change $\Delta P_2$ in the supercharging pressure $P_2$, one of three time periods $t_{FBDLY1}$, $t_{FBDLY2}$, and $t_{FBDLY3}$ is selected as $t_{FBDLY}$. The rate of change $\Delta P_2$ is calculated as the difference ($\Delta P_2 = P_{2n} - P_{2n-6}$) between the supercharging pressure $P_{2n}$ detected in the present loop and the supercharging pressure $P_{2n-6}$ detected in the sixth loop before the present loop. More specifically, the main routine shown in FIGS. 5A and 5B is carried out in synchronism with generation of TDC signal pulses. However, since the rate of change $\Delta P_2$ in supercharging pressure $P_2$ between two adjacent TDC signal pulses is too small for accurate detection of the rate of change $\Delta P_2$, the difference between the $P_{2n}$ detected in the present loop and the $P_{2n-6}$ detected in the sixth loop before the present loop is calculated in order to detect the supercharging characteristic or the rate of change $\Delta P_2$ more accurately. A predetermined lower rate of change $\Delta P_{2PTL}$ and a predetermined higher rate of change $\Delta P_{2PTH}$ are provided which are determined in accordance with the engine rotational speed $N_E$. If $\Delta P_2 \leq \Delta P_{2PTL}$, $t_{FBDLY1}$ is selected; if $\Delta P_{2PTL} < \Delta P_2 \leq \Delta P_{2PTH}$, $t_{FBDLY2}$ is selected; and if $\Delta P_{2PTH} < \Delta P_2$, $t_{FBDLY3}$ is selected. Further, the three time periods are in the relationship of $t_{FBDLY1} < t_{FBDLY2} < t_{FBDLY3}$. Therefore, when the rate of change $\Delta P_2$ is small, i.e. the supercharging pressure undergoes a gentle change, the delaying time is set to a lower value, and when the rate of change $\Delta P_2$ is great, i.e. the supercharging pressure undergoes a drastic change, the delaying time is set to a larger value. This makes it possible to set the delaying time period $t_{FBDLY}$ to an appropriate value when the operating mode is shifting from open loop mode to feedback control mode, to thereby positively prevent occurrence of hunting of the supercharging pressure during the transitional state of the operating mode.

If it is determined at step S1 that the engine is not in the starting mode, the program proceeds to a step S6, where it is determined whether or not the TDC signal pulse inputted in the present loop is the first one after control in a basic mode has been started, that is, the present loop is the first loop after the basic mode control has been started. If it is determined that the present loop is the first loop, the program proceeds to a step S7; whereas if the present loop is not the first loop, the program proceeds to a step S11. At the step S7, it is determined whether or not the intake air temperature $T_A$ is above a predetermined lower value $T_{AL}$ (e.g. $-8°$ C.). If $T_A > T_{AL}$, the program proceeds to a step S8; whereas if $T_A \leq T_{AL}$, the program proceeds to a step S10. At the step S8, it is determined whether or not the cooling water temperature $T_W$ is above a predetermined lower value, (e.g. 60° C.). If $T_W > T_{WL}$, the program proceeds to a step S9; whereas if $T_W \leq T_{WL}$, the program proceeds to the step S10.

At the step S9, the timer $t_{BTWC}$ is set to a value FF larger than the predetermined time period $t_{BTWCO}$ (e.g. 96 sec.), followed by proceeding to a step S13, while at the step S10, the timer $t_{BTWC}$ is reset, followed by the program proceeding to the step S3.

That is, if $T_A > T_{AL}$ and at the same time $T_W > T_{WL}$, it is determined that the engine is in an operating condition after completion of warming-up thereof; so that the timer $t_{BTWC}$ is set to the time period FF larger than the predetermined time period $t_{BTWCO}$; whereas if at least one of the conditions of $T_A \leq T_{AL}$ and $T_W \leq T_{WL}$ is fulfilled, the timer $t_{BTWC}$ is reset to start counting. Thus, the time period, for determining that the warming-up of the engine has been completed, starts to be counted after the basic mode control has been started.

At the step S11, it is determined whether or not the intake air temperature $T_A$ is below the predetermined lower value $T_{AL}$. If $T_A < T_{AL}$, the program proceeds to a step S2, while if $T_A \geq T_{AL}$, the program proceeds to a step S12. At the step S12, it is determined whether or not the cooling water temperature $T_W$ is below the predetermined lower value $T_{WL}$. If $T_W < T_{WL}$, the program proceeds to the step S2, while if $T_W \geq T_{WL}$, the program proceeds to the step S13. That is, if it is determined at the step S6 that the present loop is not the first loop, then the intake air temperature $T_A$ and the cooling water temperature $T_W$ are compared with the respective predetermined values at the steps S11 and S12, followed by the program proceeding to the step S2 or S13 in accordance with the results of the respective determinations.

The possible operating conditions of the engine which satisfy $T_W < T_{WL}$ and $T_A < T_{AL}$ are, for example, those in which the engine is at an early stage of starting or the ambient air temperature is very low. At the early stage of starting, the operation of the engine is unstable, while when the ambient air temperature is very low, the intake air density is high to increase the charging efficiency, which may result in abnormal combustion of the engine. If supercharging pressure is introduced into the combustion chambers under such a cold state of the engine, the operation of the engine may be even more unstable, and the abnormal combustion may be promoted. Further, at an extremely low temperature, there is a possibility of malfunctioning of the electromagnetic valve 69, that is, the electromagnetic valve 69 may not behave in accordance with instructions from the control unit C. Therefore, if $T_W < T_{WL}$ and/or $T_A < T_{AL}$, the program proceeds through the steps S2, S3 to the step S4 to set $D_{OUT}$ to 0%.

At the step S13, it is determined whether or not the engine rotational speed $N_E$ is above a predetermined value $N_{DO}$ (e.g. 500 rpm). If $N_E > N_{DO}$, the program proceeds to a step S14, while if $N_E \leq N_{DO}$, the program skips over the step S14 to a step S15. At the step S14, it is determined whether or not the timer $t_{BTWC}$ has counted up the predetermined time period $t_{BTWCO}$ required to determine that warming-up of the engine has been completed. If $t_{BTWC} > t_{BTWCO}$, the program proceeds to the step S15, while if $t_{BTWC} \leq t_{BTWCO}$, the program proceeds to the step S3.

As described above, if the cooling water temperature $T_W$ is below the predetermined lower value $T_{WL}$, the duty ratio $D_{OUT}$ is set to 0% to thereby decrease the supercharging pressure $P_2$; while even if the cooling water temperature $T_W$ is above the predetermined lower value $T_{WL}$, when the engine rotational speed $N_E$ is above the predetermined value $N_{DO}$, $D_{OUT}$ is maintained at 0% until the predetermined time period $t_{BTWCO}$ elapses. Consequently, even if the engine rotational speed is increased during warming-up of the engine, the supercharging pressure is not increased.

At the step S15, it is determined whether or not the intake air temperature $T_A$ is above a predetermined higher value $T_{AH}$ (e.g. 100° C.). If $T_A > T_{AH}$, the program proceeds to the step S3, while if $T_A \leq T_{AH}$, the program proceeds to a step S16.

At the next step S16, it is determined whether or not the engine coolant temperature $T_W$ exceeds a predetermined higher value $T_{WH}$ (e.g. 120° C.). If $T_W > T_{WH}$, the program proceeds to the step S3. The possible operating conditions which satisfy $T_A > T_{AH}$ and $T_W > T_{WH}$ are, for example, those in which the engine has been continuously operating under a high load condition, or the ambient air temperature is very high, or the engine coolant system of the engine cylinder block E is malfunctioning. Under such high temperature conditions of the engine, the intake air density is low to decrease the charging efficiency, which may also result in abnormal combustion such as misfiring. If supercharging pressure is introduced into the combustion chambers when the engine is under such unstable operating conditions, the engine operation will be made even more unstable. Therefore, at the step S4, the duty ratio $D_{OUT}$ is set to 0. Further, when the ambient air temperature is very high, the inductance of the solenoid 70 is liable to change, so that it may behave differently from a predetermined behavior under normal induction conditions. Also for the purpose of avoiding this, the program proceeds to the step S4.

Figure 7:
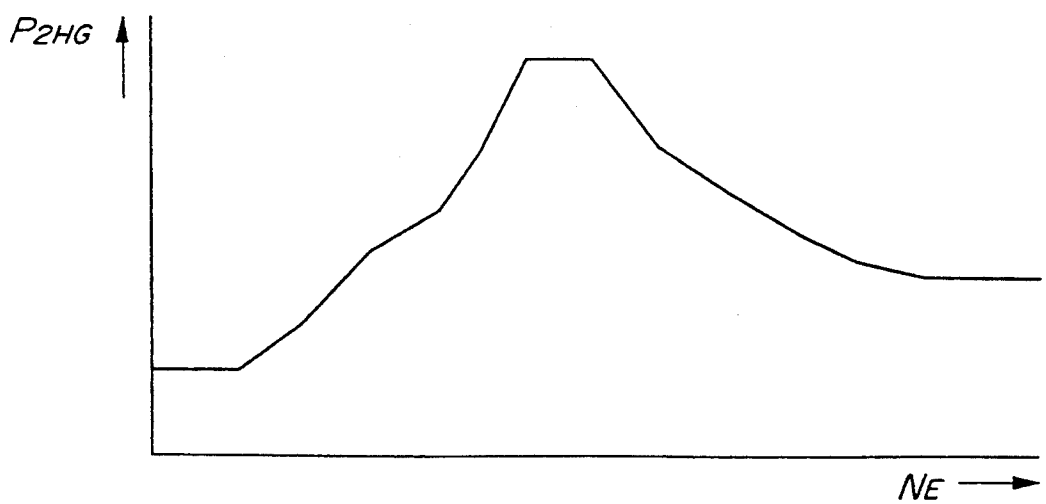
FIG. 7 is a graph showing the relationship between a high supercharging pressure-discriminating value $P_{2HG}$ and the engine rotational speed Ne.

At the step S16, if $T_W \leq T_{WH}$, the program proceeds to a step S17. At the step S17, it is determined whether or not supercharging pressure exceeds a predetermined high supercharging pressure-discriminating value $P_{2HG}$ set as shown in FIG. 7. If $P_2 > P_{2HG}$, the program proceeds to the step S3. If $P_2 \leq P_{2HG}$, the program proceeds to a step S18. The predetermined high supercharging pressure-discriminating value $P_{2HG}$ is set in accordance with the engine rotational speed $N_E$. The value $P_{2HG}$ is provided in order that the supercharging pressure may not be higher than a limit value of the amount of advancement of ignition timing above which knocking can take place, the limit value corresponding to the engine rotational speed $N_E$ so as to ensure attainment of the maximum output of the engine immediately under the limit value. When the engine rotational speed $N_E$ is in a low range, where the transmission is set into a low speed position, the torque which is applied to the transmission component parts increases; whereas when the engine rotational speed $N_E$ is in a high engine rotational speed range, knocking can occur, adversely affecting the durability of the engine. Therefore, $P_{2HG}$ is set to values lower than a medium engine rotational speed range. If the supercharging pressure $P_2$, which exceeds the high supercharging pressure-discriminating value $P_{2HG}$, is detected, the program proceeds through the step S to the step S4, where the duty ratio $D_{OUT}$ is set to 0% and whereby the supercharging pressure $P_2$ is decreased, and at the same time fuel injection is inhibited.

At the step S18, a basic duty ratio $D_M$ is determined as a basic supercharging pressure control amount. The basic duty ratio $D_M$ is searched from a map in accordance with the engine rotational speed $N_E$ and the throttle valve opening $\theta_{TH}$, whereby it is made possible to accurately determine operating conditions of the engine. This is because it is impossible to accurately determine decelerating or transitional operating conditions of the engine by the use of the engine rotational speed $N_E$ alone or the throttle valve opening $\theta_{TH}$ alone. In this embodiment, the throttle valve opening $\theta_{TH}$ is adopted as a parameter representative of load on the engine. However, it may be replaced by the intake pressure $P_B$ or the fuel injection amount.

At a step S19, it is determined whether or not the automatic transmission is in a first speed position. If the automatic transmission is in the first speed position, the program proceeds to a step S20, and if the transmission is in a position other than the first speed position, the program proceeds to a step S21.

Figure 8:
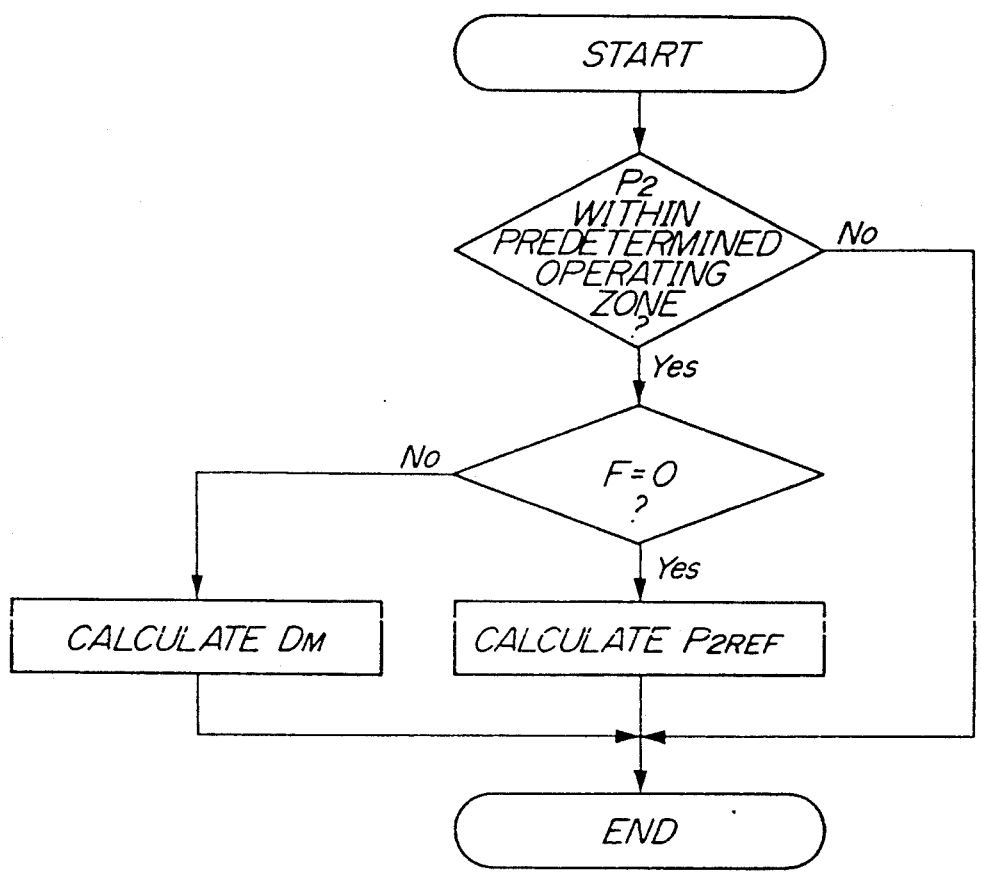
FIG. 8 is a flowchart showing a subroutine for subtraction from a basic duty ratio and from desired supercharging pressure, which is executed when the transmission is in the first speed position.
Figure 9:
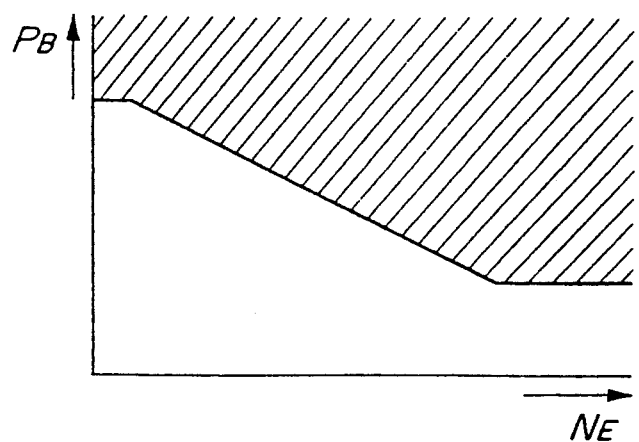
FIG. 9 is a diagram showing a predetermined operating zone to be discriminated in the subroutine shown in FIG. 8.

At the step S20, subtraction is effected from the basic duty ratio $D_M$ in accordance with a subroutine shown in FIG. 8. More specifically, a predetermined operating zone is provided as shown by hatching in FIG. 9, which is determined by the engine rotational speed $N_E$ and the intake pressure $P_B$, in which zone subtraction from the basic duty ratio $D_M$ should be effected. Depending on whether or not the operating condition of the engine is within this predetermined operating zone, it is determined whether or not subtraction should be effected from the basic duty ratio $D_M$. In FIG. 9, the torque of the engine is determined based upon the engine rotational speed $N_E$ and the intake pressure $P_B$, and the border line of the predetermined operating zone indicates the maximum allowable torque amount applied to the gear shaft of the transmission when the transmission is in the first speed position. In other words, in order to prevent excessive load on the gear shaft when the transmission is in the first speed position, the torque of the engine in each operating region is monitored accurately by the use of the engine rotational speed $N_E$ and the intake pressure $P_B$. If the operating condition of the engine is outside of the predetermined operating zone, the program proceeds to a step 22 without correcting the basic duty ratio $D_M$, whereas if the operating condition of the engine is within the predetermined operating zone, it is determined whether or not a flag F is 0, i.e. the engine is in the feedback control mode. If the engine is in the open loop control mode, subtraction of $D_M = D_M - D_F$ is carried out. If the engine is in the feedback control mode, subtraction of $P_{2REF} = P_{2REF} - \Delta P_{2REFF}$ is carried out. $D_F$ is a predetermined decremental value, $P_{2REF}$ is a desired value of supercharging pressure used in the feedback control mode, and $\Delta P_{2REFF}$ is also a predetermined decremental value.

Figure 10:
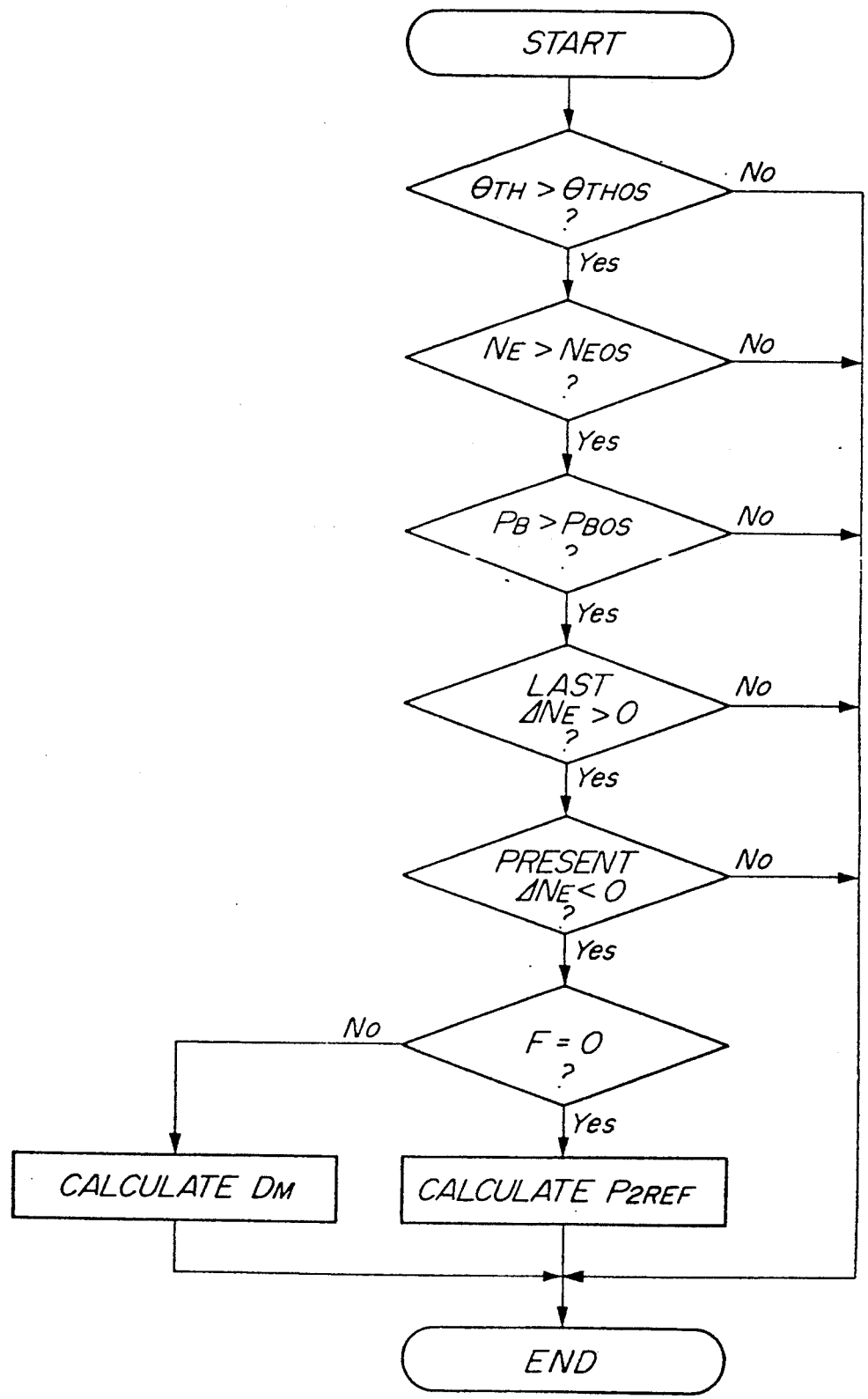
FIG. 10 is a flowchart showing a subroutine for subtraction from the basic duty ratio and from the desired supercharging pressure, which is executed when the transmission is in a position other than the first speed position.

At the step S21, subtraction is effected from the basic duty ratio $D_M$ in accordance with a subroutine shown in FIG. 10. More specifically, if the throttle valve opening $\theta_{TH}$ is above a predetermined value $\theta_{THOS}$, the engine rotational speed $N_E$ is above a predetermined value $N_{EOS}$, the intake pressure $P_B$ is above a predetermined value $P_{BOS}$, rate of change $\Delta N_E$ of the engine rotational speed $N_E$ detected in the last loop is positive, and the rate of change $\Delta N_E$ of the engine rotational speed $N_E$ detected in the present loop is negative, subtraction of $D_M = D_M - D_{OS}$ is carried out in the open loop control mode, and subtraction of $P_{2REF} = P_{2REF} - \Delta P_{2REFOS}$ is carried out in the feedback control mode. Otherwise, the program proceeds to the step S22 without correcting the basic duty ratio $D_M$. $D_{OS}$ and $\Delta P_{2REFOS}$ are predetermined decremental values.

At the step S22 are searched a duty ratio correction coefficient $K_{MODij}$, an atmospheric pressure-dependent correction coefficient $K_{PATC}$ (0.8 to 1.0), and an intake air temperature-dependent correction coefficient $K_{TATC}$ (0.8 to 1.3). The duty ratio correction coefficient $K_{MODij}$ is searched from a map of the engine rotational speed $N_E$ and the intake air temperature $T_A$. As described later, the correction coefficient $K_{MODij}$ is learned when the actual supercharging pressure $P_2$ is within a predetermined difference range about the desired supercharging pressure value, and renewed to an up-to-date learned value. The initial value of the correction coefficient $K_{MODij}$ is set to 1. The atmospheric pressure-dependent correction coefficient $K_{PATC}$ is determined by the atmospheric pressure $P_A$. The intake air temperature-dependent correction coefficient $K_{TATC}$ is determined by the intake air temperature $T_A$.

Figure 11:
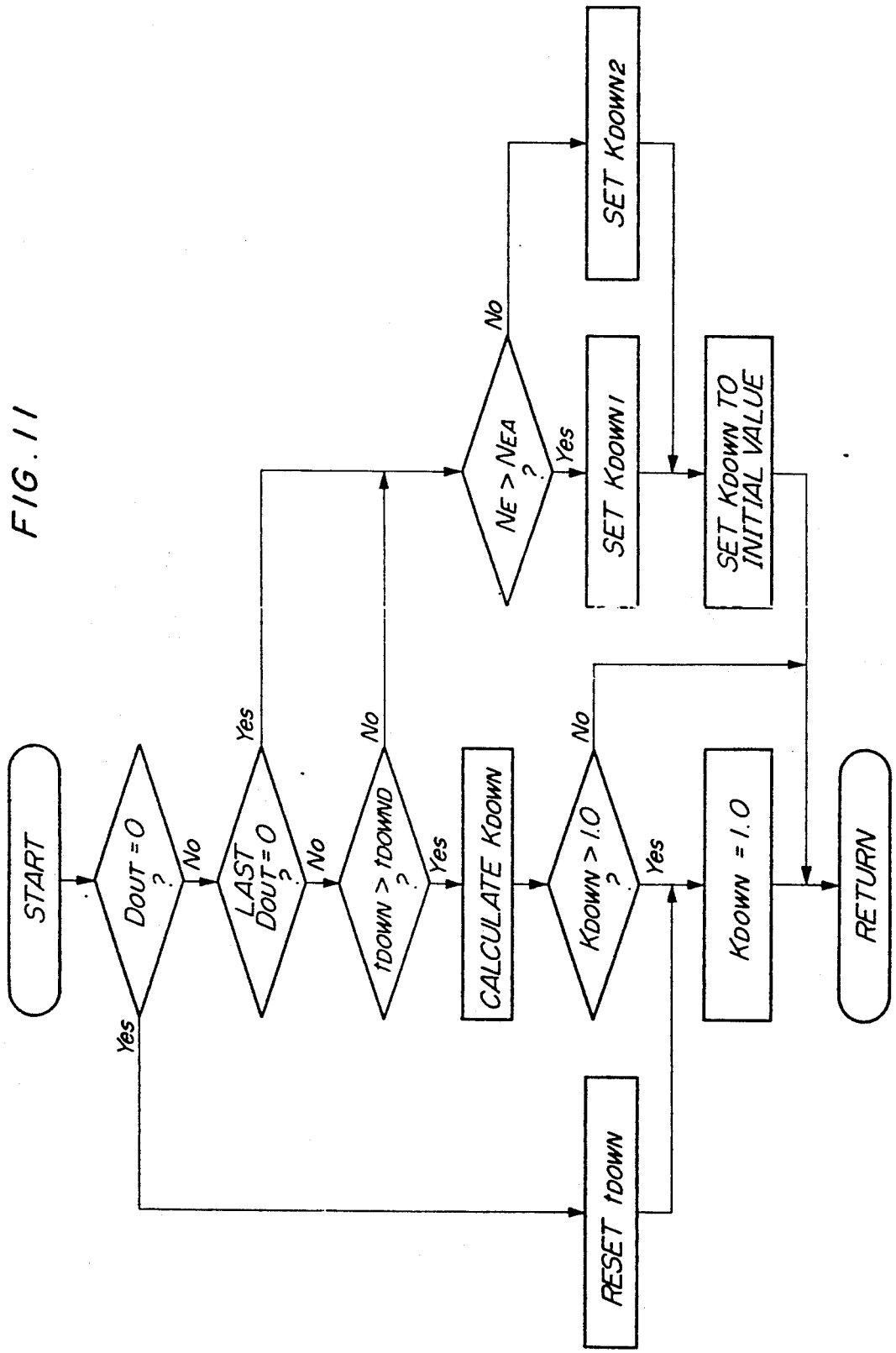
FIG. 11 is a flowchart showing a subroutine for determining a correction coefficient $K_{DOWN}$ applied at the time of departure from a particular operating condition of the engine.

At a step S23 following the step 22, a correction coefficient $K_{DOWN}$ is searched in accordance with a subroutine shown in FIG. 11. This subroutine is executed by interrupting the main routine shown in FIGS. 5A and 5B, in synchronism with generation of each pulse of the TDC signal. When the duty ratio $D_{OUT}$ is 0%, a timer $t_{DOWN}$ is reset. The correction coefficient $K_{DOWN}$ is set to an initial value upon generation of the first TDC signal pulse after the duty ratio $D_{OUT}$ becomes more than 0%. The initial value is determined depending on the engine rotational speed $N_E$. When $N_E$ exceeds a predetermined value $N_{EA}$, e.g. 3000 rpm, the initial value is set to a value $K_{DOWN1}$, e.g. 0.5; whereas when $N_E$ is below the predetermined value $N_{EA}$, it is set to a value $K_{DOWN2}$, e.g. 0.6. Further, after the predetermined time period $t_{DOWN}$, e.g. 5 sec., has elapsed, the correction coefficient $K_{DOWN}$ is renewed by being increased by an additional value $\Delta K_{DOWN}$, e.g. 0.01 whenever each TDC signal pulse is generated. If the correction coefficient $K_{DOWN}$ exceeds 1.0, it is set to 1.0.

The correction coefficient $K_{DOWN}$, determined as above, is substituted into an equation for correcting the duty ratio $D_{OUT}$ to control the same so as to gently vary when the duty ratio is released from a condition in which it is forced to be 0% when the engine is in a particular operating condition in which the intake air temperature $T_A$ and the cooling water temperature $T_W$/are too high or too low, and the supercharging pressure $P_2$ is to high. More specifically, when the engine has returned to a normal operating condition from the particular condition in which $D_{OUT} = 0\%$, if $D_{OUT}$ is immediately set to a normal value other than 0%, the $D_{OUT}$ value will vary unstably as the engine shifts between the normal and particular operating conditions, resulting in unstable control of the supercharging pressure. In order to avoid such unstable control, the correction coefficient $K_{DOWN}$ is gradually increased in each loop by e.g. 0.01, after the predetermined time period, e.g. five seconds have elapsed since the engine returned to the normal operating condition.

At the step S24, it is determined whether or not the throttle valve opening $\theta_{TH}$ is above a predetermined value $\theta_{THFB}$. This predetermined value $\theta_{THFB}$ is for determining whether the control mode should be shifted from the open loop control mode to the feedback control mode. By adopting the throttle valve opening $\theta_{TH}$ as the detemining parameter, it is possible to accurately determine whether the driver of the vehicle demands acceleration, i.e. supercharging. If $\theta_{TH} \leq \theta_{THFB}$, i.e. if the open loop control is to be continued, the $t_{FBDLY}$ timer shown in FIG. 6 is reset at a step S25, and then the program proceeds to a step S26.

Figure 12:
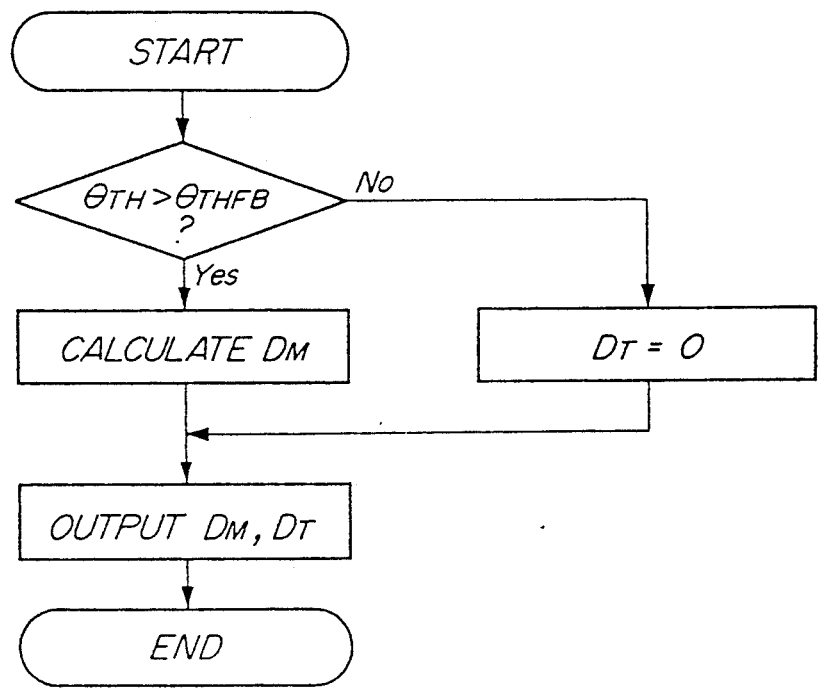
FIG. 12 is a flowchart showing a subroutine for determining a decremental value $D_T$.

At the step S26 are searched a decremental value $D_T$, and an incremental value $D_{TRB}$. The decremental value $D_T$ is determined depending upon a rate of change $\Delta P_2$ of the supercharging pressure $P_2$, in accordance with a subroutine in FIG. 12. More specifically, if the throttle valve opening $\theta_{TH}$ is larger than the predetermined value $\theta_{THFB}$, the decremental value $D_T$ is determined by the rate of change $\Delta P_2$ of supercharging pressure $P_2$ and the engine rotational speed $N_E$ as shown in (a), (b), and (c) of FIG. 13. If $\theta_{TH} \leq \theta_{THFB}$, $D_T$ is set to 0%.

Figure 13:
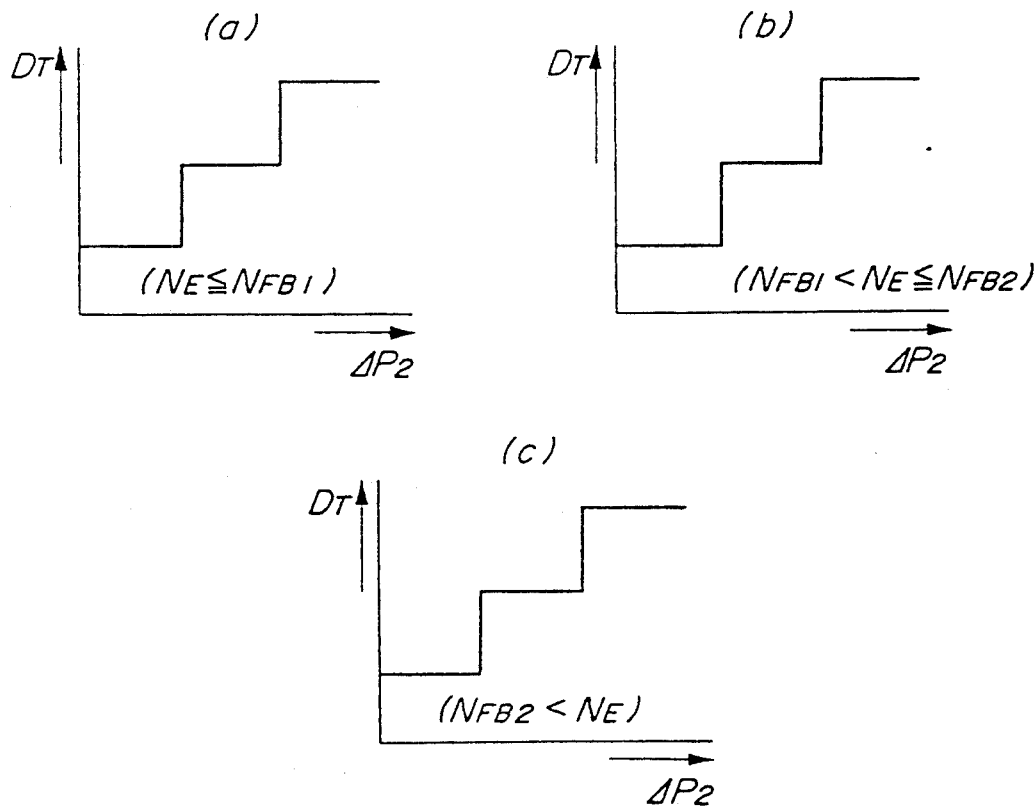
FIGS. 13(a), 13(b) and 13(c), collectively referred to as FIG. 13, constitute diagrams showing a map of the decremental value.
Figure 21:
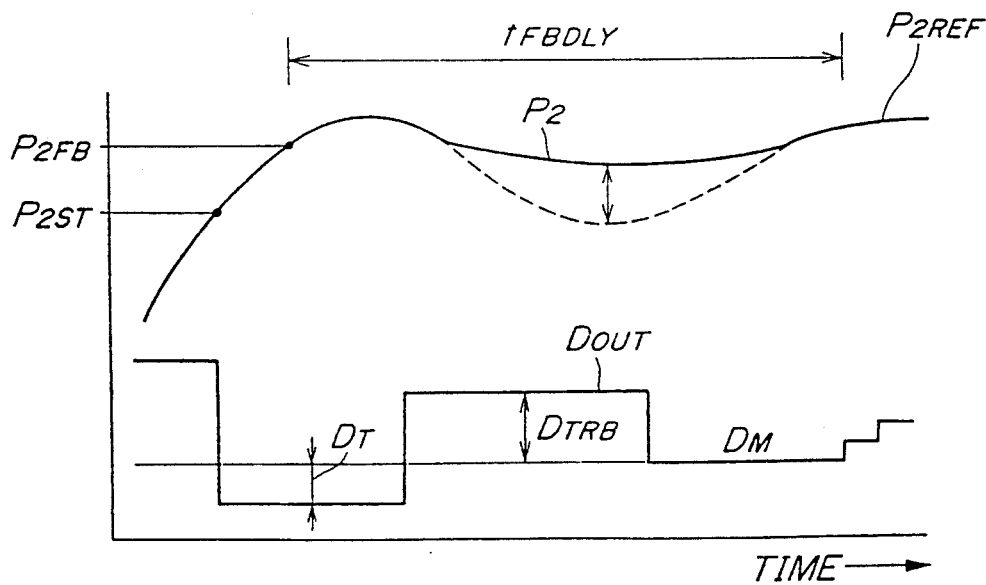
FIG. 21 is a diagram showing changes in the duty ratio and supercharging pressure, which can take place when the control mode is shifted from the open loop control mode to the feedback control mode.

FIG. 13(a) shows a map of the decremental value $D_T$ selected when the engine rotational speed $N_E$ is equal to or lower than a predetermined first changeover engine rotational speed $N_{FB1}$ (e.g. 3000 rpm), FIG. 13(b) shows a map of the decremental value $D_T$ selected when the engine rotational speed $N_E$ is above the first changeover engine rotational speed $N_{FB1}$ and equal to or lower than a predetermined second changeover engine rotational speed $N_{FB2}$ (e.g. 4500 rpm), and FIG. 13(c) shows a map of the decremental value $D_T$ selected when the engine rotational speed $N_E$ is above the second changeover engine rotational speed $N_{FB2}$. The decremental value $D_T$ is applied, as shown in FIG. 21, when the actual supercharging pressure $P_2$ becomes higher than a predetermined value $P_{2ST}$ lower than a desired value $P_{2REF}$ of supercharging pressure so that overshooting during rising of the supercharging pressure can be prevented. Further, $D_T$ is set, as shown in FIG. 13 and as described above, in accordance with the engine rotational speed $N_E$ and the rate of change $\Delta P_2$ of supercharging pressure. This is because the amount of overshooting depends on the engine rotational speed $N_E$ and the rate of change $\Delta P_2$ of supercharging pressure when the predetermined value $P_{2ST}$ is reached. $D_T$ is set to a larger value as $\Delta P_2$ increases and as $N_E$ is higher.

Figure 14:
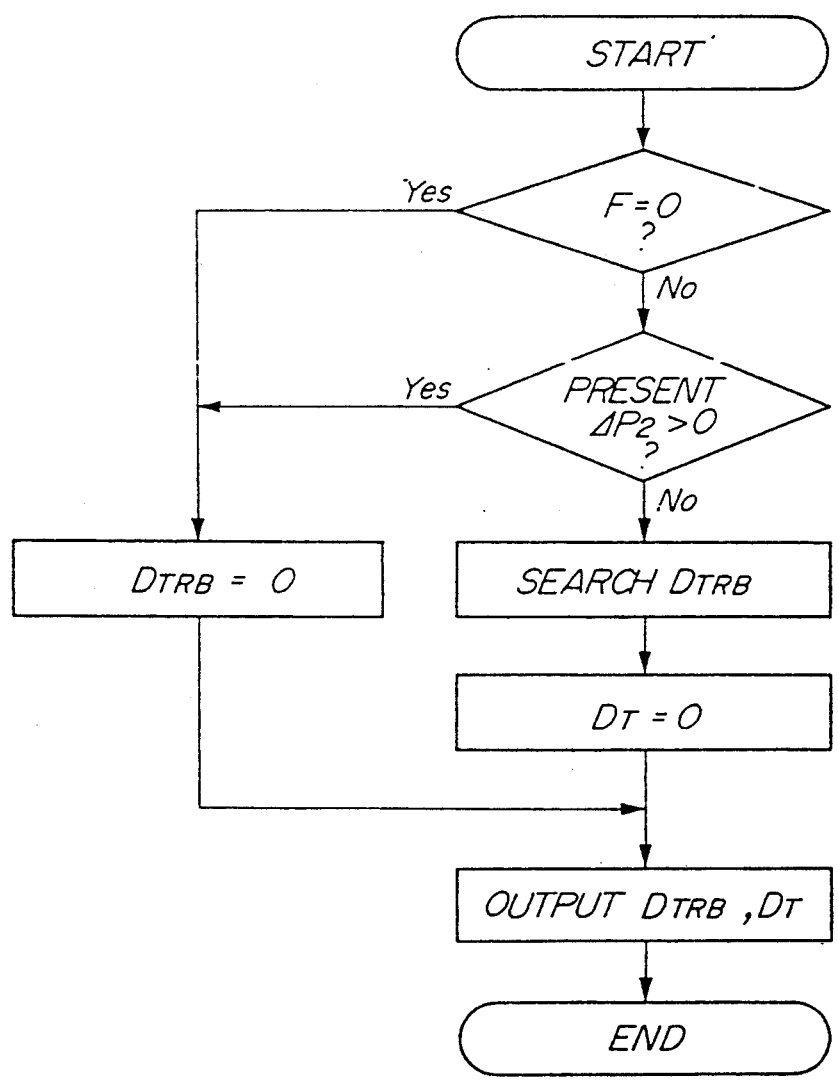
FIG. 14 is a flowchart showing a subroutine for determining an incremental value $D_{TRB}$.

An incremental value $D_{TRB}$ is determined in accordance with a subroutine shown in FIG. 14. More specifically, if the engine is in the open loop control mode, and at the same time the rate of change $\Delta P_2$ of supercharging pressure is negative, the incremental value $D_{TRB}$ is determined by $-\Delta P_2$ and the engine rotational speed $N_E$ as shown in FIGS. 15(a), 15(b) and 15(c), and then the decremental value $D_T$ is set to 0%. The incremental value $D_{TRB}$ is set to 0% when $\Delta P_2$ is positive, irrespective of whether the control is executed in feedback control mode or in open loop control mode. Similarly to the decremental value $D_T$, the incremental value $D_{TRB}$ is also changed as shown in FIG. 15 depending on the engine rotational speed $N_E$ and the negative change rate $-\Delta P_2$ of supercharging pressure. It is set to a larger value as $N_E$ is higher and as $|\Delta P_2|$ increases, whereby it is possible to carry out duty ratio control in a manner ensuring stable supercharging pressure $P_2$ with almost no hunting in each operating region of the engine. In other words, according to the invention, for example, from the start of acceleration of the engine until the predetermined supercharging pressure value $P_{2ST}$ is reached, the duty ratio $D_{OUT}$ is set to and held at 100% to set the area of space between the movable vanes 54 and the stationary vanes 49 to the minimum, to thereby increase the supercharging pressure $P_2$ at a high rate and hence enhance accelerability of the engine. After the supercharging pressure $P_2$ has exceeded the predetermined value $P_{2ST}$, the predetermined incremental value $D_{TRB}$ is added to $D_M$ so as to prevent hunting of supercharging pressure, which would otherwise occur in reaction to subtraction of the decremental value $D_T$ for prevention of overshooting, whereby it is possible to carry out stable supercharging pressure control in each operating region of the engine.

After the correction coefficients $K_{MODij}$, $K_{PATC}$, $K_{TATC}$ and $K_{DOWN}$, the decremental value $D_T$, and the incremental value $D_{TRB}$ are thus determined, the program proceeds to a step S27.

At the step S27, the duty ratio $D_{OUT}$ is calculated by the following equation:

$$D_{OUT} = K_{TATC} \times K_{PATC} \times K_{MODij} \times K_{DOWN} \times (D_M + D_{TRB} - D_T)$$

Thus, the duty ratio $D_{OUT}$ outputted from the step S5 is set in accordance with operating conditions of the engine, by taking into account the external factors.

Further, at a step S28, the flag F is set to 1 to indicate that the engine is in the open loop control mode.

Then, at steps S29 and S30, it is determined whether or not the engine is in an operating condition in which the vehicle can run with the transmission set in a second speed position. More specifically, at the step S29, it is determined whether or not the engine rotational speed $N_E$ falls within a range between a first predetermined value $N_{SEC1}$, e.g. 4500 rpm, and a second value $N_{SEC2}$, e.g. 6000 rpm, that is, $N_{SEC1} \leq N_E \leq N_{SEC2}$. At the step S30, it is determined whether or not the vehicle speed V falls within a range between a first predetermined value $V_{SEC1}$, e.g. 70 km/h, and a second predetermined value $V_{SEC2}$, e.g. 90 km/h, that is, $V_{SEC1} \leq V \leq V_{SEC2}$. If the answers to the questions of the steps S29 and S30 are both Yes, the duty ratio $D_{OUT}$ is set to 0% at a step S31, followed by the program proceeding to a step S32. Thus, the supercharging pressure $P_2$ is decreased, whereby the gear shaft of the transmission, not shown, is prevented from being overloaded when it is in the second speed-holding position.

If $N_E < N_{SEC1}$, $N_{SEC2} < N_E$, $V < _{SEC1}$, or $V_{SEC2} < V$, the program proceeds to the step S32.

At the step S32, it is determined whether or not the automatic transmission is in the first speed position. If it is in the first speed position, the program proceeds to a step S33, while it is in a position other than the first speed position, the program proceeds to a step S37, where a timer $t_{KDF}$ is reset, followed by the program proceeding to a step S38.

At the step S33, it is determined whether or not the automatic transmission was in the first speed position in the last loop. If the answer is Yes, the program proceeds to a step S34, where it is determined whether or not the timer $t_{KDF}$ has counted up a predetermined time period $t_{DKFO}$ (e.g. 5 sec.). If $t_{DKF} > t_{DKFO}$, the program proceeds to the step S38, while if $t_{KDF} \leq t_{KDFO}$, the program proceeds to a step S36.

If it is determined at the step S33 that the automatic transmission was in a position other than the first speed position in the last loop, the timer $t_{FBDLY}$ is reset at a step S35, followed by the program proceeding to the step S36 where the duty ratio $D_{OUT}$ is set to 0%, and then to the step S38.

The steps S32-S37 are provided for the kicking-down operation. That is, by virtue of the steps, when kicking-down is made from a position other than the first speed position to the first speed position, and until a predetermined time period, e.g. 5 sec., elapses after the kicking-down, the duty ratio $D_{OUT}$ is maintained at 0%, thereby preventing overload on the first speed gear.

At the step S38, the duty ratio $D_{OUT}$ is checked to make sure that it is within a predetermined range defined by upper and lower limit values. The upper and lower limit values of $D_{OUT}$ are set in accordance with the engine rotational speed $N_E$. If $D_{OUT}$ is within the predetermined range, it is outputted at the step S5.

If it is determined at the step S24 that $\theta_{TH} > \theta_{THFB}$, the program proceeds to a step S39 where it is determined whether or not the flag F assumed 1 in the last loop, i.e. whether or not the engine was in the open loop control mode in the last loop. If F=1, it is determined at a step S40 whether or not the supercharging pressure $P_2$ is above the duty ratio control-starting value $P_{2ST}$. The duty ratio control-starting value $P_{2ST}$ is obtained by the equation $P_{2ST} = P_{2REF} - \Delta P_{2ST}$. $\Delta P_{2ST}$ is set depending on the engine rotational speed $N_E$, as shown in FIGS. 16(a), 16(b) and 16(c). Here, similarly to the above-described $D_T$ and $D_{TRB}$, $\Delta P_{2ST}$ is set in accordance with the engine rotational speed $N_E$ and the rate of change $\Delta P_2$ of supercharging pressure to ensure the optimum duty control. It is set to a larger value as the engine rotational speed $N_E$ increases and as the rate of change $\Delta P_2$ of supercharging pressure increases.

If $P_2 > P_{2ST}$ at the step S40, it is determined at a step S41 whether or not the supercharging pressure $P_2$ is above the feedback control-starting value $P_{2FB}$. The feedback control-starting supercharging pressure $P_{2FB}$ is obtained by the equation $P_{2FB}=P_{2REF}-\Delta P_{2FB}$. As shown in FIGS. 17(a), 17(b) and 17(c), $\Delta P_{2FB}$ is set depending on the engine rotational speed $N_E$. Similarly to the above-described $\Delta P_{2ST}$, $D_T$, and $D_{TRB}$, $\Delta P_{2FB}$ is determined in accordance with the engine rotational speed $N_E$ and the rate of change $\Delta P_2$ of supercharging pressure to ensure the optimum duty ratio control. It is set to a larger value as the engine rotational speed $N_E$ increases and as the rate of change $\Delta P_2$ of supercharging pressure increases. If $P_2 > P_{2FB}$ at the step S41, the program proceeds to a step S42.

At the step S42, it is determined whether or not the delaying time period $t_{FBDLY}$ has elapsed. If the delaying time period $t_{FBDLY}$ has elapsed, the program proceeds to a step S43. In the meanwhile, if F=0 at the step S39, the program skips over the steps S40 to S42 to the step S43; if $P_2 \leq P_{2FB}$ at the program proceeds to the step S44; if $P_2 \leq P_{2FB}$ at the step S41, the program proceeds to the step S25; and if the delaying time period $t_{FBDLY}$ has not elapsed at the step S42, the program proceeds to the step S26.

Figure 18:
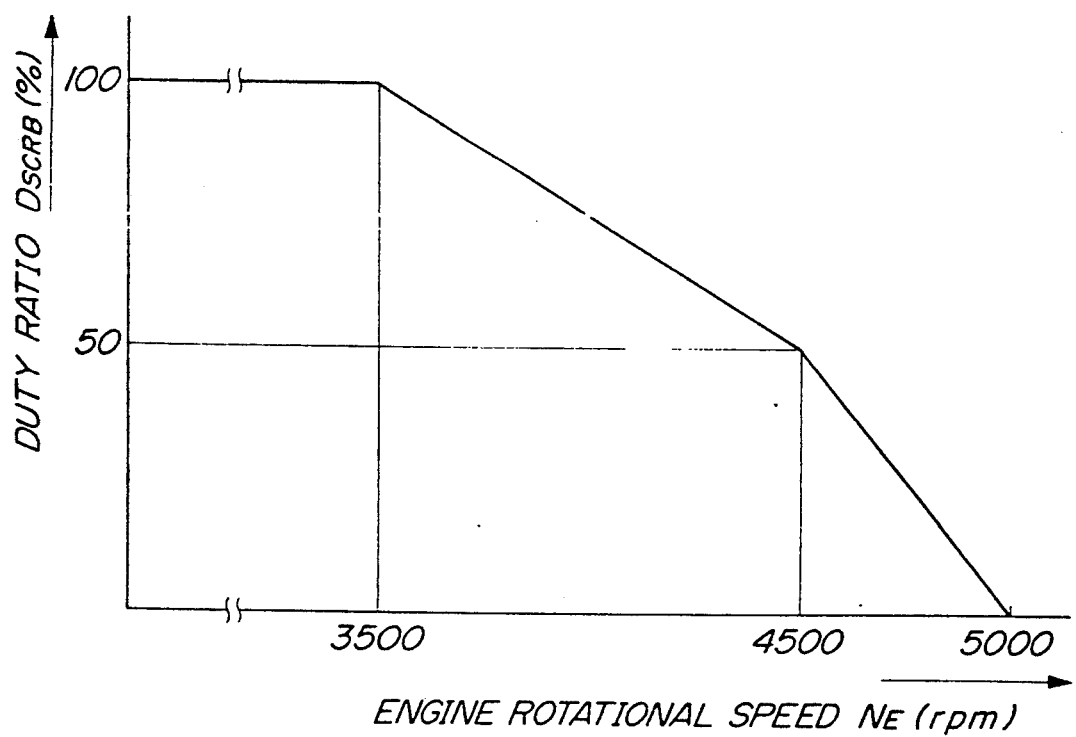
FIG. 18 is a diagram showing a map of a duty ratio $D_{SCRB}$ to be determined depending on the engine rotational speed $N_E$.

At the step S44, a predetermined basic duty ratio value $D_{SCRB}$, as a second supercharging pressure control amount, is searched which is dependent on the engine rotational speed $N_E$, as shown in FIG. 18. The basic duty ratio value $D_{SCRB}$ searched is substituted into the following equation to calculate the duty ratio $D_{OUT}$:

$$D_{OUT}=D_{SCRB} \times K_{TATC} \times K_{PATC}$$

Subsequently, at a step S46, a timer $t_{FBDLY}$ is reset, followed by the program proceeding to the step S38.

The steps S44 and S45 are for achieving stable supercharging pressure control in an operating region in which the supercharging pressure $P_2$ is below the value $P_{2ST}$. That is, since the duty ratio $D_{OUT}$ is determined based upon the predetermined value $D_{SCRB}$ corresponding to the engine rotational speed $N_E$, overshooting can be prevented without fail, irrespective of the rate of change $\Delta P_2$ of the supercharging pressure $P_2$. Alternatively, at the steps S44 and S45, the duty ratio $D_{OUT}$ may be set to 0% to simplify the process.

As described above, according to the control based on the duty ratio control-starting value $P_{2ST}$ and the feedback control-starting value $P_{2FB}$, the supercharging pressure $P_2$ is controlled in feedback control if $P_2 > P_{2FB}$, in starting mode at the step S44 et seq. if $P_2 \leq P_{2ST}$, and based on the basic duty ratio DM if $P_{2ST} < P_2 < P_{2FB}$, respectively.

However, since the supercharging pressure P2 varies depending on the ambient air pressure (atmospheric pressure), if the values $P_{2ST}$ and $P_{2FB}$ are determined only depending on the engine rotational speed $N_E$ and the supercharging pressure rate of change $\Delta P_2$, the starting control will often be executed, while the feedback mode control will not be executed as expected. To avoid this, the values $P_{2ST}$ and $P_{2FB}$ are corrected by the ambient air pressure.

At the step S43, it is determined whether or not the absolute value of rate of change $\Delta P_2$ of supercharging pressure is above a predetermined supercharging pressure difference $G_{dP2}$ for determining whether to start the feedback control. The supercharging pressure difference $G_{dP2}$ is set, for example, at a value of 30 mmHg. If the absolute value of $\Delta P_2$ is above the value $G_{dP2}$, the program returns to the step S26, and if the absolute value of $\Delta P_2$ is equal to or lower than the value $G_{dP2}$, the program proceeds to a step S47. If the feedback control is started when $|\Delta P_2| > G_{dP2}$, it may result in hunting. Therefore, the program returns to the step S26 to carry out the open loop control. As described above, in the open loop control, correction of the basic duty ratio $D_M$ by $D_T$ and $D_{TRB}$ is carried out to prevent hunting and overshooting of supercharging pressure. Therefore, the step S47 is provided mainly for the failsafe purpose.

The feedback control is started at the step S47, where the desired supercharging pressure $P_{2REF}$ is determined depending on the engine rotational speed $N_E$ and the intake air temperature $T_A$. The feedback control is started on condition that $\theta_{TH} > \theta_{THFB}$ at the step S24. Under this condition, the desired supercharging pressure $P_{2REF}$ is determined by the use of the engine rotational speed $N_E$ and the intake air temperature $T_A$ as parameters enabling accurate determination of operating conditions of the engine. If $\theta_{TH} > \theta_{THFB}$, i.e. under a medium or high load operating condition, the engine rotational speed $N_E$ and the throttle valve opening $\theta_{TH}$ behave approximately in the same manner. Therefore, the $V_E$ can be an effective parameter representing operating conditions of the engine. In the meanwhile, the intake air temperature $T_A$ is the temperature of intake air downstream of the intercooler 4 as shown in FIG. 2, and therefore can be a parameter accurately representing the condition of intake air introduced into the combustion chambers. Therefore, it is possible to set the desired supercharging pressure $P_{2REF}$ to values exactly responsive to operating conditions of the engine by the use of a map determined by the engine rotational speed $N_E$ and the intake air temperature $T_A$. The desired supercharging pressure $P_{2REF}$ is set to a lower value as the intake air temperature $T_A$ is decreased. More specifically, the rate of increase of the supercharging pressure tends to be larger when the intake air temperature $T_A$ is lower. Therefore, the desired supercharging pressure is set in the above manner, whereby the minimum opening control can be terminated at appropriate timing, and hence the accelerability can be further improved.

At a step S48, it is determined whether or not the automatic transmission is in the first speed position. If the automatic transmission is in the first speed position, calculation of $P_{2REF}=P_{2REF}-\Delta P_{2REFF}$ is carried out at a step S49 in accordance with the subroutine shown in FIG. 8 when the operating condition of the engine is within the predetermined operating zone shown by hatching in FIG. 9, and then the program proceeds to a step S51. $\Delta P_{2REFF}$ is a predetermined decremental value which is applied when the transmission is in the first speed position. If it is determined at the step S48 that the transmission is in a position other than the first speed position, calculation of $P_{2REF}=P_{2REF}-\Delta P_{2REFOS}$ is carried out at a step S50 in accordance with the subroutine shown in FIG. 10, and then the program proceeds to the step S51. $\Delta P2REFOS$ is a predetermined decremental value which is applied when the transmission is in a position other than the first speed position.

At the step S51, an atmospheric pressure-dependent correction coefficient $K_{PAP2}$ for correcting the supercharging pressure is determined in accordance with the atmospheric pressure $P_A$, and then at a step S52, the following calculation is carried out:

$$P_{2REF}=P_{2REF} \times K_{PAP2} \times K_{REFTB}$$

where $K_{REFTB}$ is a correction coefficient responsive to a knocking condition of the engine.

At a step S53, it is determined whether the absolute value of the difference between the desired supercharging pressure $P_{2REF}$ and the supercharging pressure $P_2$ detected in the present loop is equal to or greater than a predetermined value $G_{P2}$. The predetermined value $G_{P2}$ is a value defining the insensitive pressure width in the feedback control mode, and is set, for example, at 20 mmHg. If the absolute value of the difference between the desired supercharging pressure and the actual supercharging pressure is equal to or higher than the predetermined value $G_{P2}$, the program proceeds to a step S54, and if not, the program proceeds to a step S61.

Figure 19:
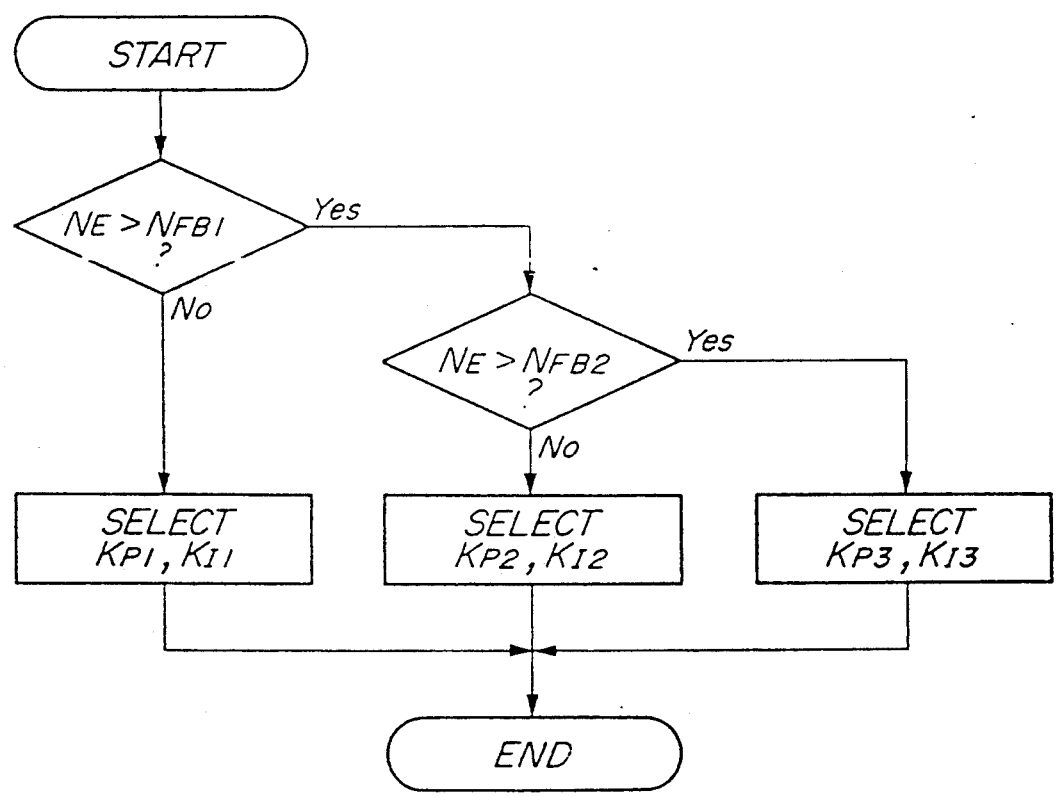
FIG. 19 is a flowchart showing a subroutine for determining feedback coefficients for determining, respectively, a proportional control term and an integral control term.

At the step S54, a proportional control term $D_P$ for correcting the duty ratio is calculated by the following equation:

$$D_P = K_P \times (P_{2REF} - P_2)$$

where $K_P$ is a feedback coefficient for the proportional control term, and is obtained in accordance with a subroutine shown in FIG. 19. In FIG. 19, if the engine rotational speed $N_E$ is equal to or lower than the first changeover engine rotational speed $N_{FB1}$, $K_{P1}$ is obtained and at the same time a feedback coefficient $K_{I1}$ for an integral control term, described later, is obtained. If the engine rotational speed $N_E$ is above the first changeover engine rotational speed $N_{FB1}$ and equal to or lower than the second changeover engine rotational speed $N_{FB2}$, $K_{P2}$ and $K_{PI2}$ are obtained. If the engine rotational speed $N_E$ is above the second changeover engine rotational speed $N_{FB2}$, $K_{P3}$ and $K_{PI3}$ are obtained.

At a step S55, the correction coefficient $K_{MODij}$ is determined in accordance with the engine rotational speed $N_E$ and the intake air temperature $T_A$. At a step S56, it is determined whether or not the flag F assumed 1 in the last loop, i.e. whether or not the present loop is the first loop in which the feedback control mode has been started. If F=1, an integral control term $D_{I(n-1)}$ applied in the last loop is obtained at a step S57 by the following equation:

$$D_{I(n-1)} = K_{TATC} \times K_{PATC} \times D_M \times (K_{MODij} - 1)$$

After this calculation, the program proceeds to a step S58. If F=0 at the step S56, the program skips over the step S57 to the step S58.

At the step S58, an integral control term $D_{In}$ for the present loop is calculated by the following equation:

$$D_{In} = D_{I(n-1)} + K_I + (P_{2REF} - P_2)$$

where $K_I$ represents feedback coefficients $K_{I1} - K_{I3}$ obtained when the feedback coefficient $K_P$ is calculated at the step S54 in accordance with the subroutine in FIG. 19.

Then the program proceeds to a step S59, where the duty ratio $D_{OUT}$ is calculated by the following equation:

$$D_{OUT} = K_{TATC} \times K_{PATC} \times K_{DOWN} \times D_M + D_P + D_{In}$$

Then, at a step S60, the flag F is set to 0, and the program proceeds to the step S38.

If it is determined at the step S53 that the absolute value of the difference between the desired supercharging pressure $P_{2REF}$ and the actual supercharging pressure $P_2$ is less than the predetermined pressure $P_2$ is less than the is set to $D_{I(n-1)}$ at a step S61. Then at steps S62 to S66, it is determined whether or not the atmospheric pressure $P_A$ is above a predetermined value $P_{AMOD}$ (e.g. 650 mmHg), whether or not the engine coolant temperature $T_W$ is within a predetermined range, i.e. above $T_{WMODL}$ and below $T_{WMODH}$, whether or not a retarding amount $T_{ZRET}$ is 0 i.e. whether or not the engine is not under a knocking condition, whether or not the transmission is in a position other than the first speed position, and whether or not $K_{REFTB}$ responsive to the knocking condition is equal to or lower than 1.0. If all these conditions are satisfied, the program proceeds to a step S67, and if any one of them is not satisfied, the program proceeds to the step S59. More specifically, if all the conditions of the steps S62 to S66 are satisfied, the correction coefficient $K_{MODij}$ is learned and stored at the steps S67 and S70; whereas if any of the conditions of the steps S62 to S66 are not satisfied, the program jumps to the step S59 without learning the correction coefficient $K_{MODij}$. Thus, it is possible to prevent the correction coefficient $K_{MODij}$ from being deviated from a proper value, and hence control supercharging pressure to a more suitable value in the open loop control mode.

At the step S67, a coefficient $K_R$ for learning the correction coefficient $K_{MODij}$ for duty ratio is calculated by the following equation:

$$K_R = (K_{TATC} \times D_M + D_{In}) / (K_{TATC} \times D_M)$$

At a step S68, in order to determine and learn the correction coefficient $K_{MODij}$, the following calculation is carried out:

$$K_{MODij} = (C_{MOD} \times K_R)/65536 + [(65536 - C_{MOD}) \times K_{MODij}]/65536$$

where $C_{MOD}$ represents a variable set to a suitable value selected from 1-65536 experimentally depending on the characteristics of the supercharging pressure control system, the engine etc..

At a step S69, $K_{MODij}$ obtained at the step S68 is subjected to limit checking. Thereafter, at the step S70, $K_{MODij}$ is stored in a back-up RAM, not shown, following by the program proceeding to the step S59.

According to the above-described control of the duty ratio of the solenoid 70 of the electromagnetic control valve 69, under the condition that the automatic transmission is in the first speed position, if the engine is in the open loop control mode, $D_F$ is subtracted from the basic duty ratio $D_M$ at the step S20 when the operating condition of the engine is in the predetermined operating zone shown in FIG. 9, and if the engine is in the feedback control mode, $\Delta P_{2REFF}$ is subtracted from the desired supercharging pressure $P_{2REF}$ at the step S49 when the operating condition of the engine is in the predetermined operating zone. Thus, excessive load on the automatic transmission, due to a sudden start of the vehicle, and overload on the engine, under the condition that the automatic transmission is in the first speed position, can be prevented by decreasing the supercharging pressure through subtraction from the basic duty ratio $D_M$. Further, even if the control mode is shifted from the open loop control mode to the feedback control mode when the transmission is in the first speed position, occurrence of hunting in the transitional state can be prevented since subtraction from the desired supercharging pressure $P_{2REF}$ is carried out.

Figure 20:
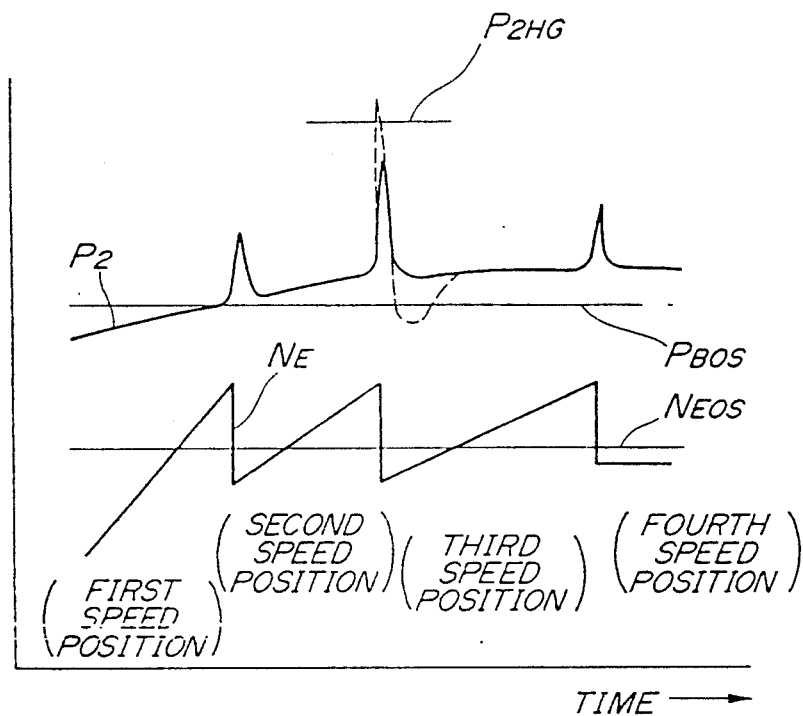
FIG. 20 is a diagram showing a change in the intake pressure, which can take place when the gear position of the transmission is shifted.

Suppose that the gear position of the transmission is shifted as shown in the lower part of FIG. 20. As known, when the gear position of the transmission is shifted, the engine rotational speed $N_E$ is decreased. However, there is a time lag before the actuator 60 starts to operate in response to a signal from the control unit C. Therefore, the supercharging pressure $P_2$ does not properly correspond to the change in the engine rotational speed $N_E$ and overshooting of the supercharging pressure may arise. As shown by the broken line in FIG. 20, when the gear position of the transmission is shifted immediately after acceleration in a medium or high engine speed range, the supercharging pressure may exceed the upper limit value $P_{2HG}$. However, in the embodiment of FIGS. 5A and 5B at the step S21 and at the step S50, subtraction from the basic duty ratio $D_M$ and subtraction from the desired supercharging pressure $P_{2REF}$ are carried out, respectively, in accordance with the subroutine shown in FIG. 10. More specifically, when the gear position of the transmission is shifted, under the conditions that the throttle valve opening $\theta_{TH}$ is above the predetermined value $\theta_{THOS}$, the engine rotational speed $N_E$ is above the predetermined value $N_{EOS}$, and the intake pressure $P_B$ is above the predetermined value $P_{BOS}$, i.e. in the medium or high speed range, $D_{OS}$ is subtracted from the basic duty ratio $D_M$ in the open loop control mode depending on the rate of change $\Delta P_2$ of supercharging pressure $P_2$, and $\Delta P_{2REFOS}$ is subtracted from the desired supercharging pressure $P_{2REF}$ in the feedback control mode. Thus, as shown by the solid line in FIG. 20, overshooting at the time of shifting of the transmission position is greatly reduced, whereby it is possible to prevent hunting and carry out stable supercharging pressure control.

Further, when the control mode is shifted from the open loop control mode to the feedback control mode, as shown in FIG. 21, a drop in the supercharging pressure $P_2$ is prevented whereby the control mode can be smoothly shifted to the feedback control mode. More specifically, at the start of the engine, the duty ratio $D_{OUT}$ is set to 0%, and in the open control mode in which the throttle valve opening $\theta_{TH}$ is below the predetermined value $\theta_{THFB}$, $D_T$ is set to 0% at the step S26 in accordance with the subroutine shown in FIG. 12. As stated before, the control mode starts to shift from the open loop control mode to the feedback control mode when the throttle valve opening $\theta_{TH}$ has exceeded the predetermined value $\theta_{THFB}$. When the supercharging pressure $P_2$ has exceeded $P_{2ST}$ and the throttle valve opening $\theta_{TH}$ is above the predetermined value $\theta_{THFB}$, the subtraction of $D_M = D_M - D_T$ is carried out to prevent overshooting of the supercharging pressure.

In some cases, if $D_T$ alone is thus subtracted from the basic duty ratio $D_M$, the supercharging pressure $P_2$ may drop as shown by the broken line in FIG. 21, in reaction to the subtraction. However, according to the subroutine of FIG. 14, if $\Delta P_2 \leq 0$, $D_T$ is set to 0%, and only $D_{TRB}$ is added to the basic duty ratio $D_M$. Therefore, it is possible to cope with the possible drop in the supercharging pressure $P_2$ to thereby smoothly shift the control mode to the feedback control mode while preventing occurrence of hunting of the supercharging pressure.

The aforesaid control of duty ratio of the solenoid 70 of the electromagnetic control valve 69 is carried out when the electromagnetic valve 72 is closed. If the electromagnetic valve 72 is opened, intake pressure $P_B$ is introduced into the second pressure chamber 63 of the actuator 60, which in turn causes the movable vanes 54 of the variable capacity turbocharger 5 to operate such that the space area between the movable and stationary vanes 54, 49 is increased.

In this manner, in addition to the control of operation of the electromagnetic control valve 69 for introducing supercharging pressure $P_2$ into the first pressure chamber 62 of the actuator 60 in accordance with the main routine shown in FIGS. 5A and 5B, intake pressure $P_B$ is introduced into the second pressure chamber 63 of the actuator 60 by way of the electromagnetic control valve 72, and at the same time the electromagnetic valve 72 is controlled based on the intake pressure $P_B$ from the intake pressure sensor $S_{PB}$, which makes it possible to carry out more accurate control of the supercharging pressure. The reason for this is as follows. Since the supercharging pressure $P_2$ is detected between the variable capacity turbocharger 5 and the intercooler 4, it is impossible to detect a subtle operation of the throttle valve 74. In contrast, since the intake pressure $P_B$ is detected downstream of the throttle valve 74, it is possible to detect a subtle operation thereof. Thus, by the use of both the supercharging pressure sensor $S_{P2}$ positively sensitive to the operation of the turbocharger 5 and the intake pressure sensor $S_{PB}$ positively sensitive to the operation of the throttle valve 74, the operation of the whole intake system including the turbocharger 5 can be more accurately reflected upon the control of the supercharging pressure.

Next, with reference to FIG. 22, the manner of control of controlling the solenoid 73 of the electromagnetic valve 72 by the control unit C will be described below.

At a step L1, it is determined whether or not a predetermined time period, e.g. 2 minutes, has elapsed from the start of the engine. If the predetermined time period has not elapsed, the program proceeds to a step L2, where the solenoid 73 is energized, whereby the actuator 60 is operated to cause the movable vanes 49 to operate such that the area of space between the movable and stationary vanes 54, 49 is increased. This can cope with the start of the engine in cold weather. Thus, excessive supercharging under cold weather is prevented, and the catalyst temperature can be gently raised. If the predetermined time period has elapsed at the step L1, the program proceeds to a step L3, where it is determined whether or not the speed V of the vehicle is above a predetermined value $V_{OP3}$, which is provided with a hysteresis between when the vehicle speed V increases and when it decreases and is set to, for example, 90/87 km/h. If $V > V_{OP3}$, the program proceeds to a step L4; whereas if $V \leq V_{OP3}$, the program proceeds to a step L5.

At the step L4, it is determined whether or not the throttle valve opening rate of change $\Delta\theta_{TH}$ is below a predetermined value $\Delta\theta_{THOP2}$. The predetermined $\Delta\theta_{THOP2}$ is provided with a hysteresis similar to that of the vehicle speed $V_{OP3}$. If $\Delta\theta_{TH} < \Delta\theta_{THOP2}$, the program proceeds to a step L2; otherwise, the program proceeds to the step L5.

At the step L5, it is determined whether or not the vehicle speed V is below a predetermined value $V_{OP1}$. The predetermined value $V_{OP1}$ also has a hysteresis and is set to, for example, 65/63 km/h. If $V < V_{OP1}$, the program proceeds to a step L7; whereas if $V \geq V_{OP1}$, the program proceeds to a step L6, where the solenoid 73 is deenergized. At the step L7, it is determined whether or not the vehicle speed V is above a predetermined value $V_{OP2}$. The predetermined value $V_{OP2}$ also has a hysteresis, and is set to, for example, 4/3 km/h. If $V > V_{OP2}$, the program proceeds to a step L12; whereas if $V \leq V_{OP2}$, the program proceeds to a step L8.

At the step L8, it is determined whether or not the vehicle speed V detected in the last loop is above the predetermined value $V_{OP2}$. If $V > V_{OP2}$, the program proceeds to a step L9, where the $t_{OP}$ timer for counting a time period $t_{OP}$ is reset, and then the program proceeds to a step L10. If $V \leq V_{OP2}$, the program directly proceeds to the step L10. At the step L10, it is determined whether or not the solenoid 73 was energized in the last loop. If the solenoid 73 was deenergized in the last loop, the program proceeds to the step L6; whereas if it was energized in the last loop, the program proceeds to a step L11, where it is determined whether or not the time period $t_{OP}$ exceeds a predetermined time period $t_{OP0}$. If $t_{OP} > t_{OP0}$, the program proceeds to the step L6; whereas if $t_{OP} \leq t_{OP0}$, the program proceeds to the step L2.

At the step L12, it is determined whether or not the engine rotational speed $N_E$ is below a predetermined value $N_{EOP}$. The predetermined value $N_{EOP}$ has a hysteresis, and is set to, for example, 2500/2300 rpm. If $N_E \geq N_{EOP}$, the program proceeds to the step L6; whereas if $N_E < N_{EOP}$, the program proceeds to a step L13.

At the step L13, it is determined whether or not the intake pressure $P_B$ is below a predetermined value $P_{BOP}$. The predetermined value $P_{BOP}$ has a hysteresis, and is set to, for example, $-100/-150$ mmHg. If $P_B \geq P_{BOP}$, the program proceeds to the step L6; whereas if $PB < P_{BOP}$, the program proceeds to a step L14.

At the step L14, it is determined whether or not the throttle valve opening $\theta_{TH}$ is below a predetermined value $\theta_{THOP}$. The predetermined value $\theta_{THOP}$ is set at 20/15 degrees. If $\theta_{TH} \geq \theta_{THOP}$, the program proceeds to the step L6; whereas if $\theta_{TH} < \theta_{THOP}$, the program proceeds to a step L15.

At the step L15, it is determined whether or not the throttle valve opening rate of change $\Delta\theta_{TH}$ is positive and at the same time below a predetermined value $\Delta\theta_{THOP1}$ which is set such that it has a hysteresis. If $\theta < \Delta\theta_{TH} < \Delta\theta_{THOP1}$, the program proceeds to the step L2; otherwise, the program proceeds to the step L6.

According to the above-described control manner, if it is determined at the steps L3 and L4 that the vehicle speed V is greater than 90/87 km/h, and that the acceleration thereof is gentle as shown by $0 < \Delta\theta TH < \Delta\theta\text{-}THOP2$, the movable vanes 54 of the turbocharger 5 are operated such that the area of space between the movable vanes 54 and the stationary vanes 49 is increased, whereby pumping loss can be prevented. In other words, when the vehicle is cruising at a high speed, acceleration of the engine is not required, and if the movable vanes 54 are operated such that the supercharging pressure is increased, pumping loss may occur due to a rise in the back pressure in the exhaust manifold resulting from a high engine rotational speed.

If it is determined at the step L5 that the vehicle is running at a speed greater than 65/63 km/h, the solenoid 73 is deenergized. This is because when the vehicle is running at such a high speed, the supercharging pressure can be sufficiently controlled by the electromagnetic control valve 69 in accordance with the routine shown in FIGS. 5A and 5B. Further, at the steps L7 to L11, if the vehicle is running at a speed slower than 4 or 3 km/h, i.e. it is almost stationary, and at the same time if the vehicle was almost stationary in the last loop, the $t_{OP}$ timer is reset, and then until the time period, for example, one minute, has elapsed, the solenoid 73 is energized so as to operate the movable vanes 54 such that the area of space between the movable and stationary vanes 54, 49 is increased. If the movable vanes 54 are in such a position as to make the area of space narrower at the restart of the vehicle, the supercharging pressure $P_2$ is temporarily increased to apply excessive load on the starting gear, etc. Therefore, the solenoid 73 is energized to prevent such application of the excessive load on the starting gear, etc. Further, if the movable vanes 54 are in such a position as to make the area of space narrower when the vehicle is running at a speed slower than 4 or 3 km/h, rotation of the variable capacity turbocharger 5 by inertia, etc., is promoted. On this occasion, the throttle valve opening $\theta_{TH}$ is almost fully closed, and therefore the supercharging pressure increases the pressure within the intake pipe on the upstream side of the throttle valve to cause surging of the latter pressure. Therefore, the movable vanes 54 are operated such that the space area is increased, to prevent surging of the intake pipe pressure. In addition, the control of supercharging pressure carried out at the steps L7 to L11 contributes to a rise in the catalyst temperature immediately after the start of the vehicle when the weather is cold.

If at the steps L12 to L15, all the conditions of $V_{OP2} < V < V_{OP1}$, $N_E < N_{EOP}$, $P_B < \Pi_{BOP}$, $\theta_{TH} < \theta_{THOP}$, and $0 < \Delta\theta_{TH} < \Delta\theta_{THOP1}$ are satisfied, i.e. if the vehicle is gently accelerated under partial load as in the 10 mode running, the solenoid 73 is energized to decrease the supercharging pressure $P_2$, whereby pumping loss can be prevented.

Figure 23A:
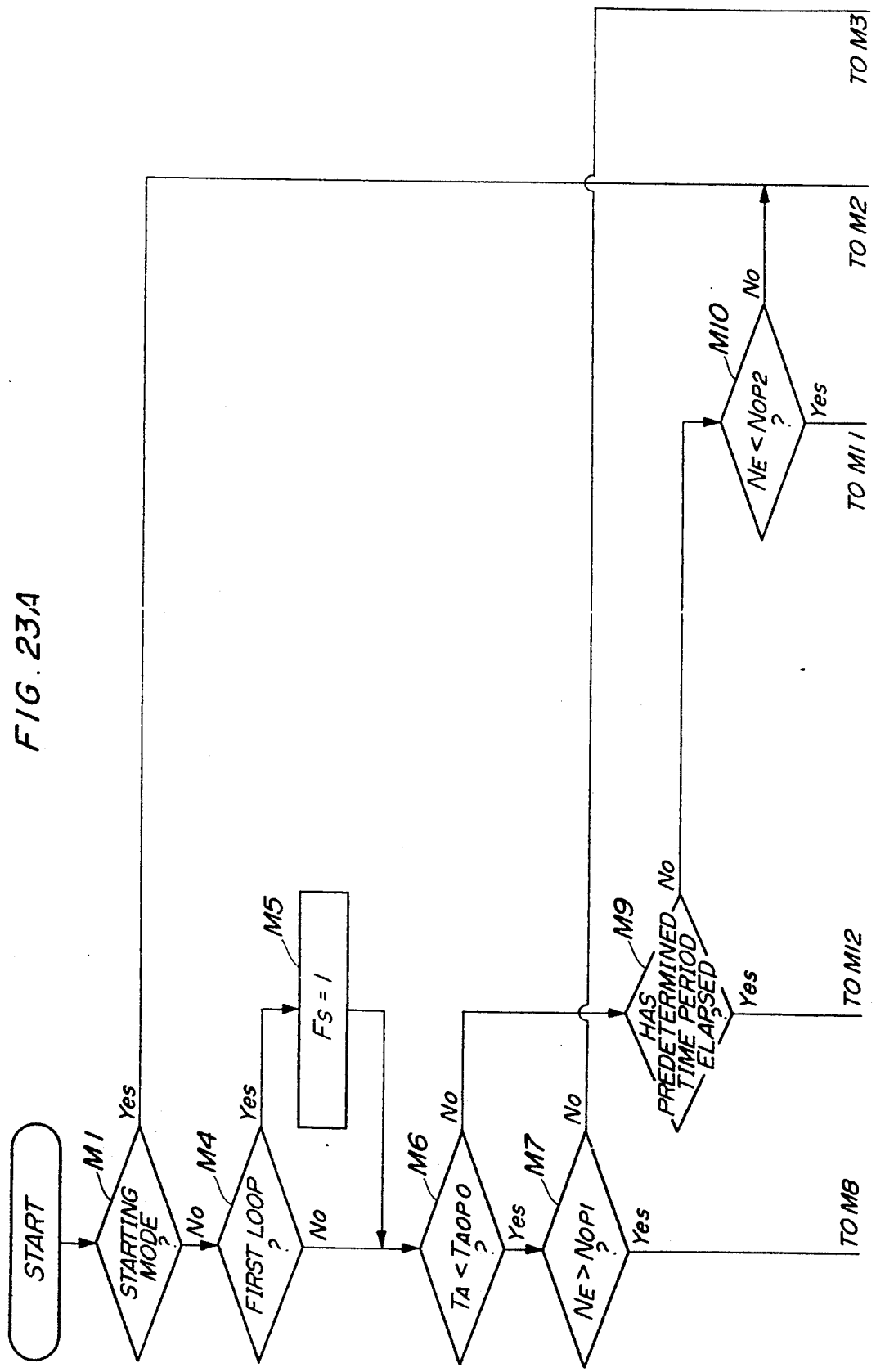
Figure 23B:
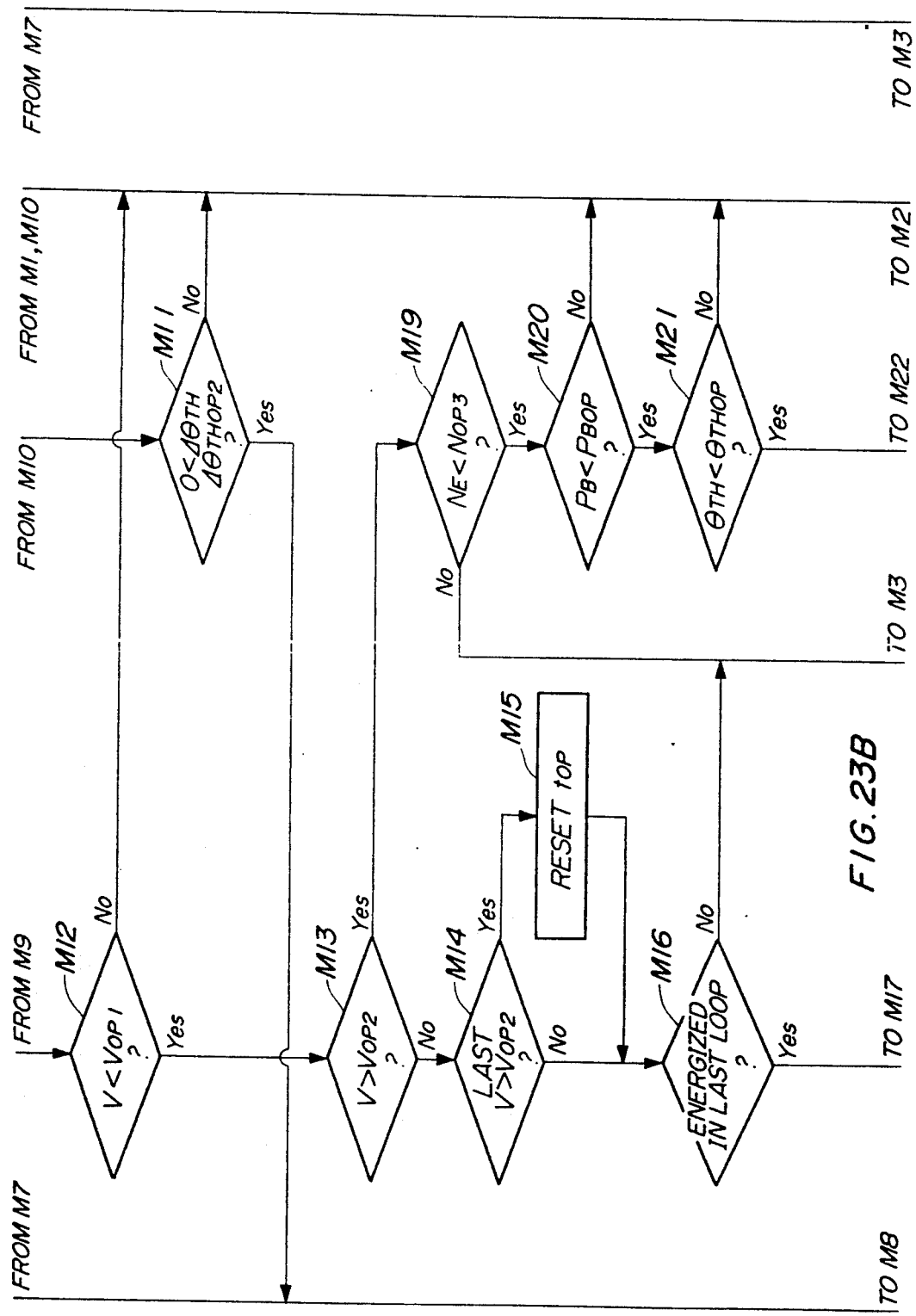

Next, a variation of the manner of control of the solenoid 73 of FIG. 22 will now be described with reference to FIG. 23.

At a step M1, it is determined whether or not the engine is in the starting mode, that is, whether or not the engine is in a cranking condition. If the engine is in the starting mode, a flag $F_S$ is set to 0 at a step M2, followed by the program proceeding to a step M3 where the solenoid 73 is deenergized. By deenergizing the solenoid 73, the electromagnetic valve 72 is closed to interrupt the introduction of the intake pressure $P_B$ into the second pressure chamber 63 of the actuator 60. In this state, the actuator 60 and hence the movable vanes 54 are controlled by the supercharging pressure $P_2$ introduced into the first pressure chamber 62 by the electromagnetic control valve 69. On the contrary, if the solenoid 73 is energized, the electromagnetic valve 72 is opened to introduce the intake pressure $P_B$ into the second pressure chamber 63, whereby the actuator 60 drives the movable vanes 54 to reduce the supercharging pressure $P_2$. The flag $F_S$ at the step M2 is used to determine whether to allow the energization of the solenoid 73. If $F_S = 0$, the solenoid 73 is not energized.

If it is determined at the step M1 that the engine is not in the starting mode, the program proceeds to a step M4, where it is determined whether or not the TDC signal pulse inputted is the first pulse in the basic mode, which means that the present loop is the first loop. If the present loop is the first loop, the flag $F_S$ is set to 1 at a step M5, followed by the program proceeding to a step M6; whereas if the present loop is not the first loop, the program skips over the step M5 to the step M6.

At the step M6, it is determined whether or not the intake air temperature $T_A$ downstream of the intercooler 4 is below a predetermined value $T_{AOPO}$, e.g. $-15°$ C. If $T_A < T_{AOPO}$, the program proceeds to a step M7, where it is determined whether or not the engine rotational speed $N_E$ is above a predetermined value $N_{OP1}$, e.g. 3500 rpm. If $N_E > N_{OP1}$, the solenoid 73 is energized at a step M8, while if $N_E \leq N_{OP1}$, the solenoid 73 is deenergized at the step M3. That is, if $T_A < T_{AOPO}$ and at the same time $N_E > N_{OP1}$, the solenoid 73 is energized to reduce the supercharging pressure $P_2$.

If $T_A \geq T_{AOPO}$ at the step M6, the program proceeds to a step M9, where it is determined whether or not a predetermined time period (e.g. 2 min.) has elapsed after the start of the engine. If the predetermined time period has not elapsed, the program proceeds to a step M10, where it is determined whether or not the engine rotational speed $N_E$ is below a predetermined value $N_{OP2}$, e.g. 3000 rpm. If $N_E < N_{OP2}$, the program proceeds to a step M11, while if $N_E \geq N_{OP2}$, the program proceeds to the step M2. At the step M11, it is determined whether or not the rate of change $\Delta\theta_{TH}$ of the throttle valve opening $\theta_{TH}$ is within a predetermined range, that is, $0 < \Delta\theta_{TH} < \Delta\theta_{THOP2}$. If $0 < \Delta\theta_{TH} < \Delta\theta_{THOP2}$, the program proceeds to the step M8, where the solenoid 73 is energized; whereas if the condition is not fulfilled, the program proceeds to the step M2. This means that when the intake air temperature $T_A$ is above the predetermined value $T_{AOPO}$, and at the same time the predetermined time period has not elapsed after the start of the engine, the solenoid 73 is deenergized, if the condition of $N_E \geq N_{OP2}$ is fulfilled and at the same time the condition of $0 < \Delta\theta_{TH} < \Delta\theta_{THOP2}$ is not fulfilled, whereby accurate control of the supercharging pressure can be effected even before the predetermined time period elapses after the start of the engine. On the other hand, if $N_E < N_{OP2}$ and at the same time $0 < \Delta\theta_{TH} < \Delta\theta_{THOP2}$, the solenoid 73 is energized so that the actuator 60 drives the movable vanes 54 to move in such a direction as to increase the area of space defined between the movable vanes 54 and the stationary vanes 49. This improves the startability of the engine in cold weather, by inhibiting supercharging at cold starting of the engine. Further, the temperature of the catalyst can be gradually increased.

At the step M9, if it is determined that the predetermined time period has elapsed, the program proceeds to a step M12, where it is determined whether or not the vehicle speed V is below the predetermined value $V_{OP1}$. If $V < V_{OP1}$, the program proceeds to a step M13, while if $V \geq V_{OP1}$, the program proceeds to the step M2 to deenergize the solenoid 73. At the step M13, it is determined whether or not the vehicle speed V is below the predetermined value $V_{OP2}$. If $V > V_{OP2}$, the program proceeds to a step M14, while if $V \leq V_{OP2}$, the program proceeds to a step M19.

At the step M14, it is determined whether or not the vehicle speed V detected in the last loop is above the predetermined value $V_{OP2}$. If $V > V_{OP2}$, a timer $t_{OP}$ is reset at a step M15, followed by the program proceeding to a step M16, while if $V \leq V_{OP2}$, the program proceeds to the step M16. At the step M16, it is determined whether or not the solenoid 73 was energized in the last loop. If it was deenergized, the program proceeds to the step M3, while if it was energized, the program proceeds to a step M17, where it is determined whether or not the timer $t_{PO}$ has counted up a predetermined value $t_{OPO}$. If $t_{PO} > t_{OPO}$, the program proceeds to a step M18, while if $t_{PO} \leq t_{OP}$, the program proceeds to the step M8. At the step M18, it is determined whether or not the engine rotational speed $N_E$ is above a predetermined value $N_{OP4}$ (e.g. 1200 rpm). If $N_E > N_{OP4}$, the program proceeds to the step M8, while if $N_E \leq N_{OP4}$, the program proceeds to the step M3.

The step M18 is provided for the following reason:

Even when the vehicle speed is below the predetermined value $V_{OP2}$, if the engine is in a fast idling condition or a like condition where the engine rotational speed $N_E$ is above $N_{OP4}$, then the driver does not want supercharging, and if in such condition the movable vanes 54 are moved to reduce the area of space between the vanes 54 and 49, the flow resistance of exhaust gases flowing through the spaces will increase to adversely affect the combustion efficiency of the engine and increase the fuel consumption due to unnecessarily increased engine output. Therefore, in such a condition the solenoid 73 is energized.

At the step M19, it is determined whether or not the engine rotational speed $N_E$ is below a predetermined value $N_{OP3}$. The predetermined value $N_{OP3}$ has a hysteresis and is set to e.g. 2500/2300 rpm between when $N_E$ increases and when $N_E$ decreases. If $N_E \geq N_{OP3}$, the program proceeds to the step M3, while if $N_E < N_{OP3}$, the program proceeds to a step M20.

At the step M20, it is determined whether or not the intake pressure $P_B$ is below the predetermined value $P_{BOP}$. If $P_B \geq P_{BOP}$, the program proceeds to the step M2, while if $P_B < P_{BOP}$, the program proceeds to a step M21.

At the step M21, it is determined whether or not the throttle valve opening $\theta_{TH}$ is below the predetermined value $\theta_{THOP}$. If $\theta_{TH} \geq \theta_{THOP}$, the program proceeds to the step M2, while if $\theta_{TH} < \theta_{THOP}$, the program proceeds to a step M22.

At the step M22, it is determined whether or not the rate of change $\Delta\theta TH$ of the throttle valve opening $\theta_{TH}$ is below the predetermined value $\Delta\theta_{THOP1}$. If $\Delta\theta_{TH} < \Delta\theta_{THOP1}$, the program proceeds to a step M23, while if $\Delta\theta_{TH} \geq \Delta\theta_{THOP1}$, the program proceeds to the step M2. At the step M23, it is determined whether or not the flag $F_S$ is 0. If $F_S = 0$, the solenoid 73 is deenergized at the step M3, while $F_S = 1$, the solenoid 73 is energized at the step M8.

As described above, at the steps M6 and M7, if the intake air temperature $T_A$ is below the predetermined value $T_{AOPO}$ and at the same time the engine rotational speed $N_E$ is above the predetermined value $N_{OP1}$, the solenoid 73 is energized to drive the movable vanes 54 to move in the direction as to increase the area of space between the movable vanes 54 and the stationary vanes 49. Therefore, the supercharging pressure can be increased at the start of the engine, and simultaneously, overload on the engine can be avoided when the intake air temperature $T_A$ is too low.

Figure 24A:
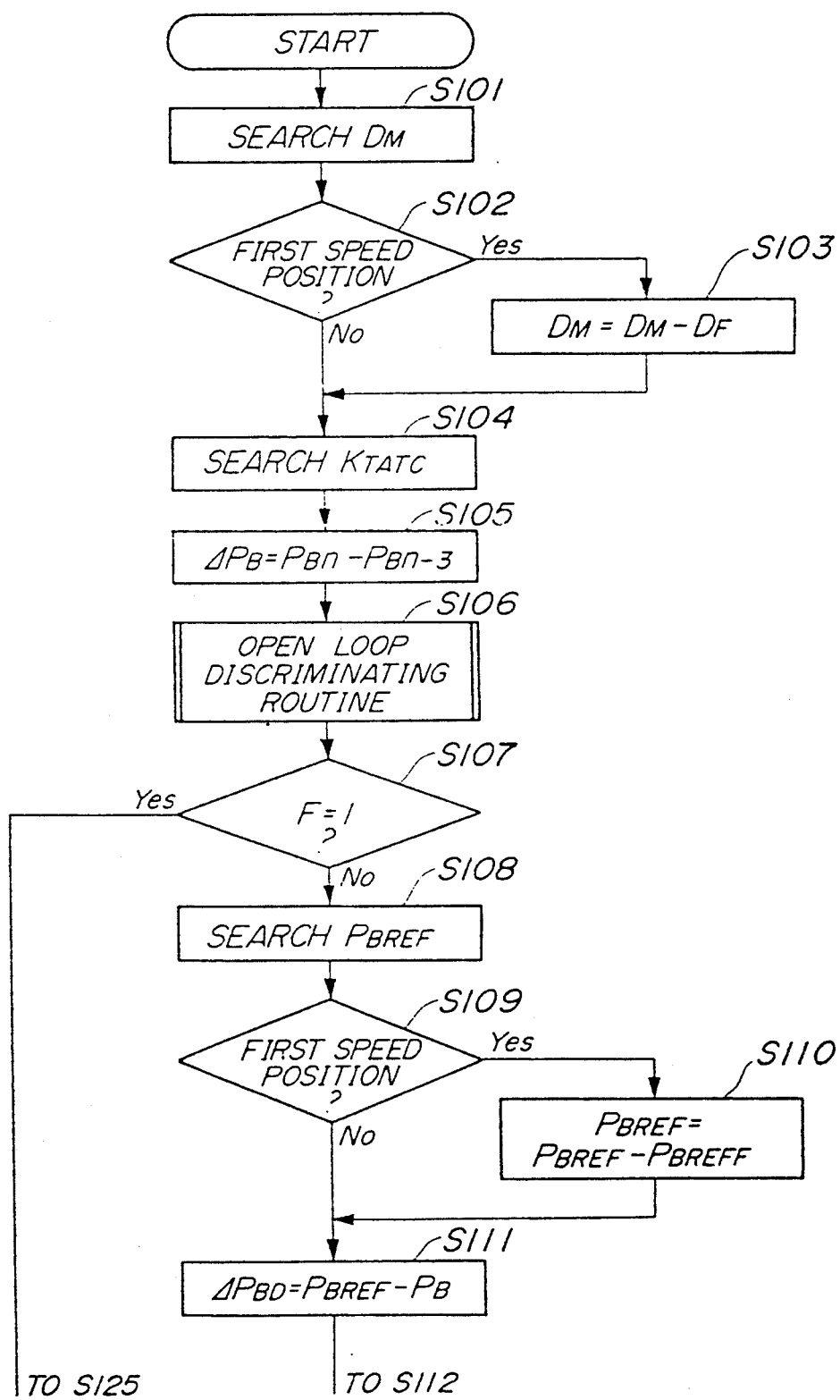

FIG. 24 shows a program for controlling the electromagnetic control valve 69, according to a second embodiment of the invention. The second embodiment is distinguished from the first embodiment of FIGS. 5A and 5B, in that instead of using the supercharging pressure sensor $S_{P2}$, the supercharging pressure control is effected based upon the intake pressure $P_B$ detected by the intake pressure sensor $S_{PB}$. This is based on the fact that the feedback control of the supercharging pressure is effected in an operating condition of the engine where the throttle valve 74 is almost fully open, in which condition information relating to the supercharging pressure can be obtained by the intake pressure $P_B$.

At a step S101, the basic duty ratio $D_M$ is read from a $D_M$ map in response to the throttle valve opening $\theta_{TH}$ and the engine rotational speed $N_E$. FIG. 25 shows an example of the $D_M$ map in which the throttle valve opening $\theta_{TH}$ is classified into sixteen predetermined values $\theta_{THV}-\theta_{THV16}$ within a predetermined range, while the engine rotational speed $N_E$ is classified into twenty predetermined values $N_{V1}-N_{V20}$. The basic duty ratio $D_M$ is determined by means of interpolation, if $\theta_{TH}$ or $N_E$ falls between respective adjacent predetermined values. By setting the basic duty ratio $D_M$ by the use of the $D_M$ map, the duty ratio $D_{OUT}$ of the electromagnetic control valve 69 can be controlled more accurately in response to operating conditions of the engine E.

Next, it is determined at a step S102 whether or not the gear position of the transmission is in a first speed position. This determination is carried out in accordance with a subroutine, e.g. shown in FIG. 26. In the subroutine, it is determined whether or not the speed V of the vehicle is lower than a predetermined value $V_L$ which is normally obtained in the first speed position. If $V < V_L$, it is then determined whether or not the vehicle speed V is slower than a predetermined value $V_F$ corresponding to the engine rotational speed $N_E$. If $V \geq V_L$ or $V \geq V_F$, it is determined that the gear position is not in the first speed position; whereas if $V < V_L$ and at the same time $V < V_F$, it is determined that the gear position is in the first speed position.

Figures 27, 28:
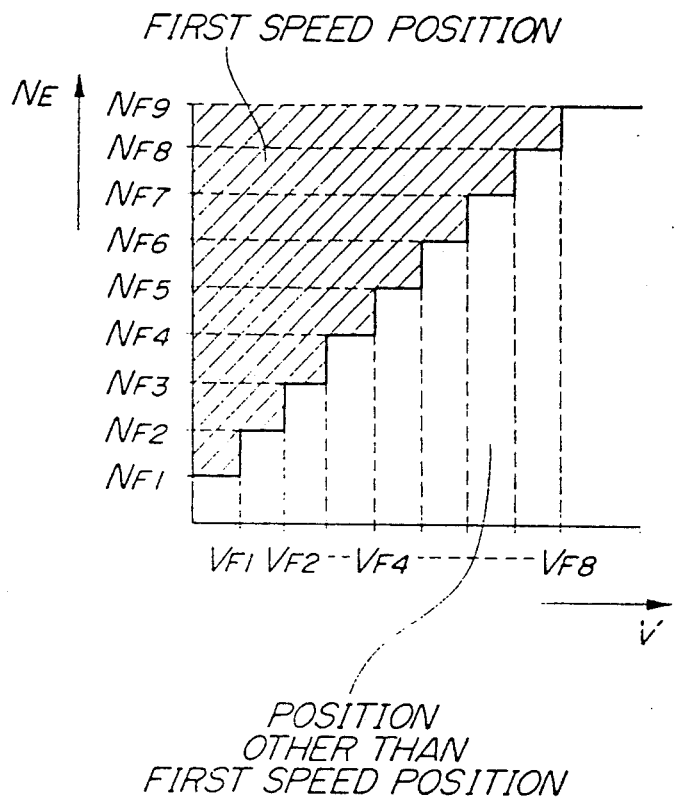
FIG. 27 is a diagram showing a table of a predetermined value $V_F$ of the vehicle speed, applied to the subroutine of FIG. 26.
FIG. 28 is a diagram showing a map of an intake air temperature-dependent correction coefficient $K_{TATC}$.

FIG. 27 shows a table for determining the predetermined value $V_F$. When the transmission is in the first speed position, the ratio between the engine rotational speed $N_E$ and the vehicle speed V is constant. The table is set so as to satisfy this constant ratio relationship and provided with predetermined values $N_{F1}-N_{F9}$ of the engine rotational speed and predetermined values $V_{F1}-V_{F8}$ of the vehicle speed V. It is determined that the transmission is in the first speed position when the vehicle speed V is slower than the predetermined value $V_F$ corresponding to the actual engine rotational speed $N_E$. By virtue of the above determinations, it is possible to determine without a gear position sensor or the like whether or not the transmission is in the first speed position, irrespective of whether the transmission is manual or automatic.

Referring again to FIG. 24, if it is determined at the step S102 that the transmission is in the first speed position, then at a step S103 the basic duty ratio $D_M$ determined at the step S101 is decreased by subtracting a predetermined value $D_F$ from the basic duty ratio $D_M$, followed by the program proceeding to a step S104. On the other hand, if the transmission is in a position other than the first speed position, the program jumps to the step S104. In this way, the basic duty ratio $D_M$ is set to a value smaller by the predetermined value $D_F$ when the transmission is in the first speed position than when it is not in another position. By virtue of this control, when the transmission is in the first speed position, the supercharging pressure is moderately suppressed as a whole so that an abrupt increase or overboosting in the supercharging pressure can be prevented, as indicated by the solid line in FIG. 39. Furthermore, when the transmission is in a position other than the first speed position, the supercharging pressure can be controlled to a sufficiently high value, thereby enabling to attain desired accelerability, as indicated by the broken line in FIG. 39.

At the step S104, an intake air temperature-correcting coefficient $K_{TATC}$ is read from a $K_{TATC}$ map in response to the engine rotational speed $N_E$ and the intake air temperature $T_A$. FIG. 28 shows an example of the $K_{TATC}$ map, in which the engine rorational speed $N_E$ is classified into twenty predetermined values $N_{V1}-N_{V20}$ within a predetermined range, similarly to the $D_M$ map, while the intake air temperature $T_A$ is classified into eight predetermined values $T_{AV1}-T_{AV8}$. By virtue of the $K_{TATC}$ map, the intake air temperature-correcting coefficient $K_{TATC}$ is set to a suitable value.

Then at a step S105, the rate of change $\Delta P_B$ of the intake air pressure $P_B$, hereinafter merely called "the rate of change", is calculated by subtracting a value $PB_{n-3}$ detected in the third loop before the present loop from a value $P_{Bn}$ detected in the present loop. The rate of change $\Delta P_B$ is applied to the setting of constants used for calculating the duty ratio $D_{OUT}$, as hereinafter described in detail, whereby the rate of increase of the supercharging pressure is controlled to a desired value.

Next, at a step S106, it is determined whether or not the supercharging pressure is in a range in which open loop control is to be effected. This determination is carried out in accordance with a subroutine shown in FIG. 29.

Figure 29A:
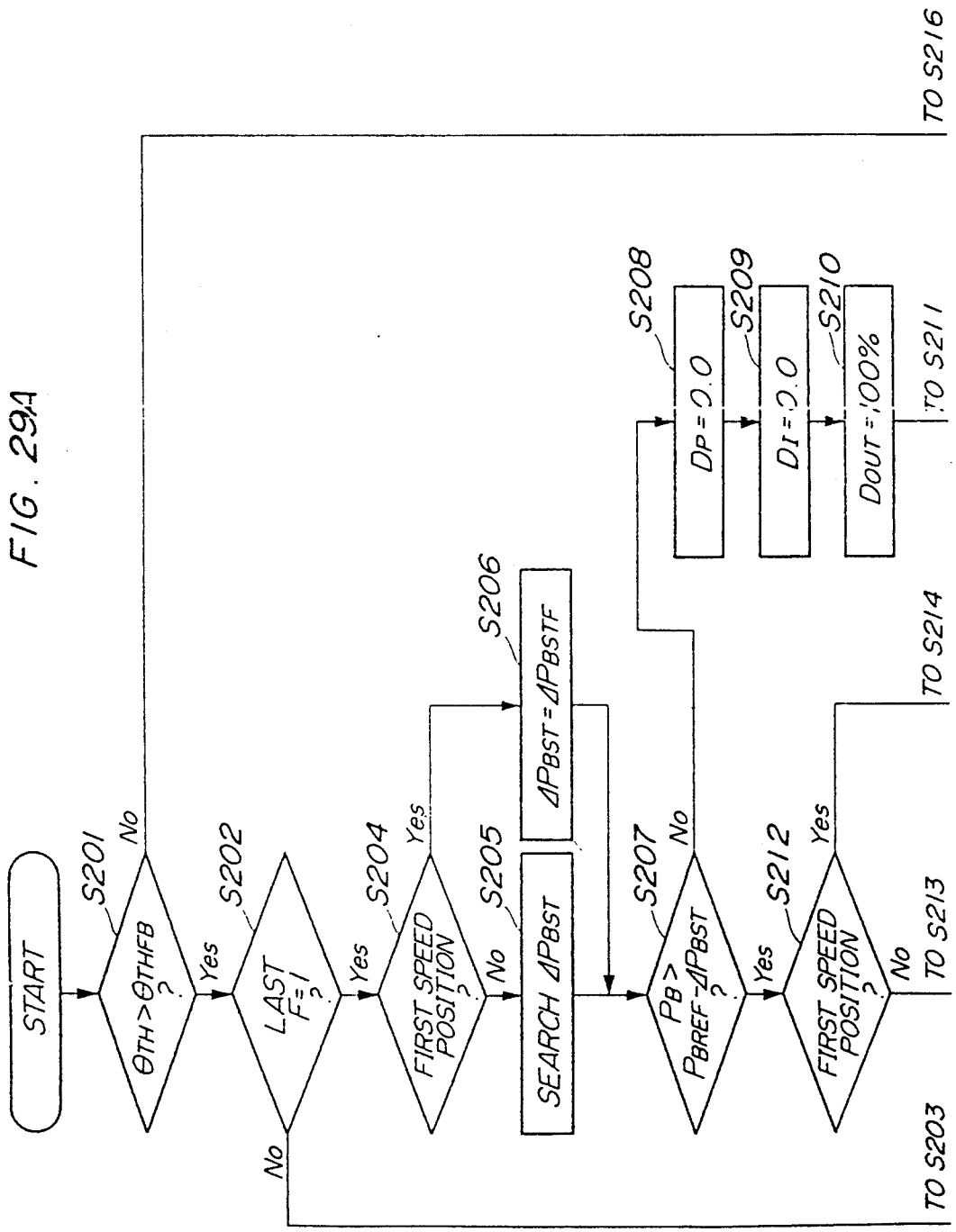

First, at a step S201 of the FIG. 29 subroutine, it is determined whether or not the throttle valve opening $\theta_{TH}$ is larger than a predetermined value $\theta_{THFB}$ indicating that the throttle valve 74 is almost fully open. If $\theta_{TH} \leq \theta_{THFB}$, that is, if the throttle valve 74 is not almost fully open, it is determined that the open loop control should be effected, followed by the program proceeding to a step S216 et seq., hereinafter referred to. That is, feedback control is effected only when the throttle valve 74 is almost fully open.

If it is determined at the step S201 that $\theta_{TH} > \theta_{THFB}$, it is determined at a step S202 whether or not, a flag F set in the last loop at a step S203 or S221, hereinafter referred to, is equal to a value of 1, i.e. the open loop control was effected in the last loop. If the feedback control was effected in the last loop, it is judged at the step S203 that the feedback control should be continued, and the flag F is set to a value of 0, followed by termination of the program.

Figure 30:
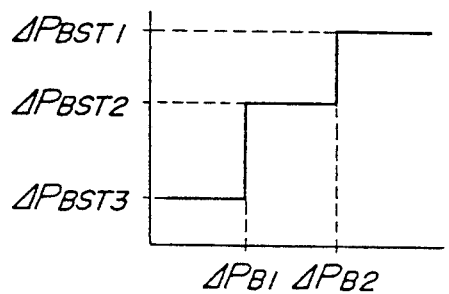
FIG. 30 is a diagram showing a table of a first decremental value $\Delta P_{BST}$ to be applied when the transmission is in a position other than the first speed position.

If it is determined at the step 202 that the open loop control was effected, the program proceeds to a step S204 in which it is determined whether or not the transmission is in the first speed position. If the transmission is not in the first speed position, a first subtraction value $\Delta P_{BST}$ is obtained at a step S205 from a $\Delta P_{BST}$ table applied in a position other than the first speed position, in accordance with the rate of change $\Delta P_B$, followed by the program proceeding to a step S207. FIG. 30 shows an example of the $\Delta P_{BST}$ table, in which two predetermined values $\Delta P_{B1}$ and $\Delta P_{B2}$ ($\Delta P_{B1} < \Delta P_{B2}$) are provided as the rate of change $\Delta P_{BST}$. The predetermined values $\Delta P_{BST3} - \Delta P_{BST1}$ are set such that as $\Delta P_B$ increases, i.e., as the rate of increase of the supercharging pressure increases, the first subtraction value $\Delta P_{BST}$ is set to a larger value.

If it is determined at the step S204 that the transmission is in the first speed position, the first subtraction value $\Delta P_{BST}$ is set to a predetermined value $\Delta P_{BSTF}$ applied in the first speed position. The predetermined value $\Delta P_{BSTF}$ is set at a larger value than the value $\Delta P_{BST}$ obtained from the $\Delta P_{BST}$ map applied in a position other than the first speed position.

Then, it is determined at the step S207 whether or not the intake pressure $P_B$ is higher than the difference $P_{BREF}-\Delta P_{BST}$ between a desired value $P_{BREF}$ and the first subtraction value $\Delta P_{BST}$ obtained at the step S205 or S206. The difference $P_{BREF}-\Delta P_{BST}$ is hereinafter referred to as "duty ratio control-starting pressure". The desired value $P_{BREF}$ is set in accordance with the engine rotational speed $N_E$, the intake air temperature $T_A$, and the gear position of the transmission by the program of FIG. 24, as hereinafter described.

If it is determined at the step S207 that the intake pressure $P_B$ is below the duty ration control-starting pressure $P_{BREF}$, a proportional control term $D_R$ and an integral control term $D_I$, which are applied to the feedback control, are both set to a value of 0.0, at steps S208, S209, and the duty ratio DOUT is set to 100% to make the area of space between the movable and stationary vanes 54, 49 the minimum, at a step S210. Thus, when $P_B \leq (P_{BREF}-\Delta P_{BST})$, the area of space between the movable and stationary vanes is set to the minimum, as at the period between tO-tA in FIG. 38. In this way, the rate of increase of supercharging pressure in a low range is made the maximum so as for the supercharging pressure to be quickly increased to the desired value, thereby enhancing the responsiveness of the supercharging control.

Next, at a step S211, a $t_{FBDLY}$ timer for delaying the feedback control is reset, and then the program proceeds to a step S118 in FIG. 24 to supply the control valve 69 with a driving signal corresponding to the determined duty ratio $D_{OUT}$, followed by termination of the program of FIG. 24.

Referring again to FIG. 29, if at the step S207 the intake pressure PB is higher than the duty ratio control-starting pressure ($P_{BREF}-\Delta P_{BST}$), it is determined whether or not the transmission is in the first speed position, at a step S212. If the transmission is in a position other than the first speed position, a second subtraction value $\Delta P_{BFB}$ is determined from a $\Delta P_{BFB}$ table applied in a position other than the first speed position, in accordance with the rate of change $\Delta P_B$, and then the program proceeds to a step S215, hereinafter described.

Figure 31:
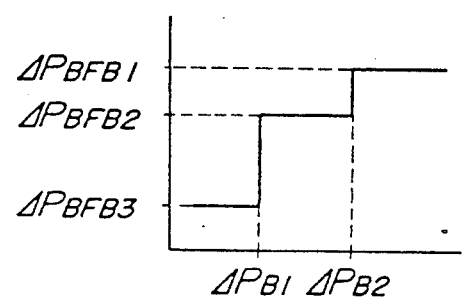
FIG. 31 is a diagram showing a table of a second decremental value $\Delta P_{BFB}$ to be applied when the transmission is a position other than the first speed position.

FIG. 31 shows an example of the $\Delta P_{BFB}$ table, in which, just like the table of FIG. 30, predetermined values $\Delta P_{BFB3}-\Delta P_{BFB1}$ are provided ($\Delta P_{BFB3}<\Delta P_{BFB2}<\Delta P_{BFB1}$), which are set such that as the rate of change $\Delta P_B$ is larger, the second subtraction value $\Delta P_{BFB}$ is set to a larger value.

If it is determined at the step S212 that the transmission is in the first speed position, the second subtraction value $\Delta$PBFB is set to a predetermined value $\Delta P_{BFBF}$ for the first speed position, at a step S214, and then the program proceeds to a step 215. The predetermined value $\Delta P_{BFBF}$ is set at a value larger than $\Delta P_{BFBF}$ applied in a position other than the first speed position, determined at the step S213.

At the next step S215, it is determined whether or not the intake pressure $P_B$ is greater than the difference $(P_{BREF}-\Delta P_{BFB})$ between the desired value PBREF and the second subtraction value $\Delta P_{BFB}$ obtained at the step S213 or S214. The difference $(P_{BREF}-\Delta P_{BFB})$ is hereinafter referred to as "feedback control-starting pressure". If the intake pressure PB is lower than the feedback control-starting pressure $(P_{BREF}-\Delta P_{BFB})$, it is judged that the feedback control should not be effected, and then the program proceeds to a step S216 et seq. If the answer at the step S215 is no, that is, if $(P_{BREF}-\Delta P_{BST})<PB \leq (P_{BREF}-\Delta P_{BFB})$, open loop control is effected as at the period between tA−tB in FIG. 38.

At the step S216, the $t_{FBDLY}$ timer is reset, like the step S211, and at a step S217, it is determined whether or not the transmission is in the first speed position. If the answer is no, a subtraction term $D_T$ is determined from a $D_T$ table applied in a position other than the first speed position, at a step S218, followed by the program proceeding to a step S221, hereinafter referred to.

Figure 32:
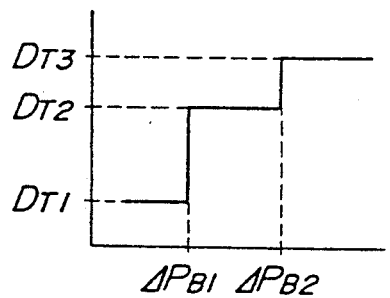
FIG. 32 is a diagram showing a table of a subtraction term $D_T$ to be applied when the transmission is in a position other than the first speed position.

FIG. 32 shows an example of the $D_T$ table, in which predetermined values $D_{T1}-D_{T3}$ ($D_{T1}<D_{T2}<D_{T3}$) are set such that as the rate of change $\Delta P_B$ increases, the subtraction value $D_T$ is set to a larger value, just like the map of FIG. 30.

Figure 33:
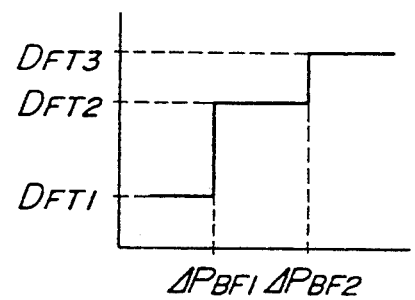
FIG. 33 is a diagram showing a table of a subtraction term $D_{FT}$ to be applied when the transmission is in the first speed position.

If at the step S217 it is determined that the transmission is in the first speed position, a subtraction term $D_{FT}$ is determined from a $D_{FT}$ table for the first speed position in accordance with the rate of change $\Delta P_B$, at a step S219. FIG. 33 shows an example of the $D_{FT}$ table, in which two predetermined values $\Delta P_{BF1}$ and $\Delta P_{BF2}$ ($\Delta P_{BF2}>\Delta P_{BF1}$) are provided as the rate of change $\Delta P_B$, and predetermined subtraction values $D_{FT1}-D_{FT3}$ ($D_{FT1}<D_{FT2}<D_{FT3}$) are set such that as the rate of change $\Delta P_B$ increases, the subtraction term $D_{FT}$ is set to a larger value. These predetermined values $D_{FT1}-D_{FT3}$ are set at larger values than respective corresponding values $D_{T1}-D_{T3}$ of FIG. 32 at the same rate of change $\Delta P_B$.

As described later, the duty ratio $D_{OUT}$ during the open loop control is set to a smaller value as the subtraction terms $D_T$, $D_{FT}$ are set to larger values. Therefore, by setting the value of $D_{FT}$ to a value larger than the value of $D_T$ in response to the rate of change $\Delta P_B$, the rate of increase of the supercharging pressure can be suppressed in accordance with an actual change in the supercharging pressure when the automatic transmission is in the first speed position. Therefore, with the aid of the basic duty ratio $D_M$ set, depending on engine operating conditions, an abrupt increase and overboosting in the supercharging pressure can be positively prevented when the transmission is in the first speed position, as indicated by the solid line I shown in FIG. 39, while the rate of increase in the supercharging pressure can be controlled to a larger value when the transmission is in a position other than the first speed position to thereby obtain desired accelerability, as indicated by the chain line II in FIG. 39.

Then, the subtraction term $D_T$ is set to the determined value $D_{FT}$ at a step S220, and the flag F is set to 1 to indicate that the open loop control should be executed, at a step S221, followed by termination of the program.

If at the step S215 it is determined that the intake pressure $P_B$ is greater than the feedback control-starting pressure $(P_{BREF}-\Delta P_{BFB})$, it is determined at a step S222 whether or not a predetermined period of time $t_{FBDLY}$ has elapsed after the $t_{FBDLY}$ timer was reset at the step S211 or S216. If the predetermined time period $t_{FBDL}$ has not elapsed yet, the program proceeds to the step S217 wherein the open loop control is executed, while if the time period $t_{FBDLY}$ has elapsed, it is judged that the feedback control should be executed, and then the program proceeds to a step S223. In this way, even when the intake pressure $P_B$ exceeds the feedback control-starting pressure $(P_{BREF}-\Delta P_{BFB})$, the feedback control is not executed immediately, but the open loop control is executed until the predetermined time period $t_{FBDLY}$ elapses, as at period between tB−tC in FIG. 38.

Figure 38:
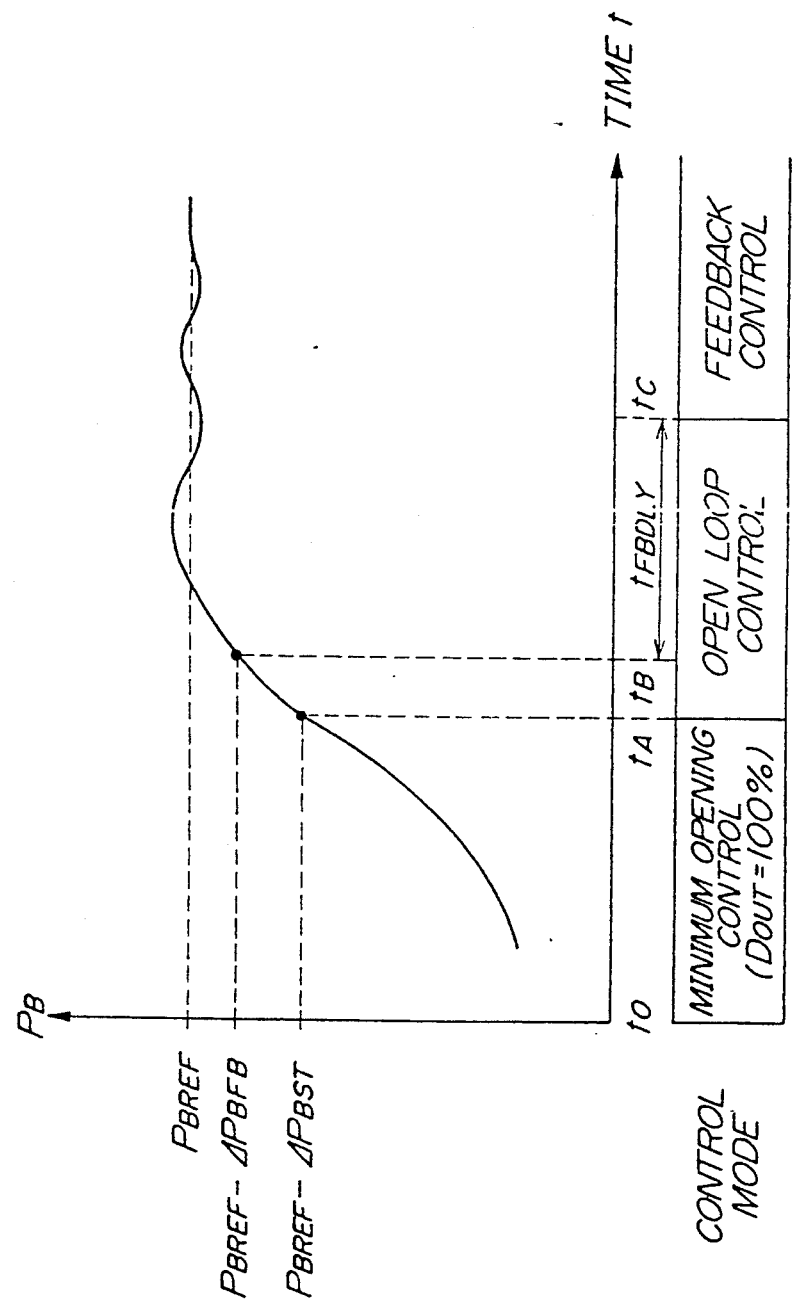
FIG. 38 is a diagram showing the relationship between the intake pressure $P_B$ and the supercharging pressure control.

Only after the lapse of $t_{FBDLY}$, the feedback control is started, as at tC in FIG. 38.

At the step S223, an initial value of the integral control term $D_T$ is calculated by the following equation:

$$D_I = K_{TATC} \times D_M \times (K_{MODij} - 1)$$

where $K_{MODij}$ is a learned correction coefficient (learned value) calculated during feedback control in accordance with the program of FIG. 24, as hereinafter described.

Then, the program proceeds to the step S203 to set the flag F to 0 to indicate that the feedback control should be executed, followed by termination of the program.

Referring again to FIG. 24, at a step S107 following the step S106, it is determined whether or not the flag F has been set to 1 in the subroutine of FIG. 29. If the flag F has been set to 1, that is, if the feedback control should be started, the desired value $P_{BREF}$ is determined from a $P_{BREF}$ map in accordance with the engine rotational speed $N_E$ and the intake air temperature $T_A$, at a step S108. FIG. 34 shows an example of the $P_{BREF}$ map, in which predetermined values $N_{V1} - N_{V20}$ of the engine rotational speed $N_E$ and predetermined values $T_{AV1} - T_{AV8}$ of the intake air temperature $T_A$ are provided and set in just the same manner as the $K_{TATC}$ map mentioned before. By the use of the $P_{BREF}$ map, according to which the desired value $P_{BREF}$ is set to a higher value as the intake air temperature $T_A$ is lower, the desired value $P_{BREF}$ can be set to appropriate values to operating conditions of the engine.

Then, at a step S109, it is determined whether or not the transmission is in the first speed position. If the answer is yes, a predetermined value $P_{BREFF}$ is subtracted from the desired value $P_{BREF}$ determined at the step S108, at a step S110 to set the desired value $P_{BREF}$, followed by the program proceeding to a step S111. On the other hand, if the answer is no, the program jumps from the step S109 to the step S111. In this way, the desired value $P_{BREF}$ is set to a lower value in the first speed position than in a position other than the first speed position.

Figure 39:
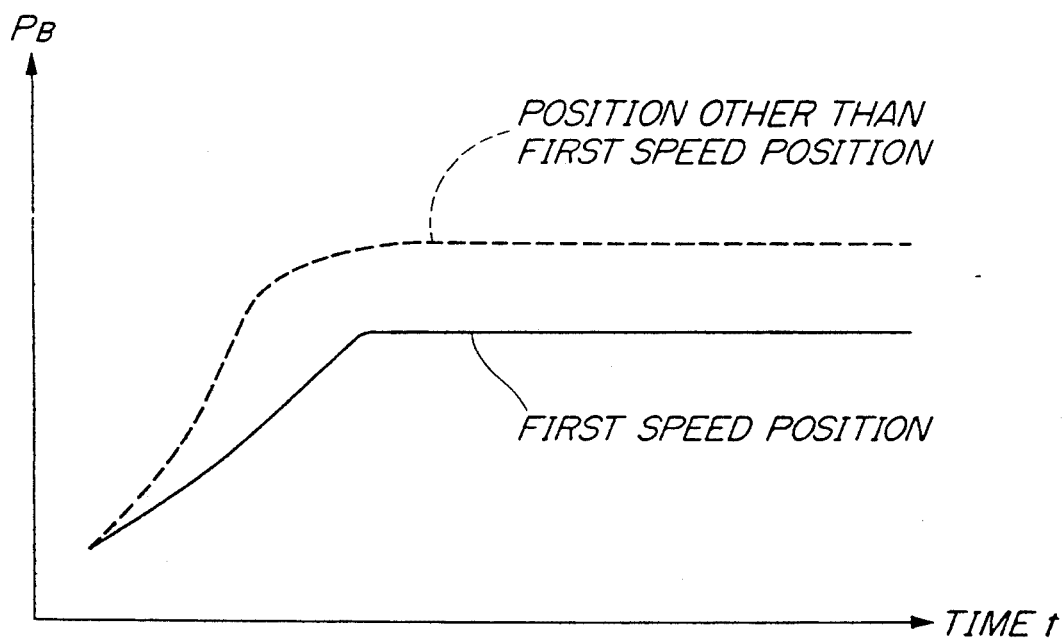
FIG. 39 is a graph showing a supercharging pressure characteristic depending on the gear position of the transmission, obtained by the second embodiment of the invention.

By so setting the desired value $P_{BREF}$, when the transmission is in the first speed position, the supercharging pressure is controlled to a smaller value than a value assumed in another gear position, during a steady state of the supercharging pressure, so that torque applied to the transmission gear is made smaller, as indicated by the solid line in FIG. 39, thereby enhancing the durability of the transmission; whereas in another gear position the supercharging pressure in steady state can be controlled to a desired higher value, as indicated by the broken line in FIG. 39.

At the step S111, the difference $\Delta P_{BD} (= P_{BREF} - P_B)$ between the desired value $P_{BREF}$ and the actual intake pressure $P_B$ is calculated, and then it is determined at a step S112 whether or not the absolute pressure $|\Delta P_B|$ of the determined difference $\Delta P_{BD}$ is larger than a predetermined value $G_{PB}$ (e.g. 20 mmHg). The predetermined value $G_{PB}$ is a value defining the insensitive pressure width.

If $\Delta P_{BD}C \geq G_{PB}$, respective constants $K_P$ and $K_I$ of the proportional control term $D_P$ and the integral control term $D_I$ are read, respectively, from a $K_P$ table and a $K_I$ table, in accordance with the engine rotational speed N, at a step S113. FIG. 35 and FIG. 36 show these tables, respectively. In the $K_P$ table, two predetermined values $N_{FBP1}$ and $N_{FBP2}$ ($N_{FBP2} > N_{FBP1}$) of the engine rotational speed $N_E$ are provided, and predetermined values $K_{P1} - K_{P3}$ ($K_{P1} < K_{P2} < K_{P3}$) of the constant $K_P$ are provided, which correspond, respectively, to $N_E < N_{FBP1}$, $N_{FBP1} \leq N_E < N_{FBP2}$, and $N_E \geq N_{FBP2}$. On the other hand, in the $K_I$ table, two predetermined values $N_{FBI1}$ and $N_{FBI2}$ of the engine rotational speed $N_E$ are provided, and predetermined values $K_{I1} - K_{I3}$ ($K_{I3} < K_{I1} < K_{I2}$) are provided, which correspond, respectively, to $N_E < N_{FBI1}$, $N_{FBI1} \leq N_E < N_{FBI2}$, and $N_E \geq N_{FBI2}$.

Then, the proportional control term $D_P$ is set to the product $K_P \times \Delta P_{BD}$ of the constant $K_P$ and the difference $\Delta P_{BD}$, at a step S114, and the integral control term $D_I$ is set to the sum $(= D_I + K_I \times \Delta P_{BD})$ of the integral control term $D_I$ obtained in the last loop and the product $K_I \times \Delta P_{BD}$, at a step S115.

The proportional control term $D_P$ and the integral control term $D_I$ thus determined are substituted into the following equation to calculate the duty ratio $D_{OUT}$ applied during the feedback control:

$$D_{OUT} = D_M \times K_{TATC} + D_R + D_I$$

Then, the calculated duty ratio $D_{OUT}$ is subjected to limit checking to adjust same within a predetermined range, at a step S117. A driving signal corresponding to the duty ratio $D_{OUT}$ is supplied to the electromagnetic control valve 69, at the step S118, followed by termination of the program.

When $|\Delta P_{BD}| < G_{PB}$ at the step S112 and hence the actual intake pressure P is substantially equal to the desired value $P_{BREF}$, the proportional control term D is set to 0.0, and the integral control term D is set to a value of the same obtained in the last loop, at respective steps S119 and S120.

Then, it is determined at a step S121 whether or not the transmission is in the first speed position. When the answer is yes, a coefficient $K_R$ is calculated by the following equation at a step S122:

$$K_R = (K_{TATC} \times D_M + D_I)/(K_{TATC} \times D_M)$$

where the coefficient $K_R$ represents the amount of deviation of the supercharging pressure from the desired value due to variations caused during the mass production of the engine and the control system and/or due to aging change.

Then, at a step S123 the coefficient $K_R$ obtained as above is applied to calculation of the learned correction coefficient $K_{MODij}$ by the use of the following equation:

$$K_{MODij} = C_{MOD}/A \times K_R + (A - C_{MOD})/A \times K_{MODij}$$

where $K_{MODij}$ of the second term on the right side is a value of $K_{MODij}$ obtained in the last loop and is read from a $K_{MODij}$ map, hereinafter described, in accordance with the engine rotational speed $N_E$ and the intake air temperature $T_A$. A is a constant, and $C_{MOD}$ is a variable which is set to a suitable value experimentally selected from $1 - A$.

The ratio of $K_R$ to $K_{MODij}$ varies depending upon the value of the variable $C_{MOD}$. Therefore, by setting the value of $C_{MOD}$ to a value falling within the range of $1 - A$ according to characteristics of the supercharging pressure control system, the engine, etc., the value of $K_{MODij}$ can be calculated to an optimal value.

Then, the learned correction coefficient $K_{MODij}$ calculated as above is stored into the $K_{MODij}$ map which is provided within a back-up RAM of the control unit C, at a step S124, and the program proceeds to a step S116 et seq. and is then ended. FIG. 37 shows an example of the $K_{MODij}$ map, in which, like the $K_{TATC}$ map of FIG. 28 and the $P_{BREF}$ map of FIG. 34, the $K_{MODij}$ value is classified into a plurality of predetermined values in accordance with the engine rotational speed $N_E$ and the intake air temperature $T_A$. The value of $K_{MODij}$ is calculated and the calculated value is stored in each of a plurality of regions defined by $N_E$ and $T_A$.

When it is determined that the flag F is equal to 1, that is, when the open loop control should be executed according to the subroutine of FIG. 29, a value of the learned correction coefficient $K_{MODij}$ is read from the $K_{MODij}$ map in accordance with the engine rotational speed $N_E$ and the intake air temperature $T_A$, at a step S125, and the proportional control term $D_P$ and the intergal control term $D_I$ are both set to 0.0, at steps S126 and S129.

Then, the duty ratio $D_{OUT}$ applied during the open loop control is calculated by the following equation:

$$D_{OUT} = K_{TATC} \times K_{MODij} \times (D_M - D_T)$$

where $D_T$ is the subtraction term set at the step S218 or S220 of the subroutine of FIG. 29.

Then, the duty ratio $D_{OUT}$ calculated as above is subjected to limit checking to be adjusted within a range from 0% to 100% at a step S129. This is followed by execution of the step S118 and termination of the program.

Although the embodiments described above are applied to a variable capacity turbocharger which has its capacity varied by means of movable vanes 54 as increase rate-varying means, the method of the invention may also be applied to other types of variable capacity type turbochargers such as a waste-gate type and a supercharging pressure-relief type, as well as to other types of superchargers than the turbocharger.

What is claimed is:

1. A method of controlling supercharging pressure in an internal combustion engine having a supercharger, wherein the supercharging pressure created by said supercharger is controlled based on a control amount determined in dependence on operating conditions of said engine, the method comprising the steps of:
    (1) determining whether or not said engine is in a predetermined cold condition;
    (2) determining whether the rotational speed of said engine is higher than a predetermined value;
    (3) when said engine is in said predetermined cold condition, setting said control amount so that the supercharging pressure is lower than a value assumed when said engine is in a condition other than said predetermined cold condition; and
    (4) when said engine has left said predetermined cold condition, maintaining said control amount set in said step 3 until a predetermined period of time within which warming-up of said engine is completed elapses after said engine has left said predetermined cold condition, even when the rotational speed of said engine is higher than said predetermined value.

2. A method as claimed in claim 1, wherein said predetermined cold condition of said engine is a condition in which the engine cooling water temperature is below a predetermined value.

3. A method as claimed in claim 1, wherein said predetermined cold condition of said engine is a condition in which the temperature of intake air in said engine is below a predetermined value.

4. A method as claimed in claim 1, wherein said control amount is determined by a basic control amount and a correction value, the method including the steps of:
    setting said correction value to an initial value dependent on the rotational speed of said engine when said predetermined period of time elapses, and holding said correction value at said initial value over a second predetermined period of time, to thereby correct said basic control amount; and
    gradually returning said control amount to a value assumed when said engine is in an operating condition other than said predetermined cold condition, after said second predetermined period of time elapses.

5. A method of controlling supercharging pressure in an internal combustion engine having a supercharger, wherein the supercharging pressure created by said supercharger is controlled based on a control amount determined by a basic control amount and a correction value in dependence on operating conditions of said engine, the method comprising the steps of:
    (1) determining whether or not said engine is in a predetermined cold condition;
    (2) when said engine is in said predetermined cold condition, setting said control amount so that the supercharging pressure is lower than a value assumed when said engine is in an operating condition other than said predetermined cold condition;
    (3) when said engine has left said predetermined cold condition, maintaining said control amount set in said step (2) so that the supercharging pressure is maintained at a lowered value over a predetermined time period after said engine has left said predetermined cold condition;
    (4) setting said correction value to an initial value dependent on the rotational speed of said engine when said predetermined period of time elapses, and holding said correction value at said initial value over a second predetermined period of time, to thereby correct said basic control amount; and
    (5) gradually returning said control amount to a value assumed when said engine is in an operating condition other than said predetermined cold condition, after said second predetermined period of time elapses.

* * * * *